(12) United States Patent
Li et al.

(10) Patent No.: US 11,799,560 B2
(45) Date of Patent: Oct. 24, 2023

(54) ASYMMETRIC DIRECT DETECTION OF OPTICAL SIGNALS

(71) Applicant: Ciena Corporation, Hanover, MD (US)

(72) Inventors: Xueyang Li, Montréal (CA); Maurice O'Sullivan, Ottawa (CA); Zhenping Xing, Montréal (CA); David V. Plant, Montréal (CA); Mohammad E. Mousa Pasandi, Ottawa (CA)

(73) Assignee: Ciena Corporation, Hanover, MD (US)

( * ) Notice: Subject to any disclaimer, the term of this patent is extended or adjusted under 35 U.S.C. 154(b) by 11 days.

(21) Appl. No.: 17/578,853

(22) Filed: Jan. 19, 2022

(65) Prior Publication Data

US 2022/0149954 A1     May 12, 2022

Related U.S. Application Data

(63) Continuation-in-part of application No. PCT/US2020/054945, filed on Oct. 9, 2020.

(Continued)

(51) Int. Cl.
    *H04B 10/06*      (2006.01)
    *H04B 10/61*      (2013.01)
    *H04B 10/516*     (2013.01)

(52) U.S. Cl.
    CPC ....... *H04B 10/616* (2013.01); *H04B 10/5165* (2013.01); *H04B 10/615* (2013.01)

(58) Field of Classification Search
    CPC .. H04B 10/616; H04B 10/6165; H04B 10/40; H04B 10/615; H04B 10/6162;

(Continued)

(56) References Cited

U.S. PATENT DOCUMENTS

| 4,859,018 A | 8/1989 | O'Sullivan et al. |
| 4,983,024 A | 1/1991 | Boothroyd et al. |

(Continued)

FOREIGN PATENT DOCUMENTS

| DE | 69605947 D1 | 2/2000 |
| EP | 2 201 705 | 6/2010 |

(Continued)

OTHER PUBLICATIONS

Cisco Visual Networking Index: Forecast and Trends, 2017-2022 White Paper, https://www.cisco.com/c/en/us/solutions/collateral/service-provider/visual-networking-index-vni/white-paper-c11-741490.html, pp. 1-38.

(Continued)

*Primary Examiner* — Hanh Phan
(74) *Attorney, Agent, or Firm* — Baratta Law PLLC; Lawrence A. Baratta, Jr.

(57) ABSTRACT

An asymmetric coherent receiver includes an optical front end configured to split a received optical signal into two paths, wherein the split received optical signal experiences a different optical transfer function in one of the two paths; two photodetectors each configured to detect power one of the split received optical signals in each of the two paths to obtain corresponding electrical signals; and circuitry configured to perform electrical domain extraction of information of each of the corresponding electrical signals from the two paths, wherein the different optical transfer function provides additional information utilized in optical field reconstruction via direct detection.

20 Claims, 33 Drawing Sheets

Related U.S. Application Data

(60) Provisional application No. 63/139,325, filed on Jan. 20, 2021, provisional application No. 62/928,388, filed on Oct. 31, 2019.

(58) Field of Classification Search
CPC .. H04B 10/66; H04B 10/2507; H04B 10/672; H04B 10/674; H04B 10/675; H04J 14/02; H04J 14/06
USPC ....... 398/202, 208, 209, 203, 204, 205, 206, 398/207, 210, 212, 213, 214, 135, 136, 398/158, 159, 183, 184, 188, 152, 65, 79
See application file for complete search history.

(56) References Cited

U.S. PATENT DOCUMENTS

| | | | |
|---|---|---|---|
| 5,774,242 | A | 6/1998 | O'Sullivan et al. |
| 6,101,012 | A | 8/2000 | Danagher et al. |
| 6,438,148 | B1 | 8/2002 | Hui et al. |
| 6,486,990 | B1 | 11/2002 | Roberts et al. |
| 6,650,673 | B2 | 11/2003 | Hong et al. |
| 6,687,464 | B1 | 2/2004 | Roberts et al. |
| 6,751,414 | B1 | 6/2004 | Davies et al. |
| 7,023,601 | B2 | 4/2006 | McGhan et al. |
| 7,200,339 | B1 | 4/2007 | Roberts et al. |
| 7,274,879 | B1 | 9/2007 | Sandler et al. |
| 7,382,985 | B2 | 6/2008 | Roberts et al. |
| 7,477,852 | B2 * | 1/2009 | Agarwal .............. H04B 10/677 398/208 |
| 7,672,595 | B1 | 3/2010 | McNicol et al. |
| 7,680,420 | B1 | 3/2010 | Walker et al. |
| 8,023,402 | B2 | 9/2011 | Roberts et al. |
| 8,249,467 | B2 | 8/2012 | Roberts et al. |
| 8,355,631 | B2 | 1/2013 | O'Sullivan et al. |
| 8,705,982 | B2 | 4/2014 | Awadalla et al. |
| 8,724,999 | B2 * | 5/2014 | Cvijetic ............... H04B 10/548 398/205 |
| 8,781,317 | B1 | 7/2014 | Roberts et al. |
| 8,787,754 | B1 | 7/2014 | Beckett et al. |
| 8,958,696 | B2 | 2/2015 | Boertjes et al. |
| 9,143,238 | B2 | 9/2015 | Roberts et al. |
| 9,774,392 | B2 | 9/2017 | Doucet et al. |
| 9,973,277 | B2 | 5/2018 | Zhuge et al. |
| 10,090,920 | B1 | 10/2018 | Zhuge et al. |
| 10,193,620 | B2 | 1/2019 | Shiner et al. |
| 10,236,982 | B1 | 3/2019 | Zhuge et al. |
| 10,270,537 | B2 | 4/2019 | Zhuge et al. |
| 10,419,109 | B1 | 9/2019 | Oveis Gharan et al. |
| 10,439,751 | B2 | 10/2019 | Roberts et al. |
| 10,444,114 | B2 | 10/2019 | Shiner et al. |
| 10,574,352 | B2 | 2/2020 | Roberts et al. |
| 2002/0025100 | A1 | 2/2002 | Laprise et al. |
| 2002/0031199 | A1 | 3/2002 | Rolston et al. |
| 2002/0036813 | A1 | 3/2002 | Roberts et al. |
| 2003/0025912 | A1 | 2/2003 | Hui et al. |
| 2003/0039005 | A1 | 2/2003 | Roberts et al. |
| 2004/0197103 | A1 | 10/2004 | Roberts et al. |
| 2004/0208565 | A1 | 10/2004 | Roberts et al. |
| 2004/0208643 | A1 | 10/2004 | Roberts et al. |
| 2006/0140636 | A1 * | 6/2006 | Marazzi ........... H04B 10/25253 398/147 |
| 2006/0274987 | A1 | 12/2006 | Mony et al. |
| 2007/0133993 | A1 * | 6/2007 | Yee .................... H04B 10/64 398/85 |
| 2009/0074415 | A1 * | 3/2009 | Xie ..................... H04B 10/671 398/79 |
| 2017/0090267 | A1 | 3/2017 | O'Sullivan |
| 2017/0250760 | A1 * | 8/2017 | Yu .......................... H04L 27/38 |
| 2018/0331762 | A1 | 11/2018 | Zhuge et al. |
| 2018/0359029 | A1 | 12/2018 | Shiner et al. |
| 2019/0190648 | A1 | 6/2019 | Reimer et al. |

FOREIGN PATENT DOCUMENTS

| | | |
|---|---|---|
| EP | 1 949 569 B1 | 8/2013 |
| EP | 3 107 255 B1 | 5/2018 |
| WO | 2017048899 A1 | 3/2017 |
| WO | 2018215850 A1 | 11/2018 |
| WO | 2019234536 A1 | 12/2019 |

OTHER PUBLICATIONS

Kangping Zhong et al., "Digital Signal Processing for Short-Reach Optical Communications: A Review of Current Technologies and Future Trends," Journal of Lightwave Technology vol. 36, No. 2, Jan. 15, 2018, pp. 377-400.

Mathieu Changnon, "Optical Communications for Short Reach," Journal of Lightwave Technology, vol. 37, No. 8, Apr. 15, 2019, pp. 1779-1797.

Liang Zhang et al., "Beyond 100-GB/s Transmission Over 80-km SMF Using Direct-Detection SSB-DMT at C-Band," Journal of Lightwave Technology, vol. 34, No. 2, Jan. 15, 2016, pp. 723-729.

Qiang Zhang et al., "Transmission of single lane 128 Gbit/s PAM-4 signals over an 80 km SSMF link, enabled by DDMZM aided dispersion pre-compensation," Research Article, vol. 24, No. 21, Oct. 17, 2016, Optics Express, pp. 24580-24591.

Zhenping Xing et al., "100 GB/s PAM4 transmission system for datacenter interconnects using a SiP ME-MZM based DAC-less transmitter and a VSB self-coherent receiver," Research Article, vol. 26, No. 18, Sep. 3, 2018, Optics Express, pp. 23969-23979.

Zhe Li et al., "SSBI Mitigation and the Kramers-Kronig Scheme in Single-Sideband Direct-Detection Transmission With Receiver-Based Electronic Dispersion Compensation," Journal of Lightwave Technology, vol. 35, No. 10, May 15, 2017, pp. 1887-1893.

Hsing-Yu Chen et al., "Optical filter requirements in an EML-based single-sideband PAM4 intensity-modulation and direct-detection transmission system," Research Article, vol. 25, No. 6, Mar. 20, 2017, pp. 5852-5860.

Cristian Antonelli et al., "Polarization Multiplexing With the Kramers-Kronig Receiver," Journal of Lightwave Technology, vol. 35, No. 24, Dec. 15, 2017, pp. 5418-5424.

Di Che et al., "Single-Channel 480-GB/s Direct Detection of POL-MUX IQ Signal Using Single-Sideband Stokes Vector Receiver," Tu2C.7.pdf OFC 2018 © OSA 2018, pp. 1-3.

Di Che et al., "Maximizing the spectral efficiency of Stokes vector receiver with optical field recovery," Research Article vol. 26, No. 22, Oct. 29, 2018, Optics Express, pp. 28976-28981.

Antonio Mecozzi et al., "Kramers-Kronig coherent receiver," Research Article, vol. 3, No. 11, Nov. 2016, Optica, pp. 1220-1227.

Xi Chen et al., "Kramers-Kronig Receivers for 100-km Datacenter Interconnects," Journal of Lightwave Technology, vol. 36, No. 1, Jan. 1, 2018, pp. 79-89.

Yixiao Zhu et al., "Direct detection of polarization multiplexed single sideband signals with orthogonal offset carriers," Research Article, vol. 26, No. 12, Jun. 11, 2018, Optics Express, pp. 15887-15898.

Daoxin Dai et al., "Passive technologies for future large-scale photonic integrated circuits on silicon: polarization handling, light non-reciprocity and loss reduction," Light: Science & Applications (2012) 1, e1; doi:10.1038/lsa.2012.12012 CIOMP, pp. 1-12.

Hiroshi Fukuda et al., "Silicon photonic circuit with polarization diversity," 2008 Optical Society of America, pp. 1-9.

F.Y. Gardes et al., "40 GB/s silicon photonics modulator for TE and TM polarisations," vol. 19, No. 12, Jun. 6, 20211, Optics Express, Optical Society of America, pp. 11804-11814.

Son Thai Le et al., "1.6Tbps WDM Direct Detection Transmission with Virtual-Carrier over 1200km," Tu2D.5.pdf OFC 2018 © OSA 2018, pp. 1-3.

Son Thai Le et al., "1.72-Tb/s Virtual-Carrier-Assisted Direct-Detection Transmission Over 200 km," Journal of Lightwave Technology, vol. 36, No. 6, Mar. 15, 2018, pp. 1347-1353.

Mehrez Selmi et al., "Accurate Digital Frequency Offset Estimator for Coherent PolMux QAM Transmission Systems," ECOC 2009, Sep. 20-24, 2009, Paper P3.08, pp. 1-2.

(56) References Cited

OTHER PUBLICATIONS

Charles Laperle et al., "WDM Performance and PMD Tolerance of a Coherent 40-Gbit/s Dual-Polarization QPSK Transceiver," Journal of Lightwave Technology, vol. 26, No. 1, Jan. 1, 2008, pp. 168-175.

Antoni Mecozzi et al., "The Kramers-Kronig receiver: a coherent receiver based on intensity detection and phase recovery," STu3C.3.pdf CLEO 2018 © OSA 2018, pp. 1-2.

Sebastian Randel et al., "100-GB/s Discrete-Multitone Transmission Over 80-km SSMF Using Single-Sideband Modulation With Novel Interference-Cancellation Scheme," Alcatel-Lucent, Bell Laboratories, Ecoc 2015—ID: 0697, pp. 1-3.

Antonio Mecozzi et al., "Kramers-Kronig receivers," Advances in Optics and Photonics, vol. 11, No. 3, Sep. 2019, Review, pp. 480-517.

Liang Zhang et al., "150-GB/s DMT over 80-km SMF transmission based on Spectrally Efficient SSBI cancellation using guard-band Twin-SSB Technique," ECOC 2016, 42nd European Conference and Exhibition on Optical Communications, Sep. 18-22, 2016, pp. 1178-1180.

Xueyang Li et al., "Asymmetric direct detection of twin-SSB signals," Optics Letters, vol. 45, No. 4, Feb. 15, 2020, pp. 844-847.

William Shieh et al., "Carrier-assisted differential detection," Article, Open Access, Light: Science & Applications, Official journal of the CIOMP 2047-7538, https://doi.org/10.1038/s41377-020-0253-8, 2020, pp. 1-9.

Chuanbowen Sun et al., "Experimental Demonstration of Complex-Valued DSB Signal Field Recovery via Direct Detection," IEEE Photonics Technology Letters, vol. 32, No. 10, May 15, 2020, pp. 585-588.

Yves Painchaud et al., "Recent progress on FBG-based tunable dispersion compensators for 40 GB/s applications," OThP3.pdf, © OSA 1-55752-830-6, Mar. 2007, pp. 1-4.

D. T. H. Tan et al., "Chip-scale dispersion engineering using chirped vertical gratings," vol. 33, No. 24, Dec. 15, 2018, Optics Letters, pp. 3013-3015.

Han Sun et al., "Real-time measurements of a 40 GB/s coherent system," Nortel Networks, 2008 Optical Society of America, vol. 16, No. 2, Jan. 21, 2008, Optics Express, pp. 873-879.

Kazuro Kikuchi, "Fundamentals of Coherent Optical Fiber Communications," Journal of Lightwave Technology, vol. 34, No. 1, Jan. 1, 2016, pp. 157-179.

Lior Blech et al., "The Enhanced Kramers Kronig Receiver," Tu2D.7.pdf OFC 2018 © OSA 2018, pp. 1-3.

Lior Blech et al., "Enhancing the Kramers-Kronig receiver via dispersion-based spatial diversity," O[tics Letter, vol. 45, No. 13, Jul. 1, 2020, pp. 3494-3497.

Thang M. Hoang et al., "Single wavelength 480 GB/s direct detection over 80km SSMF enabled by Stokes Vector Kramers Kronig transceiver," Research Gate, Optics Express, Oct. 2017, pp. 1-10.

Jan. 29, 2021, International Search Report and Written Opinion for International Patent Application No. PCT/US2020/054945.

\* cited by examiner

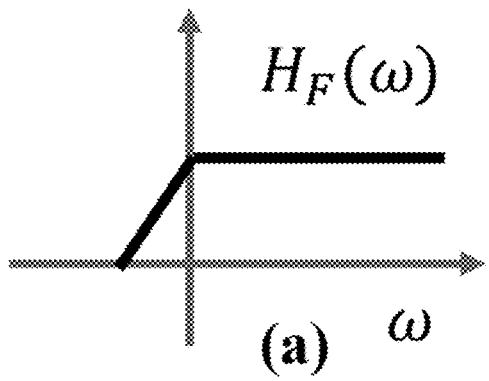
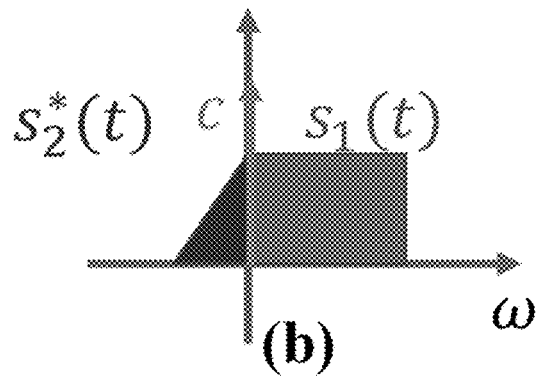
FIG. 28A  FIG. 28B
Set $Im(s_1[n]_{(0)}) = 0, Im(s_2[n]_{(0)}) = 0$
Update $b[n]_{(1)}$ from $Im(s_1[n]_{(0)})$ and $Im(s_2[n]_{(0)})$ based on Eq. (4)
For $i$ from 1 to N {
   Update $s_1[n]_{(i)}$ from $b[n]_{(i)}$ based on Eq. (5)
   Update $s_2[n]_{(i)}$ from $b[n]_{(i)}$ based on Eq. (6)
   Update $b[n]_{(i+1)}$ from $Im(s_1[n]_{(i)})$ and $Im(s_2[n]_{(i)})$ based on Eq. (4)
}
Return $b[n]_{(N+1)}$
FIG. 29

FIG. 30A
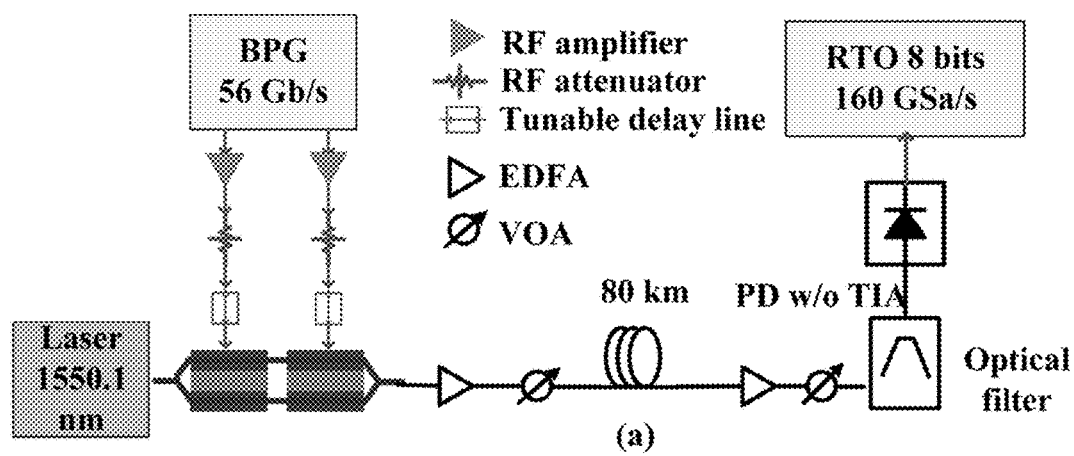
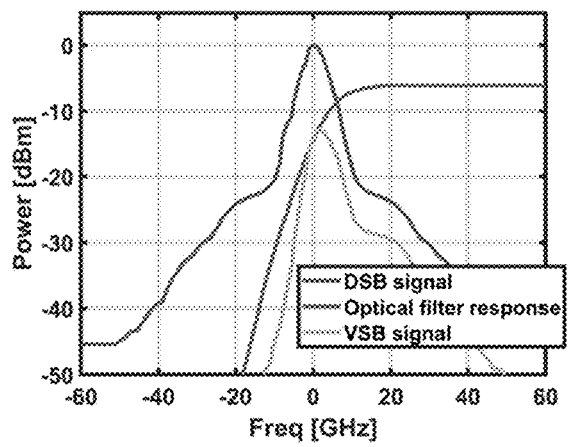
FIG. 30B
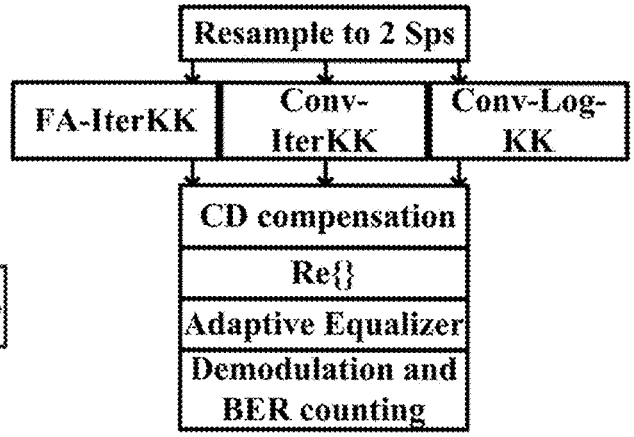
FIG. 30C

ASYMMETRIC DIRECT DETECTION OF OPTICAL SIGNALS

CROSS-REFERENCE TO RELATED APPLICATION(S)

The present disclosure is a bypass continuation-in-part of PCT/US2020/054945, filed Oct. 9, 2020, and which claims priority to U.S. Provisional Patent Application No. 62/928,388, filed Oct. 31, 2019, and entitled "Asymmetric direct detection of orthogonal offset carriers assisted polarization multiplexed single sideband signals," the contents of each are incorporated by reference in their entirety.

The present disclosure also claims priority to U.S. Provisional Patent Application No. 63/139,325, filed Jan. 20, 2021, and entitled "Asymmetric self-coherent receiver," the contents of which are incorporated by reference in their entirety

FIELD OF THE DISCLOSURE

The present disclosure generally relates to optical modulation/demodulation. More particularly, the present disclosure relates to systems and methods for asymmetric direct detection (ADD) of optical signals.

BACKGROUND OF THE DISCLOSURE

Network traffic growth continues to proliferate. Network forecasts [1] of the global IP traffic, which reached 1.5 Zettabyte in 2017, indicate a tripling of bandwidth by 2022, of which 33% will stay within the Metro network. Coherent transmission is a high throughput high spectral efficiency technology inclusive of Metro and inter-data center distances. At lesser throughputs and spectral efficiencies in the 40 km to 80 km reach range, direct detection (DD) transmission schemes can generally provide cost-effective, power-efficient and compact footprint transceivers [2-4]. Compared to dual-pol coherent, direct detection requires fewer photodiodes (PDs) and associated analog to digital converters (ADCs) at the receiver. Moreover, DD schemes have no carrier recovery or frequency offset compensation algorithms in the receiver digital signal processor (DSP), which allows for even lower power-consumption application-specific integrated circuits (ASICs) with more compact chip area.

Optical modulation encodes information onto the physical dimensions of an optical carrier. Intensity modulation direct detection (IMDD) systems use only the square of the field magnitude and is restricted to signaling schemes based on multiple intensity levels. Coherent detection detects phase and amplitude, yielding an additional modulation dimension that doubles spectral efficiency. Furthermore, having full access to the complex field also allows the transceiver to digitally compensate for the channel linear effects including the filtering of the bandlimited channel, the chromatic dispersion (CD), which are otherwise not possible using only the signal intensity. The noise tolerance of coherent detection with soft-decision forward error correction extends transmission reach and can eliminate a need for link repeaters. As such, coherent receivers are widely deployed in long-haul transmission systems and, in recent years, have also been introduced in short-reach optical communications [1a]. However, coherent transceivers are still considered a costly technology at lower throughputs and shorter distances

BRIEF SUMMARY OF THE DISCLOSURE

The present disclosure relates to systems and methods for asymmetric direct detection (ADD) of optical signals. The present disclosure includes a novel optical receiver architecture and functionality with reduced complexity, cost, power requirements, etc. that may be used in short-reach optical networking applications, e.g., metro, data center interconnection, up to 80 km, etc. Further, the proposed approach includes improved spectral efficiency. Variously, the present disclosure presents an approach in a receiver where a received optical signal is split into two paths with each path experiencing a different optical transfer function. Each path includes square law detection where the optical signal is converted to an electrical signal, followed by extraction, in the electrical domain, of information imposed on the optical field amplitude and phase. In an embodiment, asymmetric direct detection is described with orthogonal offset carriers assisted polarization multiplexed single sideband signals. For example, one polarization can include a filter to reduce the power of a carrier for the different optical transfer function. In another embodiment, asymmetric direct detection is described with an asymmetric self-coherent receiver that includes a double sideband (DSB) signal. For example, the different optical transfer functions can be via a dispersion element (DE), an interferometer, a filter, and the like. In a further embodiment, a filter response assisted iterative Kramers-Kronig (KK) process is described for vestigial sideband (VSB) systems.

In an embodiment, a method includes splitting a received optical signal into two paths, wherein the split received optical signal experiences a different optical transfer function in one of the two paths; detecting power of the split received optical signal in each of the two paths to obtain corresponding electrical signals; and performing electrical domain extraction of information associated with the received optical signal utilizing each of the corresponding electrical signals from the two paths, wherein the different optical transfer function provides additional information from the received optical signal utilized in optical field reconstruction via direct detection.

The received optical signal can be self-coherent (SC) complex double sideband (DSB). The different transfer function can be caused by a dispersive element or an interferometer. The received optical signal can include orthogonal offset carriers assisted polarization multiplexed single sideband signals. The different transfer function can be caused by a filter to reduce power of a carrier in one polarization. The performing can include iterative signal-signal beating interference (SSBI) cancellation. The direct detection can include Kramers-Kronig (KK) detection. The detecting can further includes performing analog-to-digital conversion to obtain the corresponding electrical signals. The performing electrical domain extraction of information can be via a digital signal processor (DSP).

In another embodiment, an asymmetric coherent receiver includes an optical front end configured to split a received optical signal into two paths, wherein the split received optical signal experiences a different optical transfer function in one of the two paths; two photodetectors each configured to detect power of one of the split received optical signals in each of the two paths to obtain corresponding electrical signals; and circuitry configured to perform electrical domain extraction of information associated with the received optical signal utilizing each of the corresponding electrical signals from the two paths, wherein the different optical transfer function provides additional information from the received optical signal utilized in optical field reconstruction via direct detection.

The received optical signal can be self-coherent (SC) complex double sideband (DSB). The different transfer function can be caused by a dispersive element or an interferometer. The received optical signal can include orthogonal offset carriers assisted polarization multiplexed single sideband signals. The different transfer function can be caused by a filter to reduce power of a carrier in one polarization. The circuitry can be configured to perform iterative signal-signal beating interference (SSBI) cancellation. The direct detection can be Kramers-Kronig (KK) detection. The asymmetric coherent receiver can further include analog-to-digital conversion to obtain the corresponding electrical signals. The circuitry can be a digital signal processor (DSP).

BRIEF DESCRIPTION OF THE DRAWINGS

The present disclosure is illustrated and described herein with reference to the various drawings, in which like reference numbers are used to denote like system components/method steps, as appropriate, and in which:

FIGS. 28A-28B are graphs of optical filter response (FIG. 28A) and spectrum of the received VSB signal (FIG. 28B).

FIG. 29 is pseudo-code of a filter response aware iterative KK (FA-iterKK) algorithm.

FIGS. 30A-30C are a schematic of an experimental setup for the FA-iterKK algorithm (FIG. 30A), a graph of measured optical filter response and measured spectra of DSB and VSB signals (FIG. 30B), and receiver DSP blocks (FIG. 30C).

DETAILED DESCRIPTION OF THE DISCLOSURE

Figure 1:
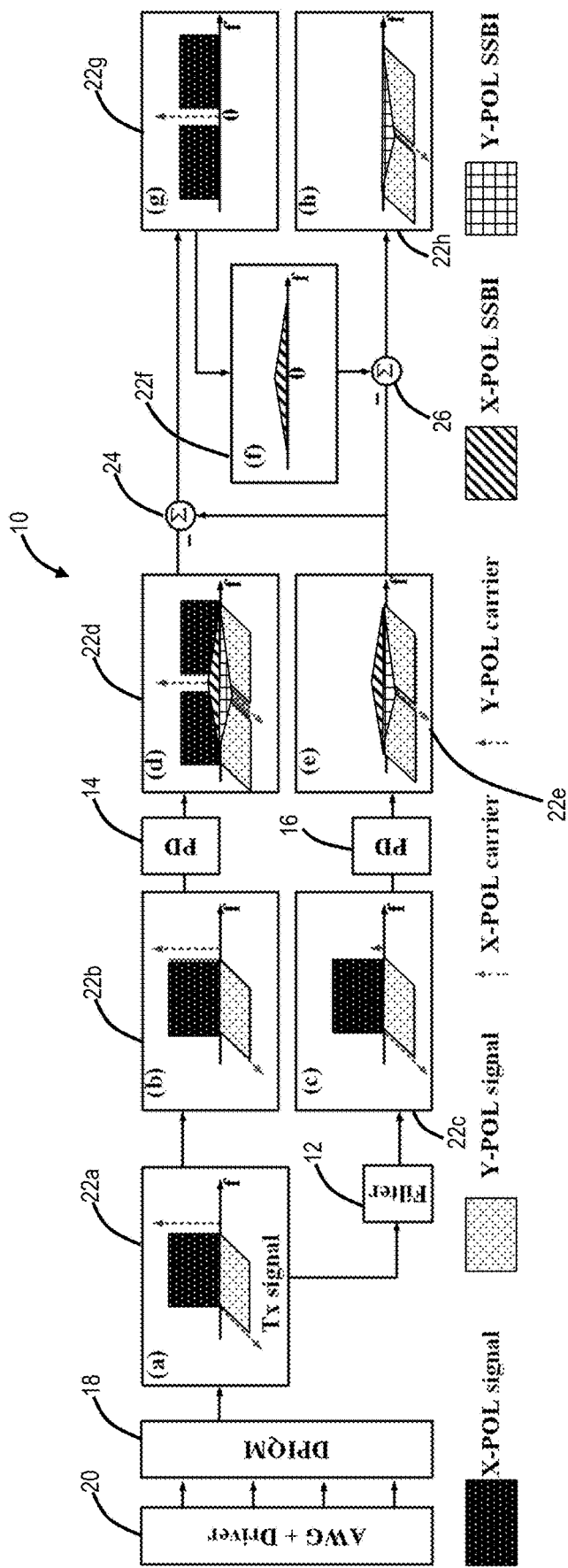
FIG. 1 is a diagram of the transmitted signal spectrum and the Rx signal spectrum evolution of a linearization process, according to an embodiment of the present disclosure.

Again, the present disclosure relates to systems and methods for asymmetric direct detection (ADD) of optical signals. The present disclosure includes a novel optical receiver architecture and functionality with reduced complexity, cost, power requirements, etc. that may be used in short-reach optical networking applications, e.g., metro, data center interconnection, up to 80 km, etc. Further, the proposed approach includes improved spectral efficiency. Variously, the present disclosure presents an approach in a receiver where a received optical signal is split into two paths with each path experiencing a different optical transfer function. Each path includes square law detection where the optical signal is converted to an electrical signal, followed by extraction, in the electrical domain, of information imposed on the optical field amplitude and phase. In an embodiment, asymmetric direct detection is described with orthogonal offset carriers assisted polarization multiplexed single sideband signals. For example, one polarization can include a filter to reduce the power of a carrier for the different optical transfer function. In another embodiment, asymmetric direct detection is described with an asymmetric self-coherent receiver that includes a double sideband (DSB) signal. For example, the different optical transfer functions can be via a dispersion element (DE), an interferometer, a filter, and the like. In a further embodiment, a filter response assisted iterative Kramers-Kronig (KK) process is described for vestigial sideband (VSB) systems.

§ 1.0 ASYMMETRIC DIRECT DETECTION OF ORTHOGONAL OFFSET CARRIERS ASSISTED POLARIZATION MULTIPLEXED SINGLE SIDEBAND SIGNALS

Intensity modulation direct detection (IMDD) schemes suffer from chromatic dispersion (CD) induced power fading in the C band [5-6], which can be lessened by transmitting a single side band (SSB) signal with higher spectral efficiency [7-9]. In addition, polarization division multiplexing (PDM) doubles the spectral efficiency such that fewer colors are required to reach the same aggregate capacity when PDM and WDM are employed simultaneously. This motivates a category of PDM-SSB schemes that involve the use of Stokes vector receivers (SVRs) [10-13]. In [10], Antonelli et al. propose a scheme that incorporates Kramers-Kronig (KK) detection [14-15] with PDM-SSB-SVR to retrieve the field information of X-Pol based on $|X|^2$ obtained from the Stokes parameters $S_0$ and $S_1$. The field of Y-Pol is obtained by dividing the field of X-Pol from the beating term $XY^*$ derived from $S_2$ and $S_3$. [11-12] proposed another scheme that cascades KK after polarization de-rotation to recover the PDM-SSB signal using the intensities $|X|^2$ and $|Y|^2$. Later in [13], the SSB signal at the Y-Pol in [10] is replaced by a complex double sideband (DSB) signal to improve the spectral efficiency. However, the hardware cost-saving of the PDM-SSB-SVR schemes is marginal, and an extra overhead is incurred to train a de-rotation matrix. [16] reported a filter-based alternative for PDM-SSB signal that employs a pair of filters, PDs, and ADCs at the receiver. That scheme uses a pair of sharp edge filters (800 dB/nm) and iterative DSP to mitigate the inter-polarization signal-signal beating interference (SSBI), which incurs delay.

Accordingly, an asymmetric direct detection (ADD) of polarization division multiplexed single side band (PDM-SSB) signals with orthogonal offset carriers is presented. ADD exploits the photocurrent difference to eliminate the Y-Pol interference in the X-Pol, and the X-Pol signal intensity to eliminate the X-Pol interference in the Y-Pol without resorting to iterative algorithms. This enables not only low complexity signal linearization but also a simplified receiver front-end composed of a single optical filter, two single-ended photodiodes, and two analog-to-digital converters (ADC). In the experiments, a parametric study is performed of the proposed scheme at 40 Gbaud in the back-to-back configuration (B2B) to evaluate the impact of different system parameters, including the carrier to signal power ratio (CSPR), the matched filter roll-off, and the filter guard band. Next, a 416 Gbit/s transmission of PDM 16 QAM signal over 80 km standard single-mode fiber (SSMF) is demonstrated at the soft-decision pre-FEC BER threshold of $2 \times 10^{-2}$. A multiple-input-multiple-output MIMO equalizer reduces polarization-dependent loss (PDL) inducedlinear crosstalk resulting from the non-orthogonal PDM-SSB signals and pre-conditions signals before subtraction for best effect The efficacy of a 2×2 instance of this function is modelled in view of potential on-chip integration of the scheme with more dominant PDL [17-19].

FIG. 1 is a diagram of a receiver 10 of the transmitted signal spectrum and the Rx signal spectrum evolution of a linearization process, according to an embodiment of the present disclosure. In an embodiment, the present disclosure includes a novel DD scheme for PDM-SSB signals having a reduced complexity asymmetric receiver front-end, including a single optical filter 12 (125 dB/nm), two single-ended PDs 14, 16, and two ADC channels (located after the PDs 14, 16, but not shown in FIG. 1). The proposed scheme improves the spectral efficiency compared to [16] by assigning a guard band only for the X-Pol as opposed to a guard band for each polarizations. Note, those skilled in the art will appreciate various functionality described herein with respect to the X-Pol and the Y-Pol could be reversed. That is, the choice of the guard band only for the X-Pol is a design choice, and it could as well be chosen from the Y-pol. In a generalization, the X-Pol can be a first polarization and the Y-Pol can be a second polarization, and the X and Y labels are presented in a logical sense to describe their relationship to one another. Moreover, the DSP developed to linearize the PDM-SSB signal does not require an iterative algorithm. At the receiver, the signal is split into two copies, with one copy being filtered to reduce the carrier power before direct detection, while the other copy is detected without filtering. The Y-Pol interference in the X-Pol is removed by exploiting the PD current difference, while the X-Pol SSBI in the Y-Pol is removed by the non-iterative estimate based on the intensity of the recovered X-Pol signal. The Y-Pol signal can subsequently be recovered by KK detection.

§ 1.1 Principle of the Proposed Scheme

The scheme principle is illustrated through a spectrum block diagram in FIG. 1. Block 22a shows the optical spectrum of the transmitted PDM-SSB signal with orthogonal offset carriers assigned on the opposite edges of the signal similar to [16]. This type of signal can be generated by a dual-pol IQ modulator (IQM) 18 driven by an amplified four-channel arbitrary waveform generator (AWG) 20 as in [12, 16, 20, 21]. In a working transceiver the AWG is replaced by digital to analog converters (DACs) instructing the two phases of each polarization of the desired optical field. Compared to [16], the spectral efficiency of the signal in the proposed scheme is improved since a guard band is assigned only in the X-Pol between the signal and the carrier. The generated signal is split into two copies at the receiver 10, where one copy is optically filtered to attenuate the X-Pol side carrier, while the other copy is detected without filtering as is depicted in blocks 22b, 22c, respectively. When the X-Pol carrier power is negligibly low after filtering, the baseband spectra after square-law detection are shown in blocks 22d, 22e, respectively. A subtraction 24 of the photocurrent between blocks 22d, 22e helps remove the interference from the Y-Pol, retaining only the linear term of the X-pol signal as shown in block 22g. The block 22g is used to recover the X-Pol signal as well as estimate the X-pol SSBI shown in block 22f. Then the block 22f is removed from the block 22e through subtraction 26 to create the difference signal containing only the intensity of the Y-Pol signal shown in block 22g, which can be recovered by KK detection.

To best describe the feasibility of the scheme, the transmitted signal is formulated as, $$E_T = \begin{pmatrix} T_X e^{jw_X t} + E_X \\ T_Y e^{j(-w_Y t)} + E_Y \end{pmatrix} + \begin{pmatrix} n_X \\ n_Y \end{pmatrix} \quad (1\text{-}1)$$

where $E_T$ represents the transmitted signal as a jones vector, $E_X$ and $E_Y$ represent the field of the X-Pol and Y-Pol, $T_X$ and $T_Y$ represent the carrier of X-Pol and Y-Pol, respectively, $w_X$ and $w_Y$ represent the upconversion frequency of the X-Pol carrier and Y-Pol carrier, respectively, and $n_X$ and $n_Y$ represent the in-band noise associated with $E_X$ and $E_Y$, respectively.

After square-law detection (i.e., by the photodetector 14, and between the blocks 22b, 22d), the photocurrent generated by the unfiltered signal can be expressed as, $$I_1 = |T_X|^2 + |E_X + n_X|^2 + 2T_X \text{Re}((E_X + n_X)e^{-jw_X t}) + |T_Y|^2 + |E_Y + n_Y|^2 + 2T_Y \text{Re}((E_Y + n_Y)e^{jw_Y t}) + n_{Th1} \quad (1\text{-}2)$$

where $n_{Th1}$ represents the combined electrical noise produced from the corresponding PD and ADC channel.

Similarly, after square law detection (i.e., by the photodetector 16, and between the blocks 22c, 22e), the photocurrent generated by the filtered signal can be expressed as $$I_2 = |\alpha T_X|^2 + |E_X + n_X|^2 + 2\alpha T_X \text{Re}((E_X + n_X)e^{-jw_X t}) + |T_Y|^2 + |E_Y + n_Y|^2 + 2T_Y \text{Re}((E_Y + n_Y)e^{-jw_Y t}) + n_{Th2} \quad (1\text{-}3)$$

where $n_{Th2}$ represents the electrical noise produced from the other PD and ADC channel and $\alpha$ characterizes the amount of residual carrier after filtering.

The subtraction of $I_1$ from $I_2$ gives $$I_1 - I_2 = (1-\alpha^2)|T_X|^2 + 2(1-\alpha)T_X \text{Re}((E_X + n_X)e^{-jw_X t}) + n_{Th3} \quad (1\text{-}4)$$

where $n_{Th3}$ represents the electric noise after subtraction.

The subtraction removes the common-mode signal of the photocurrents, including the Y-Pol signal intensity $|T_Y|^2 + |E_Y + n_Y|^2 + 2T_Y \text{Re}((E_Y + n_Y)e^{jw_Y t})$ as well as the X-pol SSBI $|E_X + n_X|^2$, leaving only the desired linear term $E_X$ and the direct current (DC) term, which can be removed for subsequent recovery.

The Y-pol signal recovery DSP depends on the sharpness of the optical filter. When a sharp optical filter is used, the linearization DSP can be further simplified with $\alpha$ set to zero such that the X-Pol SSBI can be estimated using the recovered X-Pol signal and then removed in Eq. (1-3) for subsequent KK recovery of $E_Y$. Whereas when a slow roll-off filter is employed, $\alpha$ needs to be optimized to estimate the undesired linear crosstalk term $2\alpha T_X \text{Re}((E_X + n_X)e^{-jw_X t})$ in Eq. (1-3). For simplicity of explanation a is treated as a constant but in real implementations it may be frequency dependent in which case it would be replaced by the action of a finite impulse response (FIR) filter since the frequency responses of the PDs are different and the filter could attenuate the signal spectrum close to the carrier due to a limited filter edge slope. Moreover, the overall signal-to-noise ratio (SNR) of the PDM-SSB signal degrades as $\alpha$ increases. This is due to the decreased linear term of $E_X$ relative to the PD and ADC noise $n_{Th3}$ in Eq. (1-4); this leads to a reduced SNR for the recovered $E_X$ signal. The SNR of $E_Y$ is reduced as well since the estimate of the X-Pol SSBI $|E_X + n_X|^2$ in Eq. (1-3) relies on the SNR of $E_X$.

The impact of the distributed component polarization-dependent loss (PDL) is often not negligible in systems composed of discrete components, and this effect degrades the performance by depolarizing the PDM-SSB signals. This is especially important for a potential silicon photonic on-chip integration of the proposed scheme where the orthogonal transverse electric (TE) and transverse magnetic (TM) modes are subjected to different propagation losses and insertion losses due to the asymmetric silicon waveguide cross-section [17-19]. The non-orthogonal PDM-SSB signal can be expressed as $$E_T = \begin{pmatrix} T_X e^{jw_X t} + E_X + \cos(\theta)(T_Y e^{-jw_Y t} + E_Y) \\ \sin(\theta)(T_Y e^{-jw_Y t} + E_Y) \end{pmatrix} + \begin{pmatrix} n_X \\ n_Y \end{pmatrix} \quad (1\text{-}5)$$

where $\theta$ represents the angle between the depolarized SOPs.

By denoting the terms $E_X + \cos(\theta)(T_Y e^{j(-w_Y t)} + E_Y)$ as $E_X'$, Eq. (1-5) can be expressed as, $$E_T = \begin{pmatrix} T_X e^{jw_X t} + E_X' \\ \sin(\theta)(T_Y e^{j(-w_Y t)} + E_Y) \end{pmatrix} + \begin{pmatrix} n_X \\ n_Y \end{pmatrix} \quad (1\text{-}6)$$

which achieves a similar form as Eq. (1-1).

The linear crosstalk between $E_X'$ and $E_Y$ can be resolved by means of a MIMO equalizer. Due to the use of separate lasers to generate the orthogonal offset carriers and the PDM-SSB signal, respectively, the frequency offsets (FO) corresponding to the signal and the inter-polarization linear crosstalk are different. While the FO of the signal is compensated for, the FO of the inter-polarization linear crosstalk is not. This can impede the linear crosstalk mitigation by the use of a MIMO equalizer. A numerical study was conducted to investigate the effectiveness of a 2×2 MIMO in mitigating the linear crosstalk for digitally generated orthogonal offset carriers.

§ 1.2 Experimental Setup and DSP

Figure 2A:
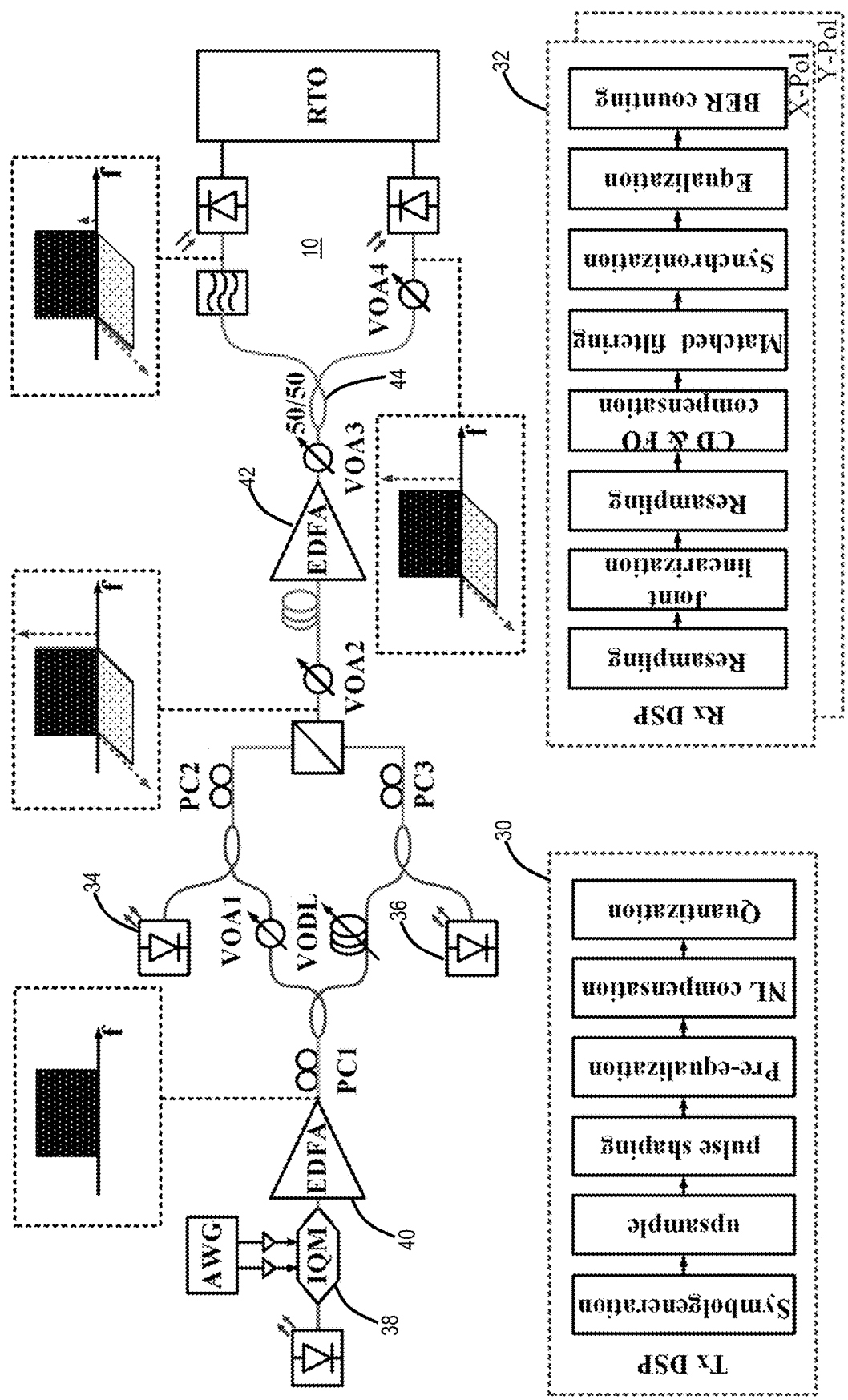
FIG. 2A is a diagram of an experimental setup and DSP flow of the proposed scheme.

FIG. 2A shows the experimental setup and the DSP flow in a Tx DSP 30 and a Rx DSP 32 with the polarization-maintaining components (shown between the PC1, PC2, and PC3, wherein PC is a polarization controller), including the patch cord, power splitter, and power combiner. The digital generation of the offset carriers requires stringent amplitude and phase match at the carrier frequency (>30 GHz) between the entire I and Q transmitter channel and needs fine-tuning each time the carrier frequency changes with the symbol rate. If the image carrier is not effectively attenuated, additional interference terms are incurred, and higher bandwidth is required to receive the signal.

In the experiment, separate lasers 34, 36 are used to generate the orthogonal offset carriers as in [16] for the proof-of-concept. An alternative scheme is to split the AWG clock to generate the offset carriers using Radio Frequency (RF) multipliers and quadrature hybrid couplers, which takes full use of the AWG effective number of bits (ENOB) and does not require frequency offset compensation. An IQ modulator 38 (30 GHz E-O bandwidth) biased at the null point is driven by the linearly amplified RF signals generated by an 8-bit AWG to modulate the 1550.12 nm optical carrier from an external cavity laser (ECL). The RF power amplifier possesses a 3-dB bandwidth of 42 GHz. An EDFA 40 follows to boost the signal power for CSPR control. Next, the SOP of the signal is aligned with the SOP of two separate lasers that generate the orthogonal offset carriers using a polarization controller (PC).

The PDM signal is created through a polarization emulator, including a power splitter, a variable optical delay line (VODL), a variable optical attenuator (VOA), and a polarization beam combiner (PBC). The decorrelation delay between the orthogonal SOPs is fine-tuned to correspond to an integer number of symbols depending on the symbol rate. After transmission, a pre-amplifier 42 and a VOA are used to optimize the received optical power before electrical to optical conversion. At the receiver 10, the signal is split into two branches by a 50/50 power splitter 44. The signal in the upper branch is filtered by a Santec OTF-350 filter with a 125 dB/nm edge roll-off and then detected by a 50 GHz 3-dB bandwidth single-ended PD without a trans-impedance amplifier (TIA). The signal in the lower branch is attenuated by the same amount of power equivalent to the insertion loss of the filter in the upper branch before the PD. Finally, the waveforms are sampled and stored by a 160 GSa/s 8-bit real-time oscilloscope (RTO) with 63 GHz bandwidth for offline DSP processing.

The Tx DSP 30 generates 16-QAM symbols, which are upsampled to the AWG sampling rate of 88 GSa/s for pulse shaping via a root-raised cosine (RRC) filter. Then a pair of pre-emphasis filters are applied to compensate for the low-pass frequency response of the transmitter for both quadratures. After compensating the sinusoidal nonlinearity of the modulator, the signal is quantized and sent to the AWG memory for digital to analog signal conversion.

At the receiver 10, the sampled waveforms are resampled to 3 samples per symbol. Next, the PDM-SSB signal is linearized jointly following the process described later, downconverted to the baseband, and resampled to 2 samples per symbol. After compensating for CD, the frequency offset (FO) is compensated based on the 4th-power method [22]. The signal is then matched-filtered and synchronized for time-domain equalization. Since separate lasers are used to generate the carriers and the signal, MIMO equalization cannot mitigate the linear crosstalk of the other SOP because of the uncompensated FO of the crosstalk. In the experiment, a phase-locked loop (PLL) interleaved single-input and single-output (SISO) feedforward equalizer (FFE) is employed to compensate for the ISI and phase noise simultaneously. The equalizer uses a sequence of training symbols to update the finite impulse response (FIR) filter taps using the least mean square (LMS) method before switching to decision-directed operation for data symbols. The equalizer filter contains 71 T/2-spaced taps, where T is the symbol duration. Finally, the symbols are determined and decoded for BER counting.

Figure 2B:
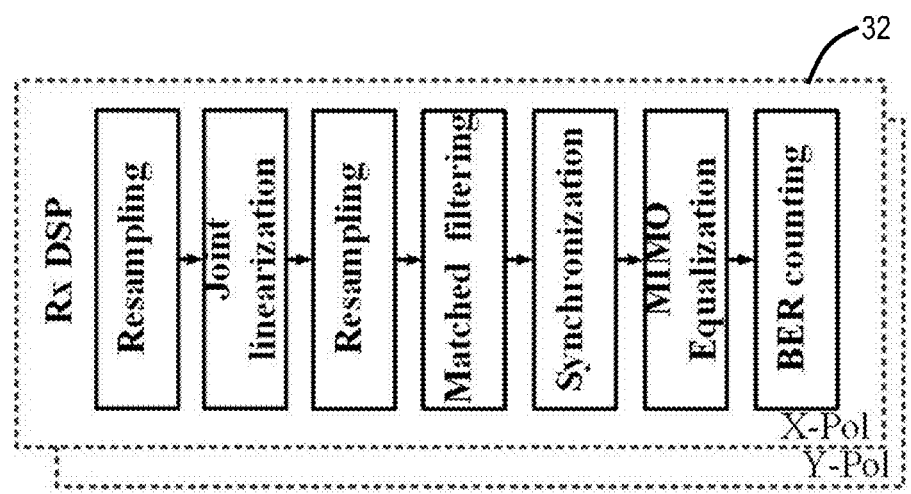
FIG. 2B is a block diagram of the Rx DSP when the offset carriers are generated digitally.

FIG. 2B is a block diagram of the Rx DSP when the offset carriers are generated digitally. When the orthogonal offset carriers are generated digitally, a MIMO equalizer in the receiver DSP 43 can be used to mitigate the inter-polarization crosstalk which can be induced by PDL.

§ 1.3 Results and Discussion

§ 1.3.1 Parametric Study at 40 Gbaud B2B

Figure 3A:
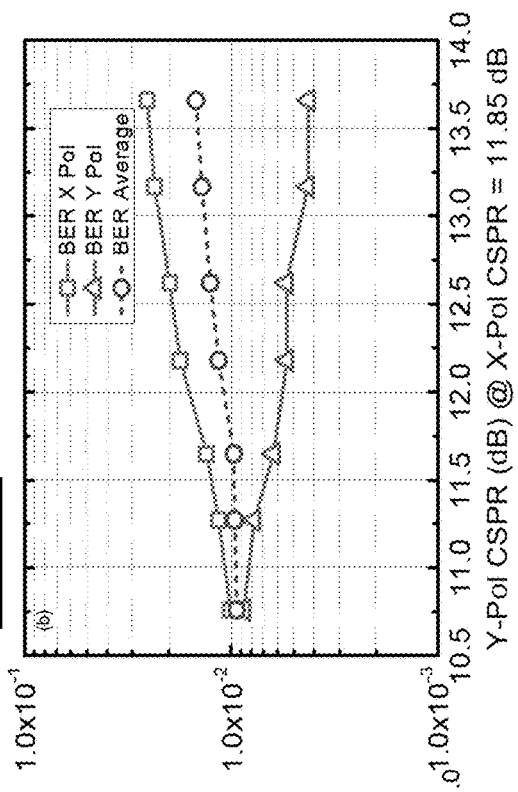
FIGS. 3A-3D are graphs of a signal spectrum before and after optical filtering (FIG. 3A), and BER as a function of the Y-Pol carrier to signal power ratio (CSPR) when X-Pol CSPR equals to 11.85 dB, 14.24 dB, and 16.39 dB, respectively (FIGS. 3B-3D).
Figure 3B:
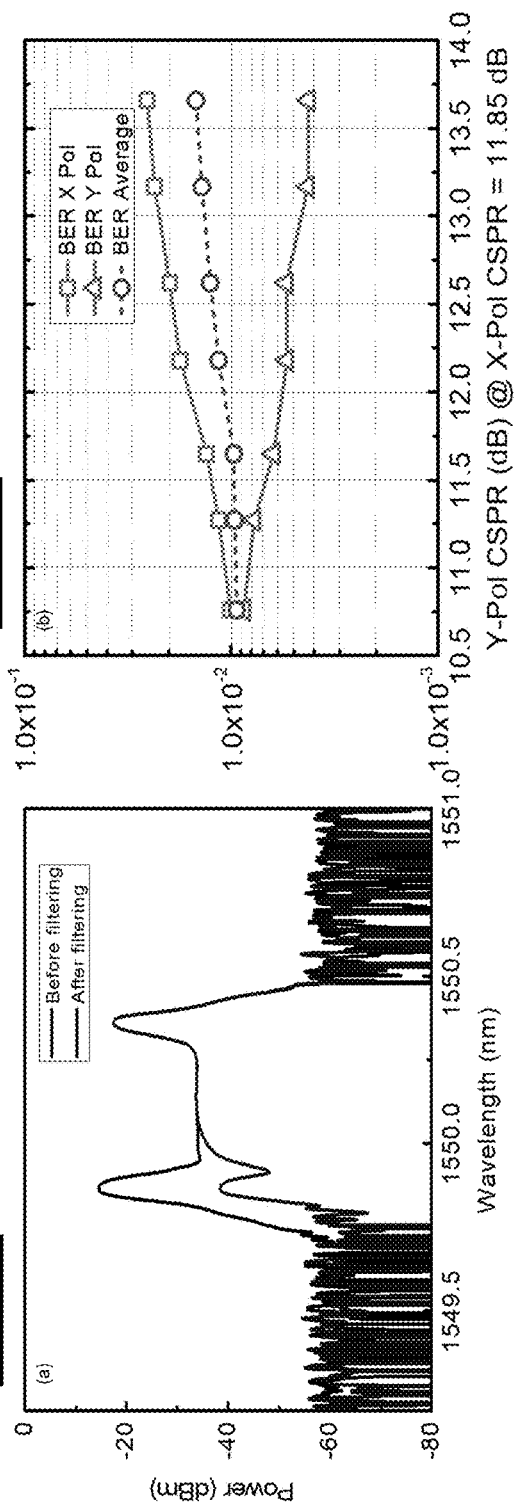
Figure 3C:
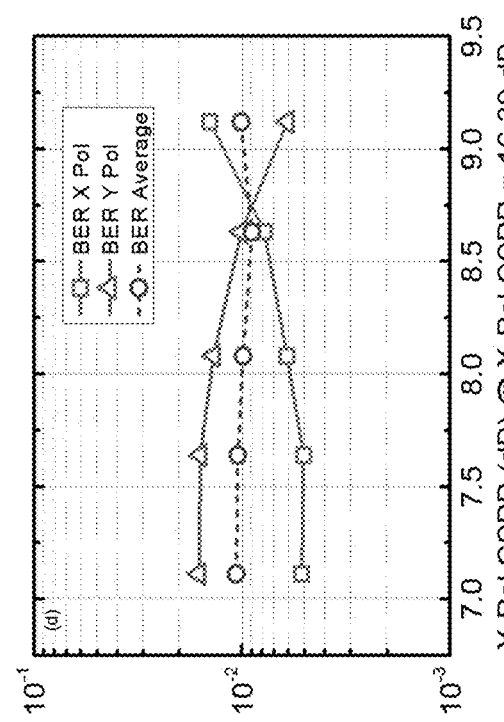
Figure 3D:
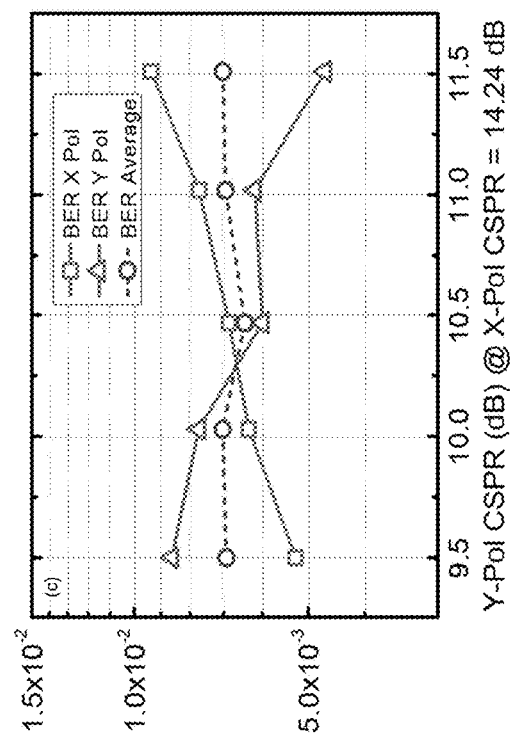

First, a parametric study was conducted at 40 Gbaud in B2B on the impact of system parameters, including the CSPR of each SOP, the roll-off factor of the RRC filter, and the guard band size. First, the CSPR is swept for each SOP with the roll-off factor and the signal-carrier guard band set to 0.1 and 13 GHz, respectively. Herein the CSPR is defined as the carrier power to signal power ratio per polarization. The optical filter is tuned to attenuate only the X-Pol carrier as much as possible without filtering the X-Pol signal. This helps improve the signal SNR, as discussed before. The optical spectrum before and after filtering is shown in FIG. 3A, where substantial attenuation of the X-Pol carrier is observed. FIGS. 3B-3D show the BER as a function of the Y-Pol CSPR when the X-Pol CSPR takes 11.85 dB, 14.24 dB, 16.39 dB, respectively. It is consistently found that the X-Pol BER increases with the Y-Pol CSPR, which is due to the enhanced inter-polarization crosstalk in the X-Pol induced by distributed component PDL and the limited polarization extinction ratio of the PBC. By comparison, the Y-Pol BER reduces as the Y-Pol CSPR increases due to better satisfaction of the minimum phase criterion for KK detection. Though the BER versus CSPR divergence of the X-Pol and Y-Pol is observed in FIGS. 3A-3D, it should be noted that the aggregate BER is the average BER of the orthogonal SOPs when the bits of the two polarizations are interleaved and decoded together using one FEC decoder. Therefore, the average BER should be kept below the FEC threshold for error-free BER after decoding. Among the three different X-Pol CSPR values, it is found that 14.24 dB corresponds to the minimum average BER. A lower X-Pol CSPR renders the X-Pol signal more vulnerable to the Y-Pol crosstalk, whereas a higher X-Pol CSPR also degrades the signal SNR because of the decreased signal power after optical amplification due to stronger carrier power.

Figure 4:
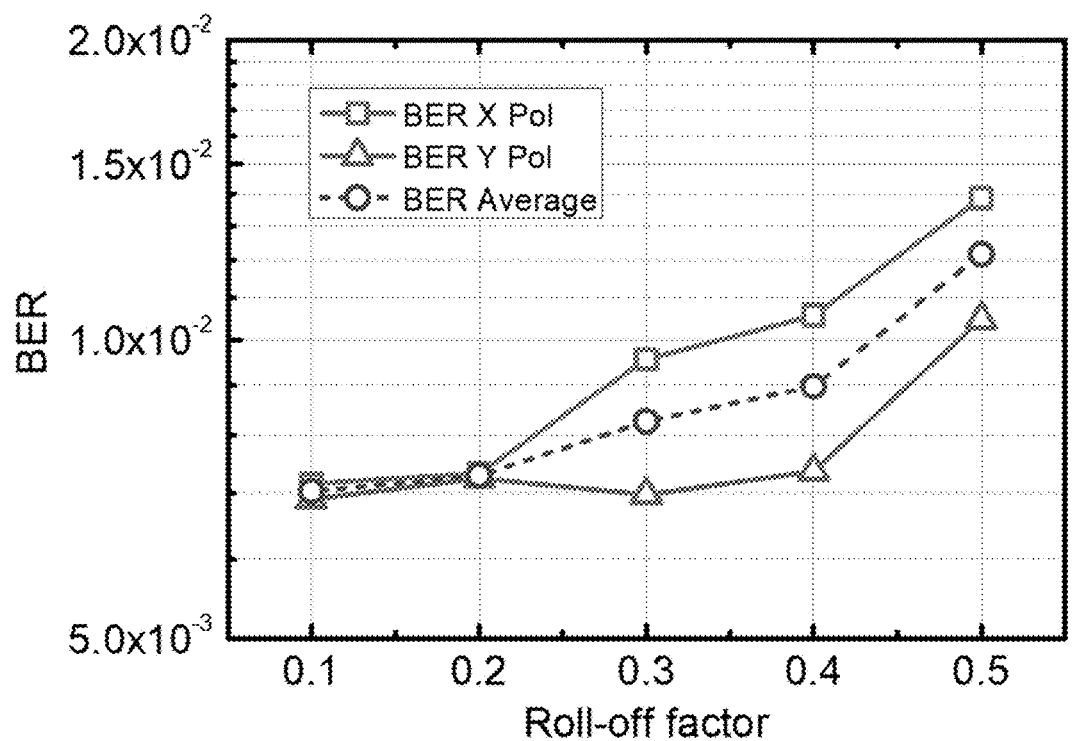
FIG. 4 is a graph of BER as a function of the RRC filter roll-off factor.

With the X pol CSPR and Y pol CSPRs set to 14.24 dB and 10.47 dB, respectively, the BER change with the RRC roll-off factors is measured with the X-Pol carrier set away from the zero frequency by 35 GHz. FIG. 4 plots the BER as a function of the RRC filter roll-off factor. It can be observed that as the roll-off factor of the RRC filter increases, the average BER increases, and the X-Pol BER and Y-Pol BER diverges. This is caused by stronger signal filtering when the roll-off factor increases. As the roll-off factor increases, so too does the amount of extra bandwidth consumed, and thus the signal is more vulnerable to optical filtering. This not only detrimentally affects the effectiveness of the Y-Pol interference removal through the subtraction of the PD photocurrents, but also further degrades the X-Pol SSBI estimate. Hence, an RRC roll-off factor of 0.1 was selected for the remainder of the following study.

Figure 5:
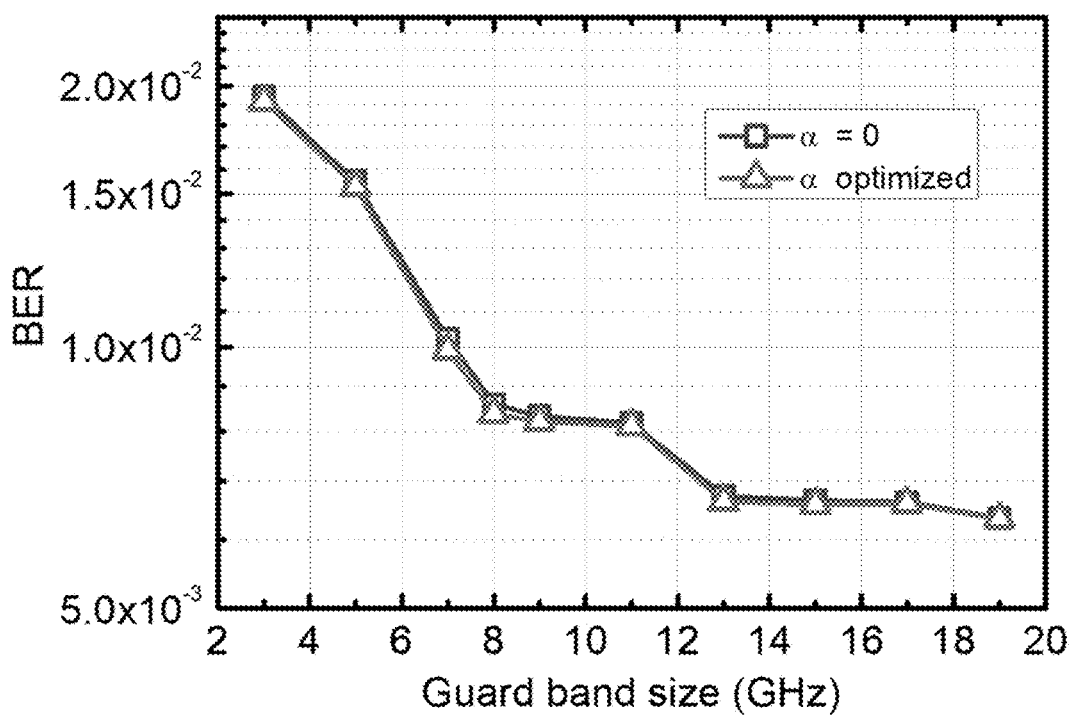
FIG. 5 is a graph of average BER versus the guard band size when a is set to either zero or an optimized value.

Next, the tolerance of the system performance to a narrow guard band was studied. FIG. 5 plots the average PDM signal BER as a function of the guard band size. The two curves in FIG. 5 corresponds to the coefficient $\alpha$ in Eq. (1-4) set to zero and an optimized value, respectively. For both cases, the average BER drops with an enlarging guard band since the X-Pol carrier is better suppressed, and the undesired signal filtering is relaxed. A steep BER increase occurs for guard bands smaller than 8 GHz, and a stable minimum BER is reached after the guard band surpasses 13 GHz. It can also be observed that the average BER with optimized $\alpha$ is slightly smaller compared to $\alpha$ at zero, which is attributable to the removal of the linear X-Pol crosstalk in addition to the X-Pol SSBI while recovering the Y-Pol signal. However, the BER improvement is negligible in the experiment indicating the X-Pol SSBI is the dominant crosstalk in this experiment. This means that $\alpha$ can be set to zero with a trivial penalty, which simplifies the DSP.

Figures 6A, 6B:
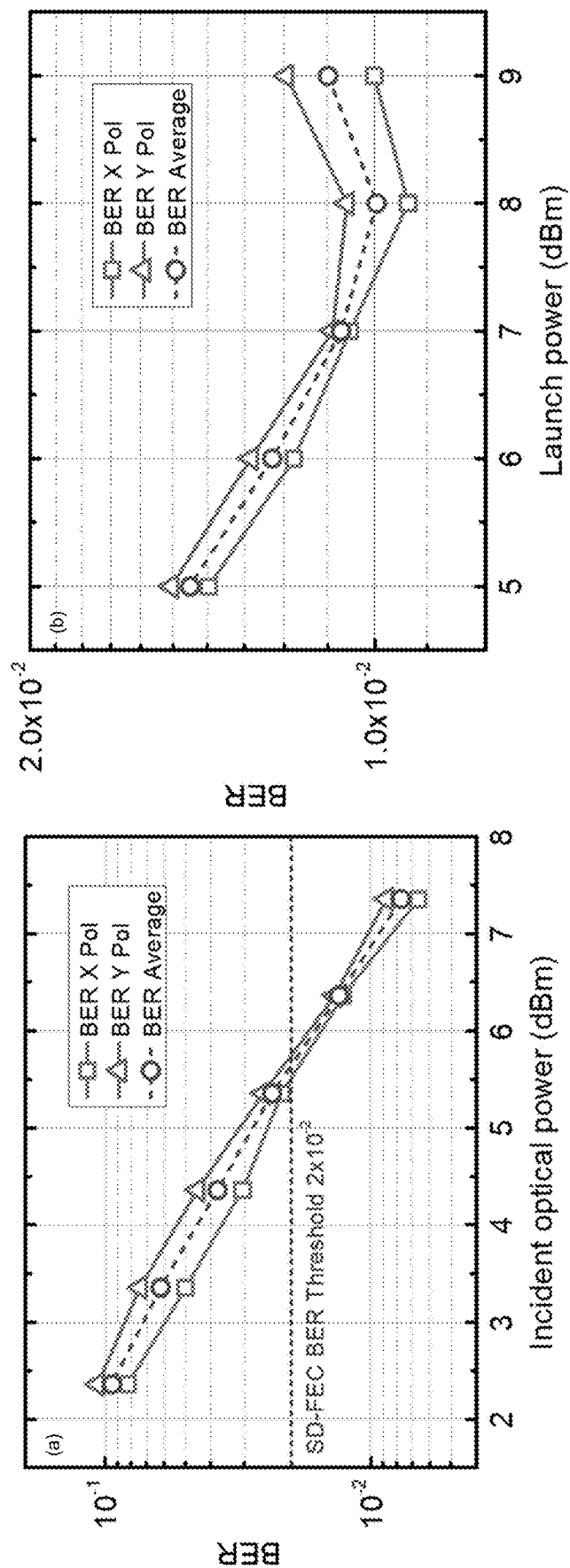
FIGS. 6A-6B are graphs of BER as a function of the input optical power (IOP) in a back-to-back (B2B) configuration (FIG. 6A), and BER as a function of launch power after 80 km (FIG. 6B).

The pre-amplifier and VOA are then used to find the optimum incident optical power (IOP) to the single-ended PD in B2B. FIG. 6A plots the BER as a function of the PD IOP of the unfiltered branch in B2B. It is shown in FIG. 6A that as the PD IOP increases, the BER decreases with more converged performance between two polarizations. This is ascribed to the more dominant signal power relative to the power of the electrical noise produced by the PD and ADC, which improves the signal SNR. As a result, the IOP is selected as 7.4 dBm for the remainder of the following study.

Next, a transmission experiment is carried out over 80 km SSMF to optimize the launch power. FIG. 6B plots the BER as a function of the launch power. As shown in FIG. 6B, the lowest average BER is obtained at a launch power of 8 dBm. Higher launch power will exacerbate the fiber nonlinear effects, while lower launch power will undesirably increase the noise from the receive EDFA. Therefore, 8 dBm is chosen as the optimum launch power.

§ 1.3.2 Maximizing the System Throughput Over 80 km SSMF

With the optimized IOP and launch power, the capacity limit of the proposed scheme over 80 SSMF is explored using the experimental setup. The X-Pol carrier is fixed at 35 GHz away from the zero frequency for all the symbol rates. The carrier cannot be set to higher frequencies for symbol rates higher than 52 Gbaud due to the 63-GHz brick wall bandwidth of the RTO. The matched filter roll-off is 0.1, and the CSPRs of X-Pol and Y-Pol are fine-tuned around 14.24 dB and 10.47 dB to achieve the minimum average BER depending on the symbol rate, respectively.

Figure 7:
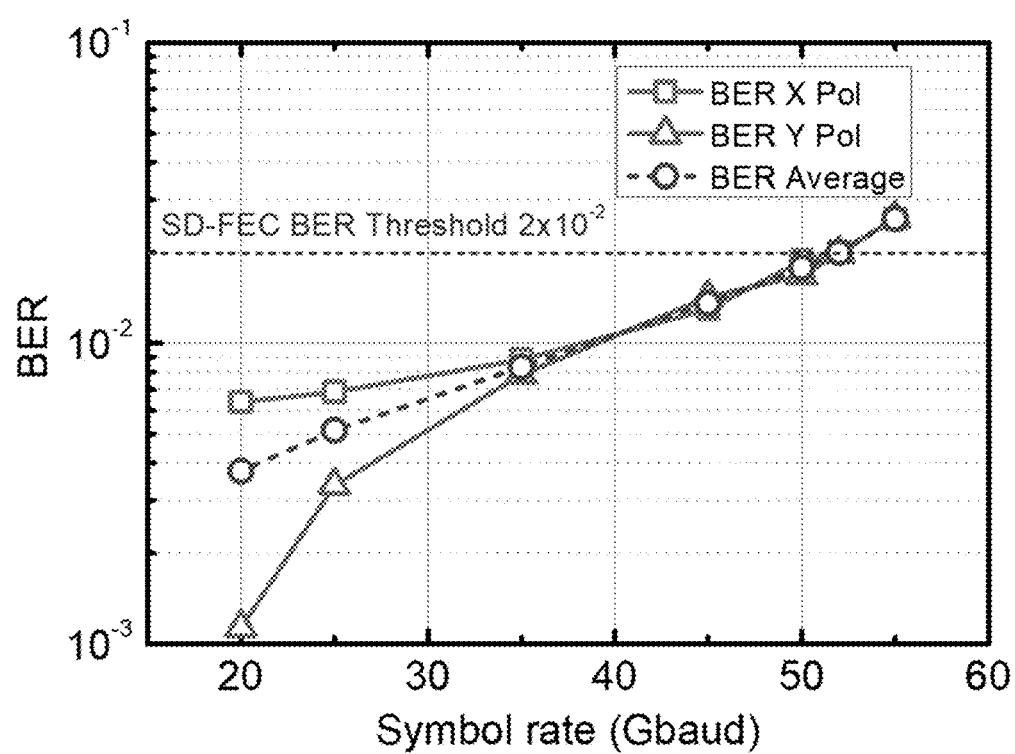
FIG. 7 is a graph of BER versus symbol rate for both X and Y polarizations.

FIG. 7 plots the BER as a function of the symbol rate. As the symbol rate increases from 20 Gbaud to 55 Gbaud, the guard band decreases from 24 GHz to 4.75 GHz, which introduces extra SNR penalty at the higher symbol rate. By using an interleaved FEC encoder, the system can operate up to 52 Gbaud over 80 km SSMF with the average BER below the SD-FEC threshold of $2 \times 10^{-2}$, corresponding to a throughput of 346.6 Gbit/s (raw bit rate 416 Gbit/s) after removing the 20% FEC overhead.

Figures 8A, 8B:
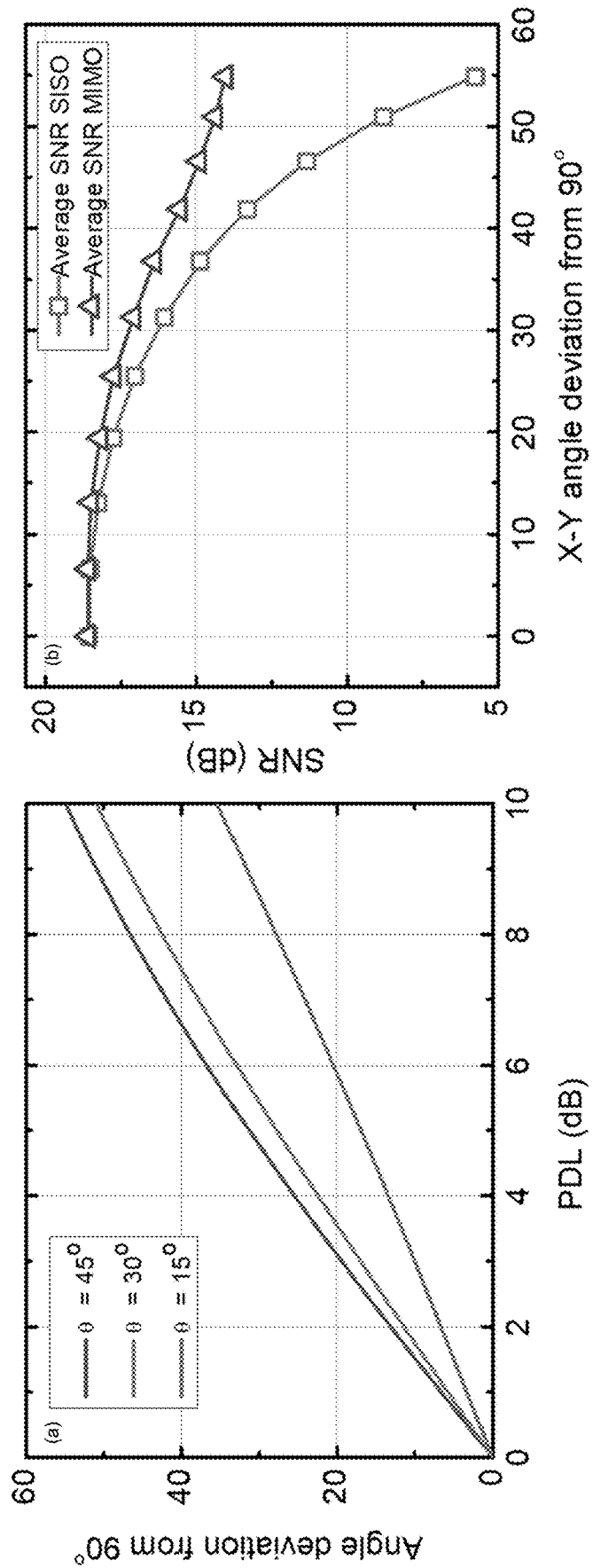
FIGS. 8A-8B are graphs of Angle deviation from 90° versus the polarization dependent loss (PDL) in dB (FIG. 8A), and Aggregate SNR versus X-Y angle deviation from 90° (FIG. 8B).

A numerical study of a 2×2 MIMO equalizer in mitigating the linear crosstalk resulting from the non-orthogonal PDM-SSB signals induced by PDL was also performed. Herein a lumped PDL emulator with constant PDL value is used in the simulation at 40 Gbaud in B2B. FIG. 8A plots the angle deviation from 90° as a function of the PDL value when the angle θ between the SOPs and the main axis of the emulator equals to 0°, 15°, 45°. Since the angle deviation from 90° for a specific PDL is symmetric over θ=45°, the curves with θ larger than 45° are not plotted in FIG. 8A. In addition, θ=45° corresponds to the largest angle deviation from 90°. FIG. 8B plot the aggregate PDM signal SNR after SISO/MIMO equalization as a function of the angle deviation from 90°. It can be observed that the signal SNRs decrease with enlarging angle deviation for both SISO and MIMO equalization, but the MIMO equalization leads to higher signal SNR over the SISO counterpart with more than 6 dB SNR gain for angle deviations over 50°. This demonstrates the effectiveness of the 2×2 MIMO in mitigating the linear crosstalk for a single carrier PDM SSB signal. Taking the constant PDL as the worst PDL instance with an occurrence probability of $10^{-5}$, the MIMO and the SISO equalizer have the 1 dB SNR penalty tolerance to mean PDL of 1.33 dB and 1.02 dB, respectively [23].

§ 1.4 an Asymmetric Direct Detection (ADD) Process

Figure 9:
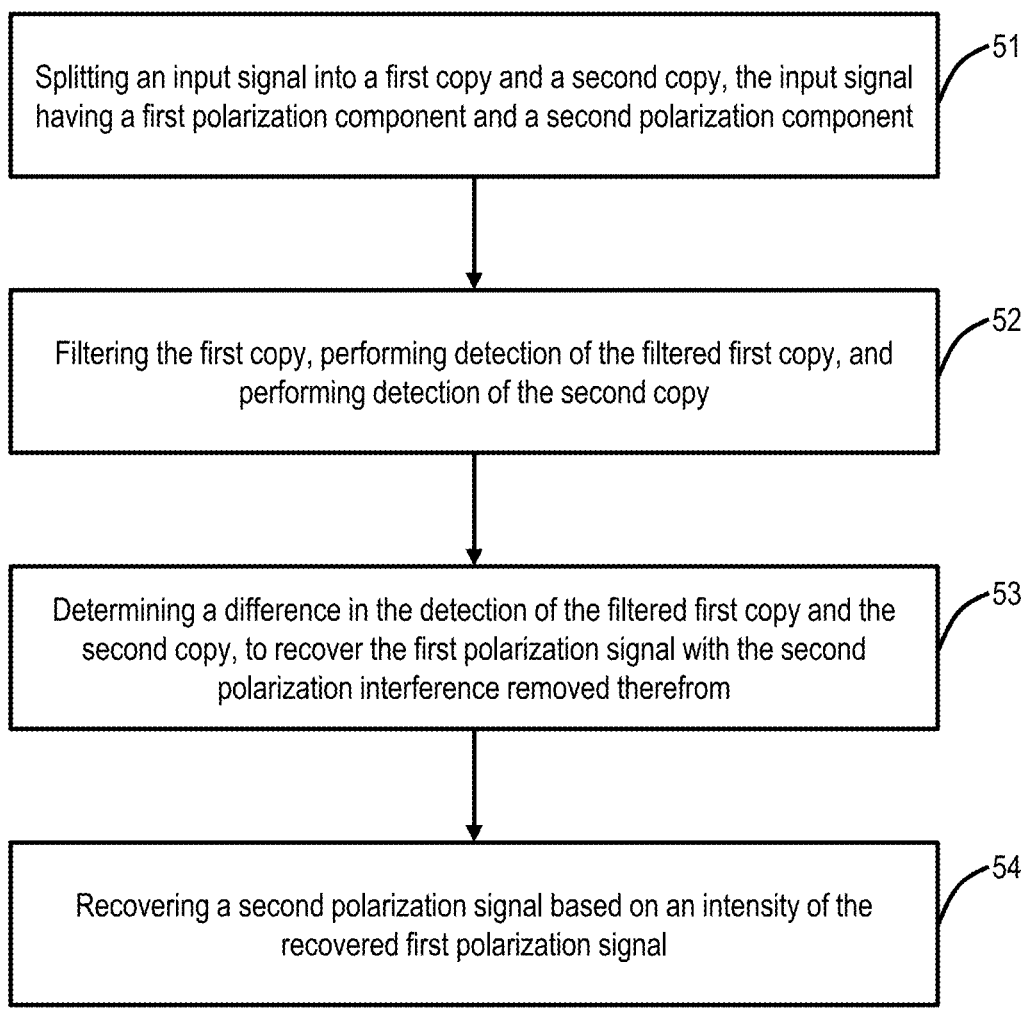
FIG. 9 is a flowchart of an asymmetric direct detection (ADD) process of polarization division multiplexed single side band (PDM-SSB) signals with orthogonal offset, implemented in a receiver.

FIG. 9 is a flowchart of an asymmetric direct detection (ADD) process 50 of polarization division multiplexed single side band (PDM-SSB) signals, implemented in a receiver. Again, in a generalization, the X-Pol can be the first polarization, and the Y-Pol can be a second polarization, and the X and Y labels are presented in a logical sense to describe their relationship to one another The process includes splitting an input signal into a first copy and a second copy, the input signal having a first polarization component and a second polarization component; filtering the first copy, performing detection of the filtered first copy, and performing detection of the second copy; determining a difference in the detection of the filtered first copy and the second copy, to recover a first polarization signal with second polarization interference removed therefrom; and recovering a second polarization signal based on an intensity of the recovered first polarization signal.

The input signal can have a guard band only for the first polarization component as opposed to a guard band for each polarization. The first copy can be filtered to attenuate a first polarization side carrier. The first copy can be filtered to attenuate only the first polarization side carrier as much as possible without filtering the first polarization signal. The difference can be based on a photodiode current difference. The removing second polarization interference can include subtraction of the photodiode current difference to retain only a linear term of the first polarization component. The second polarization signal can be recovered by Kramers-Kronig (KK) detection. The first polarization interference can be removed using a non-iterative estimate based on the intensity of the recovered first polarization signal.

In another embodiment, an asymmetric direct detection (ADD) system of polarization division multiplexed single side band (PDM-SSB) signals includes an optical front end configured to split an input signal into a first copy and a second copy, the input signal having a first polarization component and a second polarization component; a filter configured to filter the first copy; a first photodiode configured to detect the filtered first copy; a second photodiode configured to detect the second copy; and circuitry configured to determine a difference in the detection of the filtered first copy and the second copy, to recover a first polarization signal with second polarization interference removed therefrom, and recover a second polarization signal based on an intensity of the recovered first polarization signal.

In a further embodiment, a circuit is configured for asymmetric direct detection (ADD) system of polarization division multiplexed single sideband (PDM-SSB) signals. The circuit is configured to, for an optical input signal having a first polarization component and a second polarization component, determine a difference in detection of a filtered first copy of the optical input signal and a second copy of the optical input signal, to recover a first polarization signal with the second polarization interference removed therefrom, and recover a second polarization signal based on an intensity of the recovered X first polarization signal, utilizing Kramers-Kronig (KK) detection.

§ 1.5 Conclusion

Again, the present disclosure includes a novel DD scheme for PDM-SSB signaling featuring a simple asymmetric receiver structure with reduced hardware comprising of a single filter, two single-ended PDs, and two ADC channels. A low-complexity algorithm is developed to linearize the PDM signal by exploiting the PD current difference to remove the unwanted inter-polarization interference. The feasibility of the scheme is verified by a proof-of-concept experiment where 416 Gb/s (346.6 Gb/s net rate) transmission over 80 km SSMF is achieved with the aggregate BER below the SD-FEC threshold of $2 \times 10^{-2}$. It is also revealed by a detailed parametric study that the coefficient α linked to the X-Pol SSBI estimation can be set to zero with negligible SNR penalty, which further reduces the complexity of the linearization DSP. Finally, it is found that a 2×2 MIMO equalizer can improve the system performance by mitigating the PDL induced linear crosstalk.

§ 1.6 Other Ways to Improve the Receiver Electrical Spectral Efficiency

Figure 10:
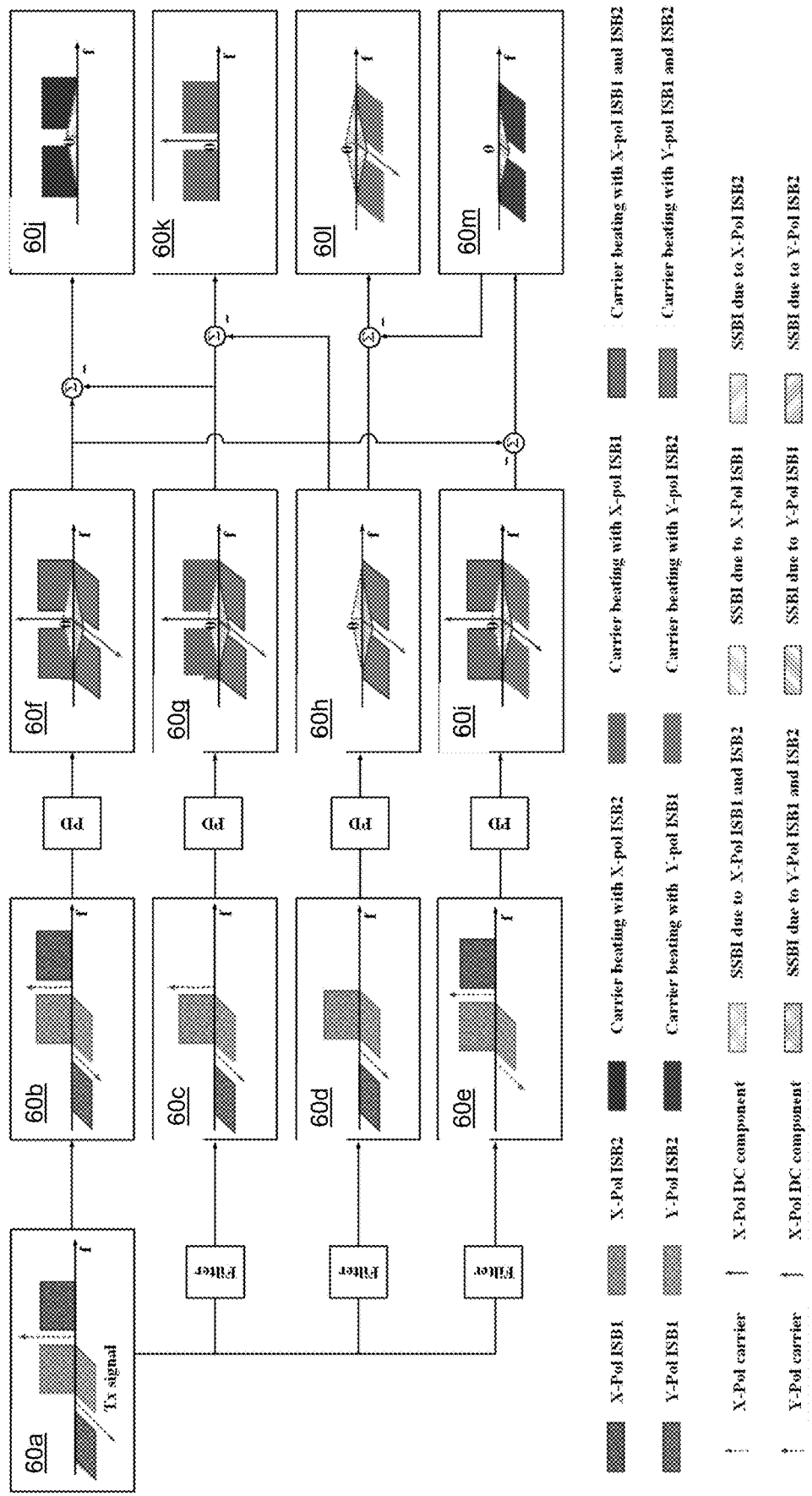
FIG. 10 is a diagram of a receiver for dual-pol double independent sideband (ISB) signals using four filters for doubling the electrical spectral efficiency (ESE) of the scheme in FIG. 1.

The electrical spectral efficiency (ESE) of the scheme in FIG. 1 can be further doubled by a receiving scheme described as follows. FIG. 10 depicts the schematic of the receiver and the signal linearization DSP. Block 60a is the dual-pol signal detected by the receiver. The signal is comprised of two independent sidebands (ISB) and one carrier for each polarization. The receiver detects four signal copies, i.e. the all-pass signal in block 60b, the signal with the X-Pol ISB2 filtered, the signal with both the X-Pol ISB2 and carrier filtered, and the signal with the Y-Pol ISB1 filtered. The corresponding signal spectrums in the electrical domain are shown in blocks 60f-60i, respectively. The difference between blocks 60g, 60f is the carrier beating with the X-Pol ISB2 and its SSBI, whereas the difference between blocks 60h, 60g gives the carrier beating with the X-Pol ISB1 and a DC component. As for the Y-Pol ISBs, the difference between blocks 60f, 60i is the Y-Pol ISB1 and its SSBI, whereas the difference between blocks 60m, 60h is the Y-Pol ISB 2, its SSBI, the Y-Pol DC component and the SSBI of the X-Pol ISB1. Note that the X-Pol ISB1 can be estimated from block 60k and subtracted from block 60l. After the linearization, the field of the ISB signals can be reconstructed using the KK recovery algorithm. Note that the DC component can be estimated and recovered for blocks 60j, 60l.

Figure 11:
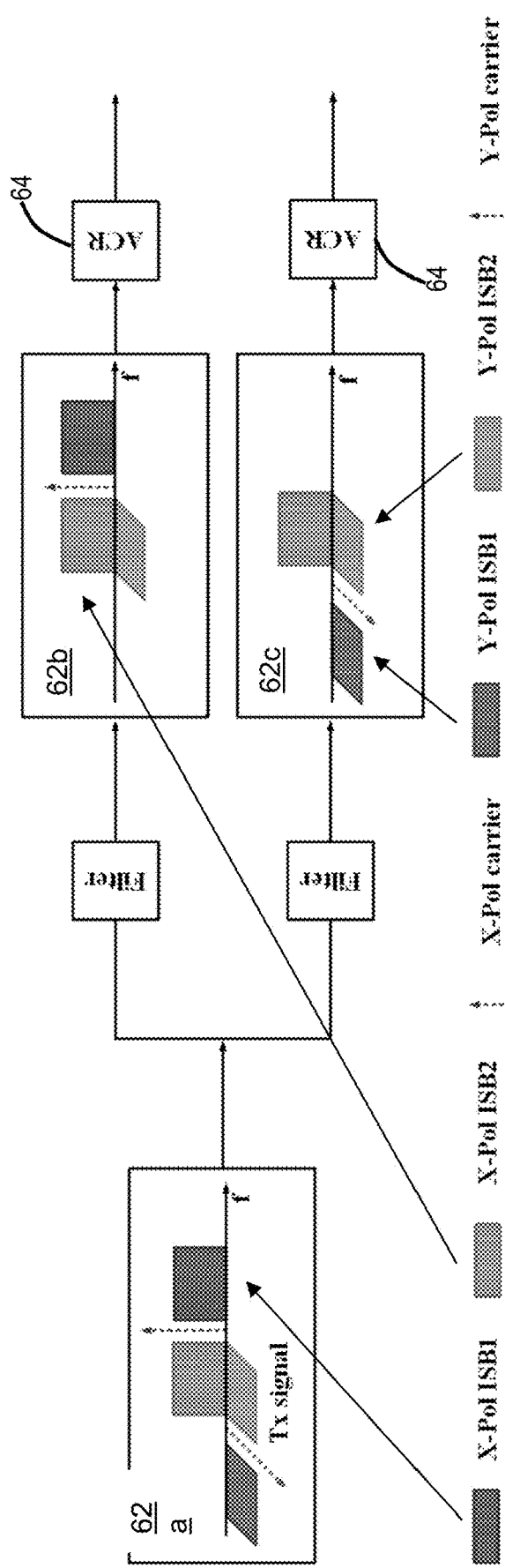
FIG. 11 is a diagram of an asymmetric coherent receiver (ACR)-based receiver for dual-pol double ISB signals.

Another receiving scheme for the dual-pol signal in the block 60a is depicted in FIG. 11. The received signal is split into two copies at the receiver (after block 62a). The upper copy is filtered to remove the Y-Pol carrier and ISB1 (block 62b), whereas the lower copy is filtered to remove the X-Pol carrier and ISB2 (block 62c). The filtered signals are then fed to two asymmetric coherent receivers (ACR) 64, 66. ACR can be realized in different ways, which exploits the photocurrent difference to recover the field of single-pol complex DSB signals.

§ 1.7 Reduction in the Optical Filter Out-of-Band Slope Requirements

It is possible to reduce the optical filter out-of-band slope requirements. In FIG. 1, if you have a lower slope on the filter 12 that allows the X-pol carrier to get through, it is still possible to isolate the X-pol spectrum from the all-pass arm but with lesser amplitude (because one would be subtracting Y-Pol and a portion of the X-pol from the all-pass spectrum).

Figure 12A:
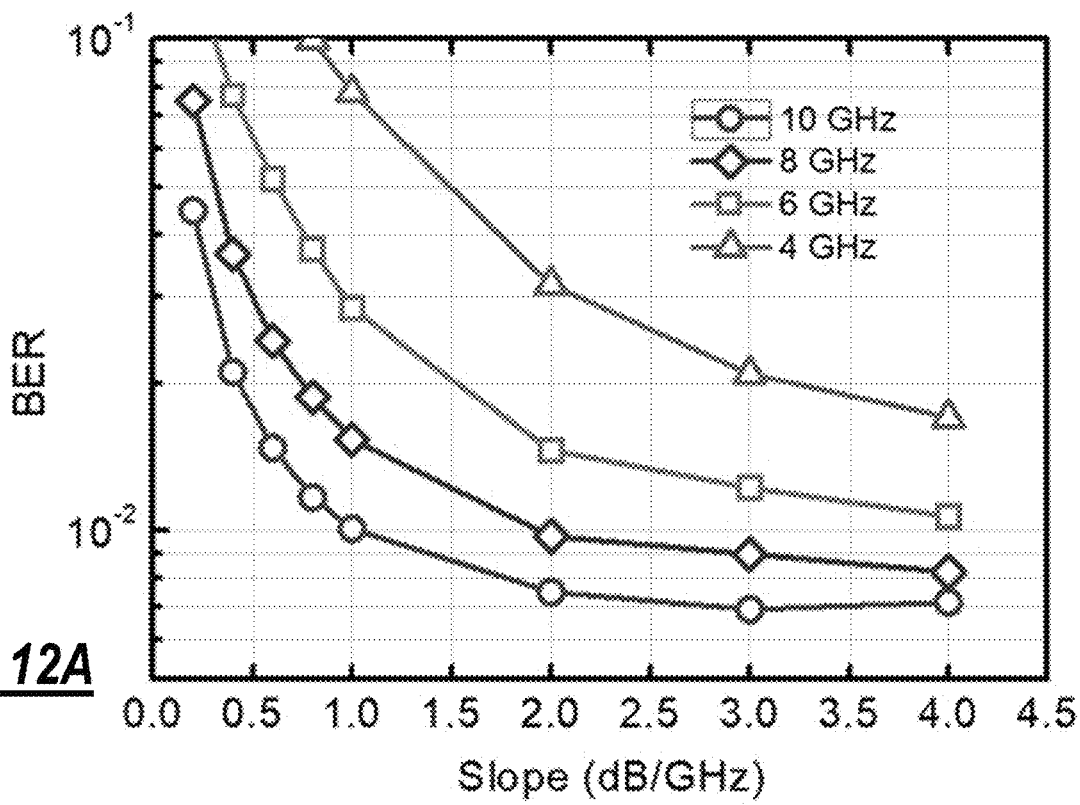
FIG. 12A-12B are graphs that show the BER as a function of the filter slope (dB/GHz) at varied guard band sizes 4, 6, 8 and 10 GHz for evaluating a reduction in the optical filter out-of-band slope requirements.
Figure 12B:
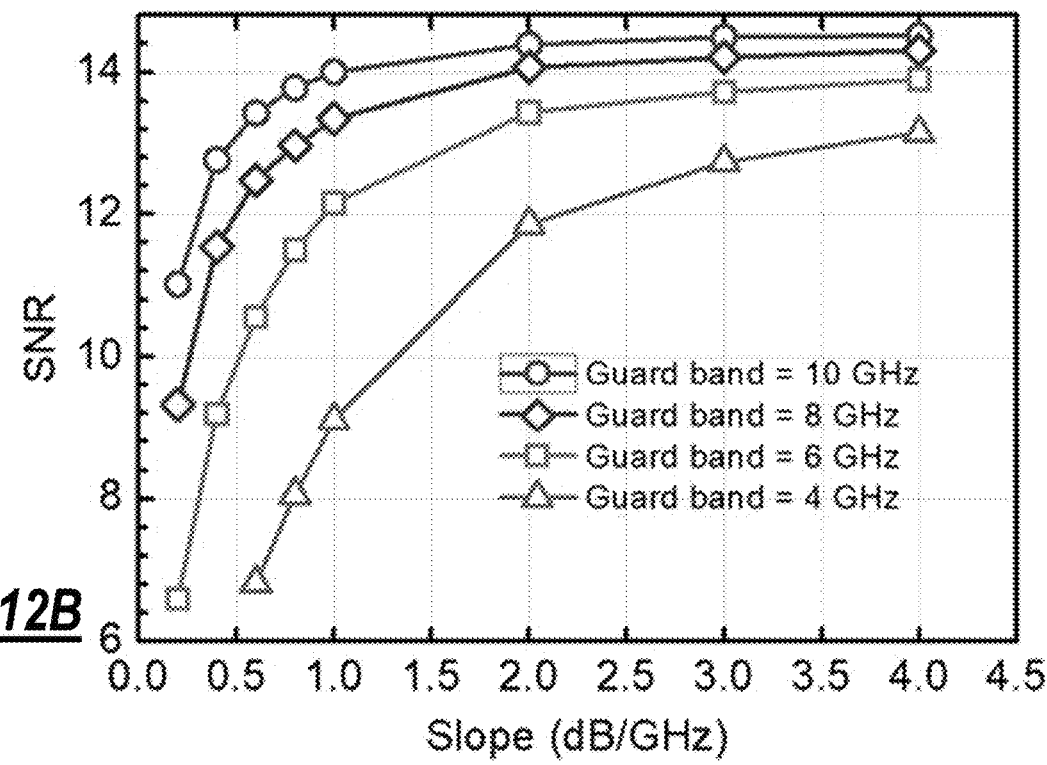

FIG. 12A is a graph that shows the BER as a function of the filter slope (dB/GHz) at varied guard band sizes 4, 6, 8 and 10 GHz. A 40 Gbaud 16 QAM signal per polarization (80 Gbaud aggregate) is transmitted over 80 km in the simulation. The noise-to-signal ratio (NSR) is −16.3 dB, where the signal power does not include the carrier. −16.3 dB NSR AWGN noise was added to the transceiver. However, the SNR after the postprocessing DSP is lower as shown in FIG. 12B. The interference from the X-polarization in the Y-polarization is estimated and subtracted in a precise way. This is done by first estimating the amplitude of the filtered carrier using a sequence of pilot symbols with only CW tones. Then the square law expansion of the X-pol signal and the filtered carrier, i.e. the X-pol interference is estimated.

Although the estimate of the X-pol interference is precise, the interaction between the X-pol signal and the Y-pol signal in the recovery process still deteriorates the SNR as the guard band or the filter slope decreases. At a lower guard band or filter slope, the SNR of the X-pol signal extracted by the photocurrent difference decreases. The X-pol signal with a lower SNR further makes the estimate of the X-pol interference noisier, thus leading to a noisier Y-pol signal. This explains why there is an SNR penalty after postprocessing. The BER is the average BER of the dual-pol signal, i.e. the number of error bits of both polarizations divided by the total number of bits of both polarizations.

§ 2.0 ASYMMETRIC SELF-COHERENT RECEIVER WITH A DISPERSIVE ELEMENT

There has been an effort in the quest of cost-effective coherent detection schemes for short-reach optical communications so that the channel linear distortion can be post-compensated in the digital domain. In recent years, the Kramers-Kronig (KK) coherent receiver has been widely pursued owing to the capability of restoring the phase of a self-coherent single sideband (SSB) signal from the signal intensity. Nevertheless, the throughput of the KK receiver is constrained by the low electrical spectral efficiency (ESE) due to a wasted image band not capable of bearing any information to meet the minimum-phase condition. In the present disclosure, an asymmetric coherent receiver (ACR) is proposed that gives access to the complex field of a self-coherent double sideband (DSB) signal, thus doubling the electrical spectral efficiency (ESE) compared to the KK receiver. The ACR is made up of two single-ended photodiodes, two analog-to-digital converters (ADC), and an element to modify the optical transfer functions, e.g., a dispersive element (DE), an interferometer, a filter, etc. For illustration purposes, the ACR is described herein with the DE. The dispersed signal intensity resulting from the DE provides extra information (based on the different optical transfer function), that allows field reconstruction via direct detection. ACR detection is compatible with low hardware complexity wavelength-division multiplexing (WDM) and the use of uncooled lasers for reduced power consumption. ACRs are a novel class of self-coherent phase-diversity receivers with high ESE for short-reach optical communications.

§ 2.1 Introduction

Self-coherent detection schemes have been intensively studied in recent years as potential cost-effective alternatives in short reach communications [25-27]. Amongst these, the KK coherent receiver has been widely pursued owing to the capability to restore the field of a class of self-coherent single sideband (SSB) signals. The KK coherent scheme also enables the post-compensation of the channel linear similar to coherent detection, thereby enabling high throughput reach in C-band inter-data center interconnects. Nonetheless, the KK receiver has a low electrical spectral efficiency (ESE) compared with the homodyne coherent receiver as the signal is upconverted to an intermediate frequency away from the carrier, and half of the spectrum in the image band is left unexploited to guard against the violation of the non-minimum phase condition. In a sense, the KK receiver is a self-coherent heterodyne receiver. Some improvements of the ESE of self-coherent SSB schemes have been reported [28-29]. One scheme utilizes two optical filters to reject the sidebands of a twin-SSB signal so that two different self-coherent SSB signals are detected by single-ended PDs [28]. Another relevant scheme proposes a double-ended receiver with a single filter that exploits the difference between the photocurrents to restore a twin-SSB signal via direct detection [29]. However, filters with sharp edge roll-offs are costly and difficult to realize in current filter technologies, especially when the chip-scale integration is considered. Recently, Shieh et al. reported the carrier assisted differential detection (CADD) that can reconstruct the field of a self-coherent complex double sideband (DSB) signal [30-31]. However, this scheme requires five PDs (2 BPDs and 1 PD) and three ADCs, which is not simple in terms of the hardware complexity.

Figure 13B:
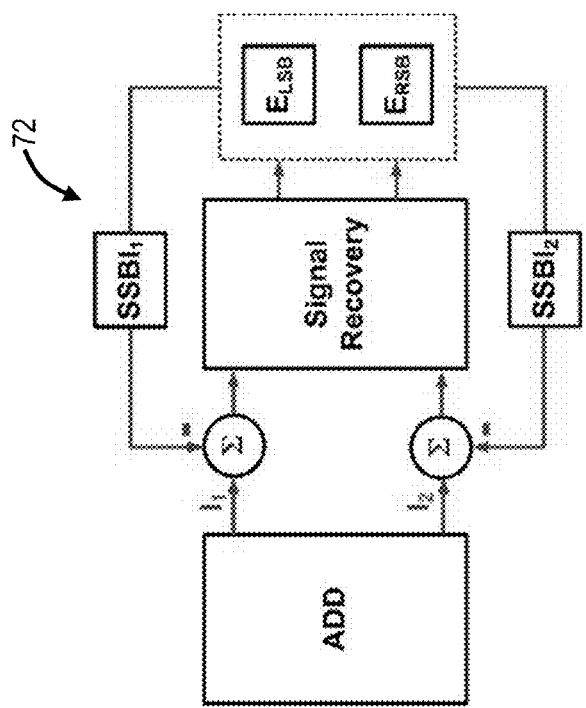
FIGS. 13A-13B are a schematic of an ACR (FIG. 13A) and a diagram of an iterative signal-signal beating interference (SSBI) cancellation process (FIG. 13B).
Figure 13A:
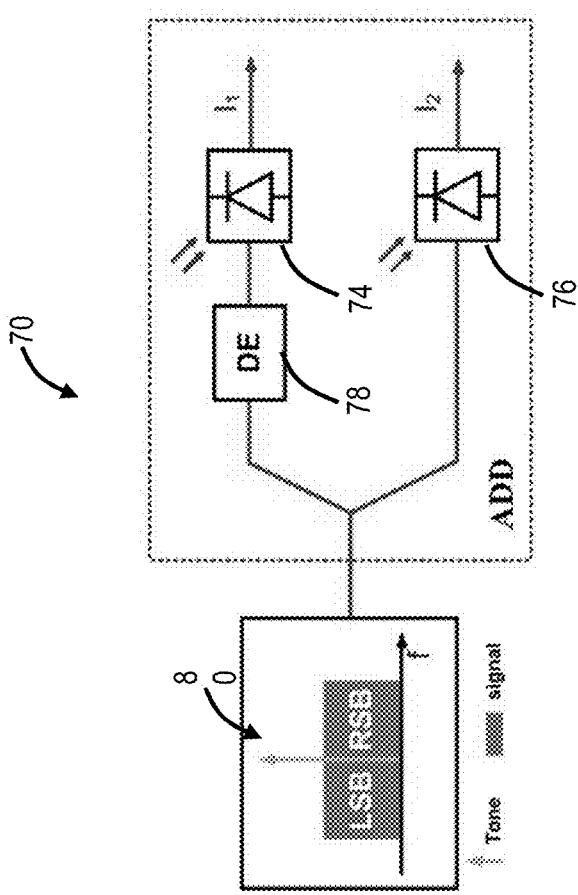

In an embodiment, the present disclosure includes an asymmetric coherent receiver (ACR) for the detection of self-coherent complex DSB signals. FIGS. 13A-13B are a schematic of an ACR 70 (FIG. 13A) and a diagram of an iterative SSBI cancellation process 72 (FIG. 13B). ACR doubles the ESE compared with the common SSB receivers, including the KK receiver based on a double-ended structure that is comprised of two photodiodes 74, 76, two analog-to-digital converters and a dispersive element (DE) 78. The DE 78 exerts an additional dispersion to the incoming signal that yields extra information after square-law detection in addition to the non-dispersed signal intensity.

It will be shown that the detection of the dispersed and non-dispersed signal pair in the ACR 70 can be exploited to restore the full field of a self-coherent complex DSB signal 80 without a need for optical filters with sharp edge roll-offs to reject sidebands. A parametric study to optimize the throughput of an ACR-based system is also presented. Then, a generalized ACR structure is shown that features the exploitation of distorted and non-distorted signal intensity in common as the key to the field reconstruction. The ACR 70 is compared to other coherent schemes by the measure of the number of required ADCs, PDs, LOs as well as the bandwidth of the receiver RF chain. This is a first realization of a self-coherent receiver that doubles the spectral efficiency relative to a KK receiver based on a dispersion-assisted asymmetric structure. That is, the self-coherent complex DSB signal 80 includes distinction information on the left sideband (LSB) and right sideband (RSB).

§ 2.2 Principle of the Asymmetric Coherent Receiver

FIG. 13A shows the asymmetric structure of the ACR 70, which includes the photodiodes 74, 76, and one DE 78 which is located at one branch of the doubled ended receiver. The DE 78 can be a portion of dispersion compensating fiber or any optical component to induce dispersion in the path. There are ADCs after each of the PDs 74, 76 (not shown in FIG. 13A).

$E_{LSB}$, $E_{RSB}$ are used to represent the left sideband and right sideband of a self-coherent (SC) complex double sideband (DSB) signal S as seen in FIG. 13A. S can be expressed as $$S = T + E_{LSB} + E_{RSB} \quad (2\text{-}1)$$

where T is the continuous-wave (CW) tone. Further, $E_{LSB}$, $E_{RSB}$ can be written as $$E_{LSB} = a_{LSB} + jb_{LSB} \quad (2\text{-}2)$$

$$E_{RSB} = a_{RSB} + jb_{RSB} \quad (2\text{-}3)$$

where $a_{LSB}$ and $b_{LSB}$ are the real and imaginary parts of $E_{LSB}$, respectively, whereas $a_{RSB}$ and $b_{RSB}$ are the real and imaginary parts of $E_{RSB}$, respectively. The self-coherent complex DSB signal impinging upon ACR is split into two copies with one copy detected and the other copy dispersed by the DE 78 before detection. The asymmetric structure of the ACR 70 provides additional information from the dispersed signal other than merely the non-dispersed signal intensity from a single-ended PD. This extra information allows the reconstruction of the field of an SC complex DSB signal. After square-law detection, the induced photocurrents $I_1$ and $I_2$ from the PDs can be expressed as $$\begin{aligned} I_1 &= |T + E_{LSB} + E_{RSB}|^2 \\ &= T^2 + |E_{LSB}|^2 + |E_{RSB}|^2 + 2T\,Re(E_{LSB}) + \\ &\quad 2T\,Re(E_{RSB}) + 2\,Re(E_{LSB} E_{RSB}^*) \\ &= T^2 + 2T\,Re(E_{LSB}) + 2T\,Re(E_{RSB}) + SSBI_1 \\ &= T^2 + 2Ta_{LSB} + 2Ta_{RSB} + SSBI_1 \end{aligned} \quad (2\text{-}4)$$

$$\begin{aligned} I_2 &= |T + E_{LSB} \otimes H_{CD} + E_{RSB} \otimes H_{CD}|^2 \\ &= T^2 + |E_{LSB} \otimes H_{CD}|^2 + |E_{RSB} \otimes H_{CD}|^2 + \\ &\quad 2T\,Re(E_{LSB} \otimes H_{CD}) + 2T\,Re(E_{RSB} \otimes H_{CD}) + \\ &\quad 2Re(E_{LSB} \otimes H_{CD}(E_{RSB} \otimes H_{CD})^*) \\ &= T^2 + 2TRe(E_{LSB} \otimes H_{CD}) + 2TRe(E_{RSB} \otimes H_{CD}) + \\ &\quad SSBI_2 \\ &= T^2 + 2Ta_{LSB} e^{-j\frac{\beta_2 L}{2} sgn(\omega)\omega^2} + \\ &\quad 2Ta_{RSB} e^{j\frac{\beta_2 L}{2} sgn(\omega)\omega^2} + SSBI_2 \end{aligned} \quad (5)(2\text{-}5)$$

where the SSBI terms in $I_1$ and $I_2$ are merged and represented by $SSBI_1$ and $SSBI_2$, respectively, $H_{CD}$ is the transfer function of the DE, sgn( ) is the sign function, β is the propagation constant of the DE, and L the propagation length.

The SSBI terms are ignored for the moment, assuming a high carrier signal power ratio. It is possible to cancel either $a_{LSB}$ or $a_{RSB}$ by subtracting the photocurrents, which leads to Eq. (2-6) and (2-7) as below $$I_1 - I_2 e^{j\frac{\beta_2 L}{2} sgn(\omega)\omega^2} = 2Ta_{RSB}\left(1 - e^{j\beta_2 L sgn(\omega)\omega^2}\right) \quad (2\text{-}6)$$

$$I_1 - I_2 e^{-j\frac{\beta_2 L}{2} sgn(\omega)\omega^2} = 2Ta_{RSB}\left(1 - e^{-j\beta_2 L sgn(\omega)\omega^2}\right) \quad (2\text{-}7)$$

Thus, $a_{RSB}$ and $a_{LSB}$ can be expressed as $$a_{RSB} = \frac{I_1 - I_2 e^{j\frac{\beta_2 L}{2}sgn(\omega)\omega^2}}{2T\left(1 - e^{j\beta_2 L sgn(\omega)\omega^2}\right)} \quad (2\text{-}8)$$

$$a_{LSB} = \frac{I_1 - I_2 e^{-j\frac{\beta_2 L}{2}sgn(\omega)\omega^2}}{2T\left(1 - e^{-j\beta_2 L sgn(\omega)\omega^2}\right)} \quad (2\text{-}9)$$

Since $E_{LSB}$, $E_{RSB}$ are analytical signals, $b_{RSB}$ and $b_{LSB}$ can be readily obtained by performing the Hilbert transform of $a_{RSB}$ and $a_{LSB}$:

$$b_{LSB} = -\text{Hilbert}(a_{LSB}) \quad (2\text{-}10)$$

$$b_{RSB} = \text{Hilbert}(a_{RSB}) \quad (2\text{-}11)$$

As shown in FIG. 13B, it is possible to reconstruct $E_{LSB}$, $E_{RSB}$, from which the estimates of $SSBI_1$ and $SSBI_2$ can be obtained which are explicitly expressed in (2-4) and (2-5). The SSBI estimates are fed back and subtracted from the photocurrents $I_1$ and $I_2$ which leads to more accurate estimates of $E_{LSB}$, $E_{RSB}$. This iterative SSBI cancellation is also presented with more details in our previous paper [29].

Figure 14:
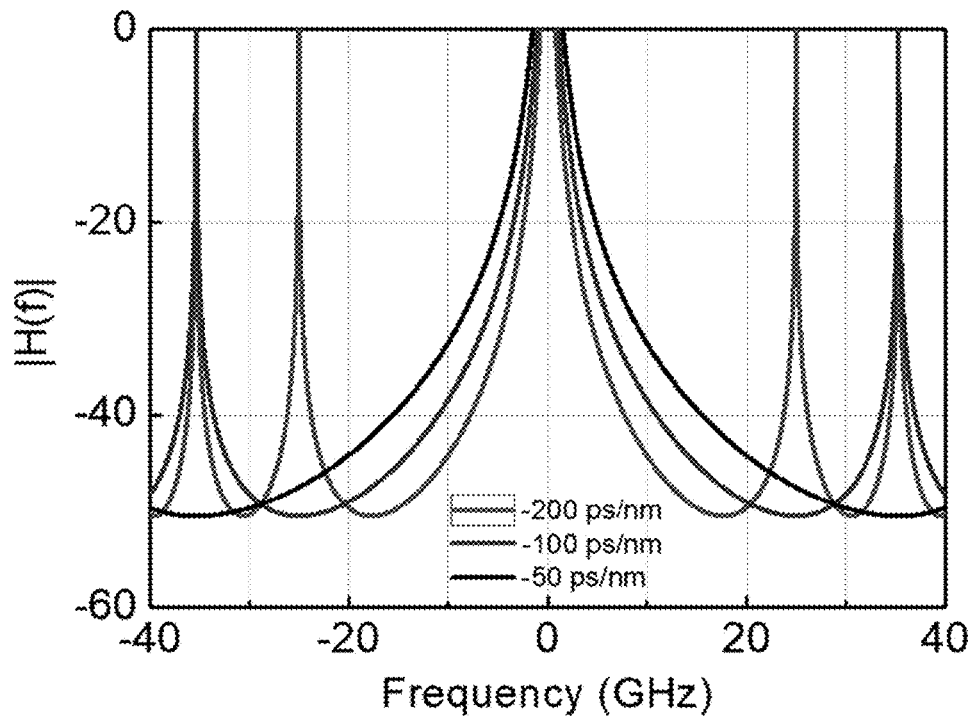
FIG. 14 is a graph of the transfer function of the inverse of $H_{RSB}$ and $H_{LSB}$ with the dispersion of the dispersion element (DE) in the ACR of FIG. 13A varied among values of 50, 100 and 200 ps/nm.

As seen in (8) and (9), the denominators of $a_{RSB}$ and $a_{LSB}$ contain a transfer function of $H_{RSB}=1-e^{\beta_2 L sgn(\omega)\omega^2}$ and $H_{LSB}=1-e^{-\beta_2 L sgn(\omega)\omega^2}$, respectively, which are zero when the exponential part equals one. Thus, to best allocate the signal frequency, the amplitude spectrum of $H_{RSB}$ and $H_{LSB}$ must be studied. FIG. 14 plots the inverse of $H_{RSB}$ and $H_{LSB}$ with the dispersion of the DE 78 varied among values of −50, −100 and −200 ps/nm. As shown FIG. 14, there are peaks distributed in the spectrum corresponding to the zero values of $H_{RSB}$ and $H_{LSB}$. Despite different dispersions of the DE 78, there is a peak at the zero frequency. Furthermore, the frequency spacing from the center peak to the second peak increases at lower DE dispersions yet at the cost of a wider center peak. Thus, to approach the system capacity, it is natural to adopt multi-subcarrier signaling schemes such as subcarrier-modulation (SCM) or orthogonal frequency division modulation (OFDM) to allocate signal subcarriers in the frequency range partitioned by the transfer function peaks.

§ 2.3 Performance Impact of the System Parameters

As a proof-of-concept, a 20 Gbaud 16-QAM signal was transmitted at both the left sideband and right sideband over single-mode fiber (SMF) of 40 km. This corresponds to an aggregate symbol rate of 40 Gbaud. The change of BER was studied by sweeping the OSNR from 22 dB to 38 dB at different DE 78 dispersions, as shown in FIG. 14. Note that the signal power of the OSNR includes the tone power. The CSPR is set to 10 dB, the guard band between the LSB and RSB is selected as 1.25 GHz and four iterations are used for the SSBI cancellation.

Figure 15:
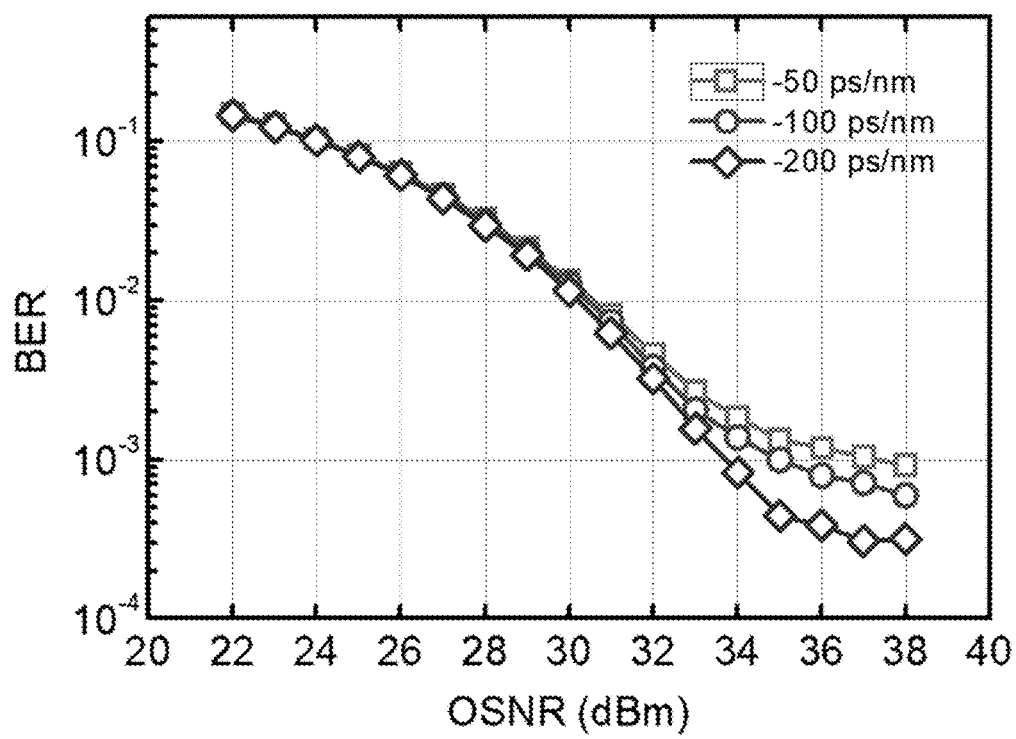
FIG. 15 is a graph of BER versus OSNR at different dispersion of the dispersive element in the ACR of FIG. 13A.

As can be observed in FIG. 15, the BERs at different dispersions are very close at lower OSNRs. Yet at higher OSNR greater than 32 dB, −200 ps/nm dispersion gives rise to the lowest BER. The explanation is that the center peak is narrower at a higher dispersion of −200 ps/nm, thus leading to flatter transfer functions for the signal, which is still contained within the frequency range between the center and second-order peaks.

Figure 16:
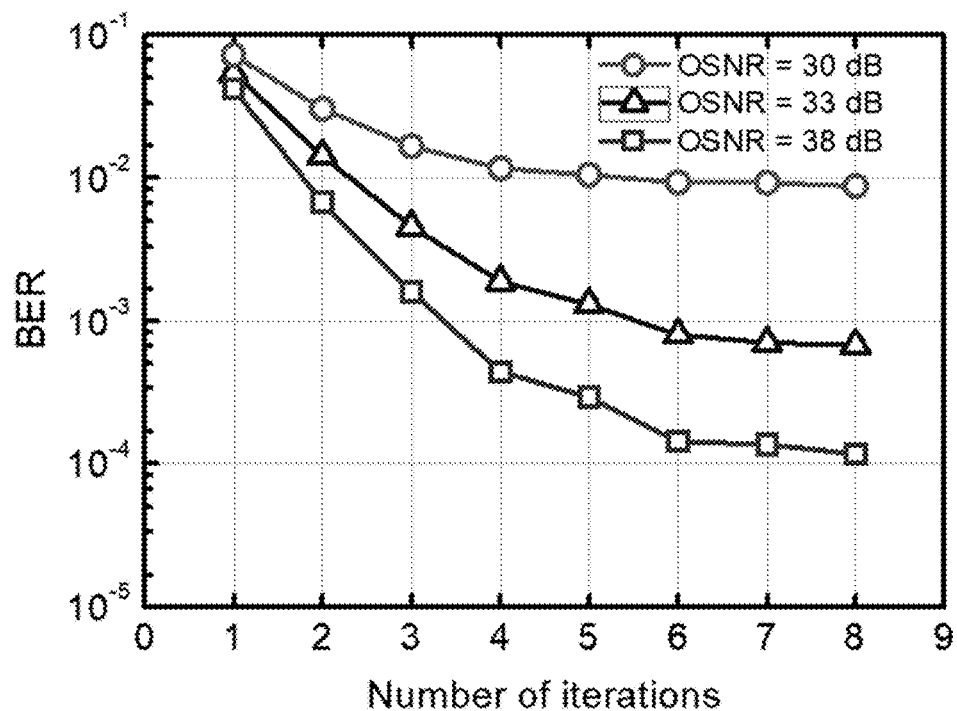
FIG. 16 is a graph of BER as a function of the number of iterations at different OSNR values for the ACR of FIG. 13A.

Next, the number of iterations required for the SSBI cancellation was studied as a higher delay is often induced if more iterations are performed in the DSP. FIG. 16 plots the BER change as a function of the number of iterations at three different OSNR values. It is seen in FIG. 16 that the BER decreases at a significantly lower rate after the iteration number is greater than four. Thus, to effectively mitigate the SSBI without causing considerable delay, four iterations are used to balance the latency and the BER.

Figure 17:
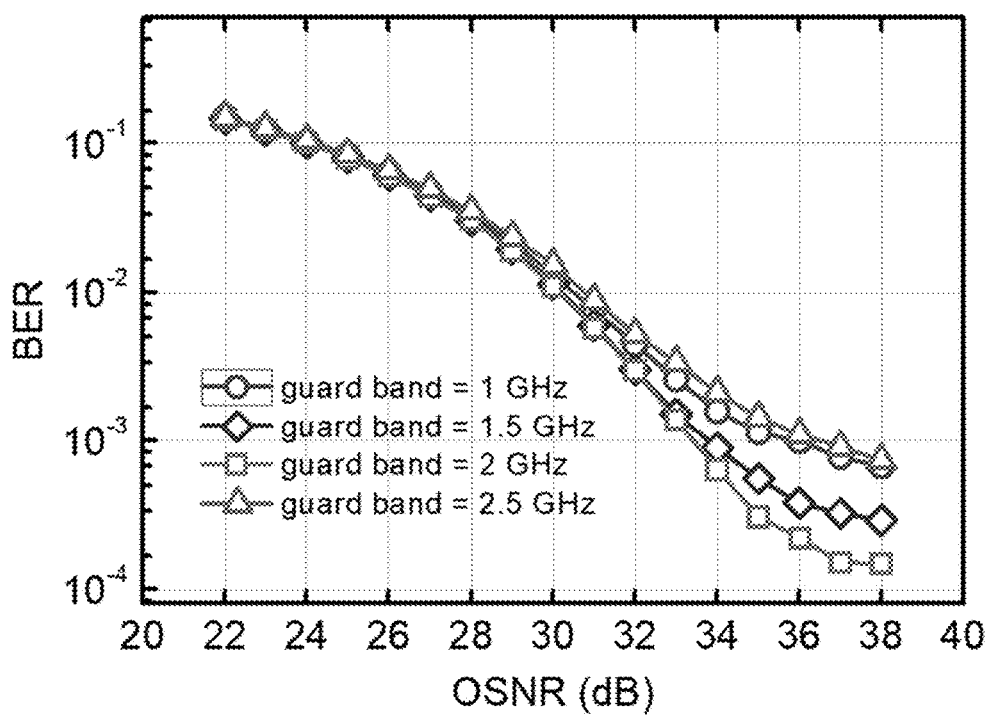
FIG. 17 is a graph of BER change as the OSNR is swept from 22 to 38 dB at different guard bands for the ACR of FIG. 13A.

The performance impact of the guard band is studied as (i) the guard band has to be wide enough to accommodate the center peak, (ii) higher guard band leads to reduced spectral efficiency. FIG. 17 plots the BER as a function of the OSNR at different guard bands of 1, 1.5, 2 and 2.5 GHz. It is seen that at higher OSNRs, the minimum BER is obtained at a guard band size of 2 GHz. A higher guard band of 2.5 GHz, however, leads to a higher BER due to the impact of the second-order peak as in FIG. 14. A lower guard band of 1.5 GHz has a very similar BER curve relative to the 2 GHz one yet at a higher spectral efficiency. Hence, the 1.5 GHz guard band is chosen, which ensures a higher spectral efficiency and a BER close to the minimum.

Figure 18:
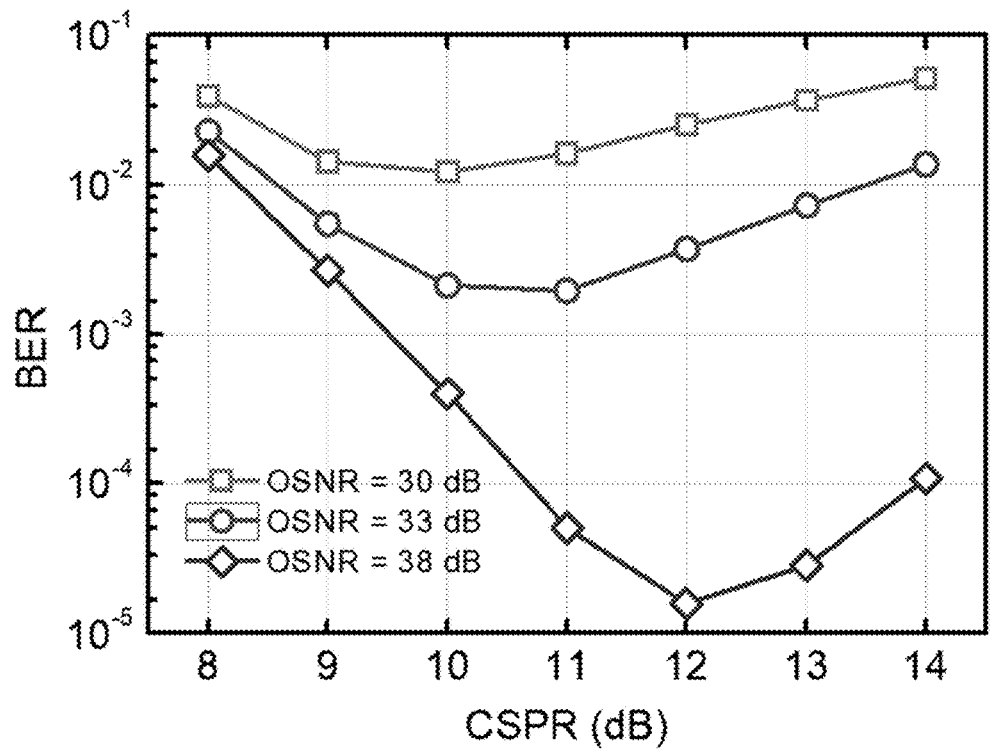
FIG. 18 is a graph of BER versus the CSPR at varied OSNR values among 30, 33, 38 dB for the ACR of FIG. 13A.

For the discussion above, the CSPR is fixed at 10 dB. Below the performance impact of the CSPR is studied, as shown in FIG. 18. It is seen in the figure that at 30 dB OSNR, the BER achieves the minimum at a CSPR of 10 dB. Since the signal power used to calculate the OSNR includes the tone power, a CSPR higher than 10 dB actually results in a lower effective SNR and therefore a higher BER, whereas a CSPR lower than 10 dB leads to less accurate estimates of the SSBI, thereby also giving rise to a higher BER. Note that the effective SNR can be seen as the ratio between the signal power and the in-band ASE noise power. Thus, at the optimal CSPR point, a balance is struck between the SSBI cancellation and the effective signal SNR. This analysis also applies to the other two curves at higher OSNR values except that the optimal CSPRs are higher since the same effective SNR can be achieved at higher CSPR values.

§ 2.4 Generalized ACR Architecture

Figure 19:
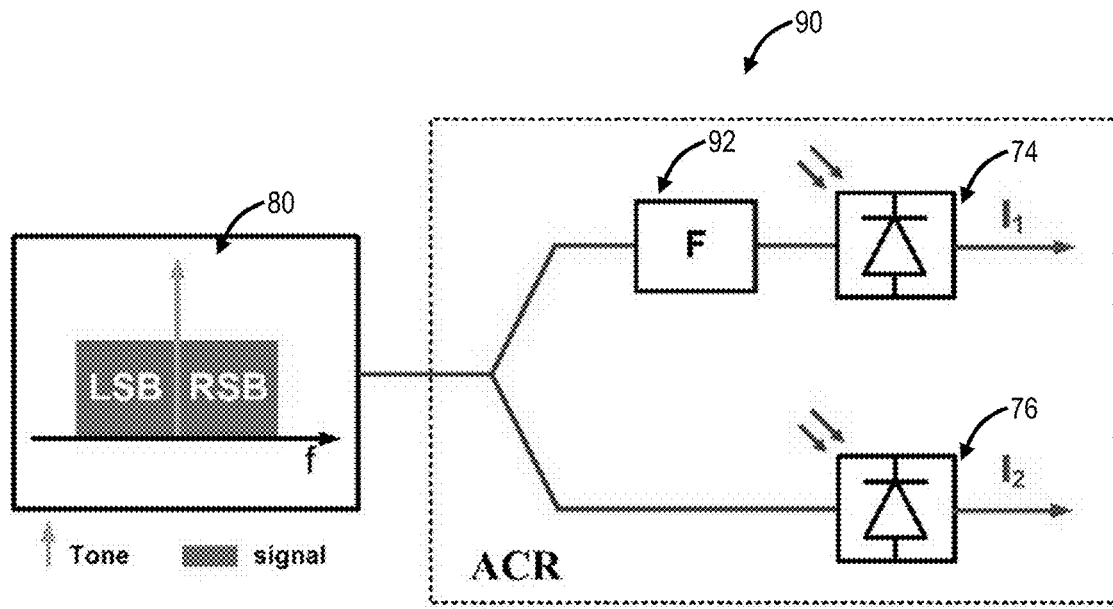
FIG. 19 is a schematic of a generalized ACR architecture.

A generalized ACR 90 architecture as depicted in FIG. 19, where F represents a wide-sense filter 92, i.e. an all-pass filter with dispersion in this work or a band rejection filter as in [28]. The filter F alters the phase or amplitude of the incoming self-coherent signal so that the intensity of the distorted signal after square-law detection delivers additional information besides the intensity of the non-distorted signal. The exploitation of the intensity difference of a pair of distorted and non-distorted signals is the key in common of ACRs to reconstruct the field of self-coherent complex DSB signals. From the perspective of mutual information (MI), the MI between the ACR input and the joint outputs can be expressed as $I(X; Y_1, Y_2)=I(X; Y_1)+I(X; Y_2|Y_1) \geq I(X; Y_1)$. The inequality comes from the non-negative property of MI. Therefore, despite the modulation formats, more information can be extracted from ACR than a receiver based on a single-ended PD. However, to achieve higher MI from the ACR, the filter F should be in a manner so that $Y_2$ is less dependent on $Y_1$ to give rise to a higher $I(X; Y_2|Y_1)$ which otherwise approaches zero without the distortion resulting from the filter F.

After a study on the parameters of ACR and a derivation of generalized ACR structures, different coherent detection schemes are compared in terms of the cost metric, including the ADC bandwidth and the number of ADCs, PDs, LOs, band-rejection filters and DEs as shown in table 1. To ensure a fair comparison, all coherent schemes listed in the table are operating at 200 Gbit/s data rate per polarization per wavelength. The cost metrics are determined due to the following reasons: (i) high bandwidth ADCs and PDs are costly; (ii) the use of LOs requires thermal-electric stabilizers that are not only power consuming but also leads to a bulky laser module (iii) the number of PDs are included due to the associated received optical power (ROP) required to attain enough signal SNR due to the existence of the PD and ADC noise; (iv) optical filters with high edge roll-offs are costly and difficult to design in current filter technologies especially when chip-scale integration is considered.

TABLE 1

Cost metrics of different coherent systems at a 200 Gbit/s interface rate per polarization per wavelength.

| | BW per ADC/PD | ADC | PD | LO | Band-reject filter |
|---|---|---|---|---|---|
| KK | 31.6 | 1 | 1 | 0 | 0 |
| CADD | 16.0 | 3 | 5 | 0 | 0 |
| ACR1 | 21.5 | 2 | 2 | 0 | 1 |
| ACR2 | 17.5 | 2 | 2 | 0 | 0 |
| Homodyne | 9.7 | 2 | 4 | 1 | 0 |
| Heterodyne | 19.4 | 1 | 2 | 1 | 0 |

Figure 20:
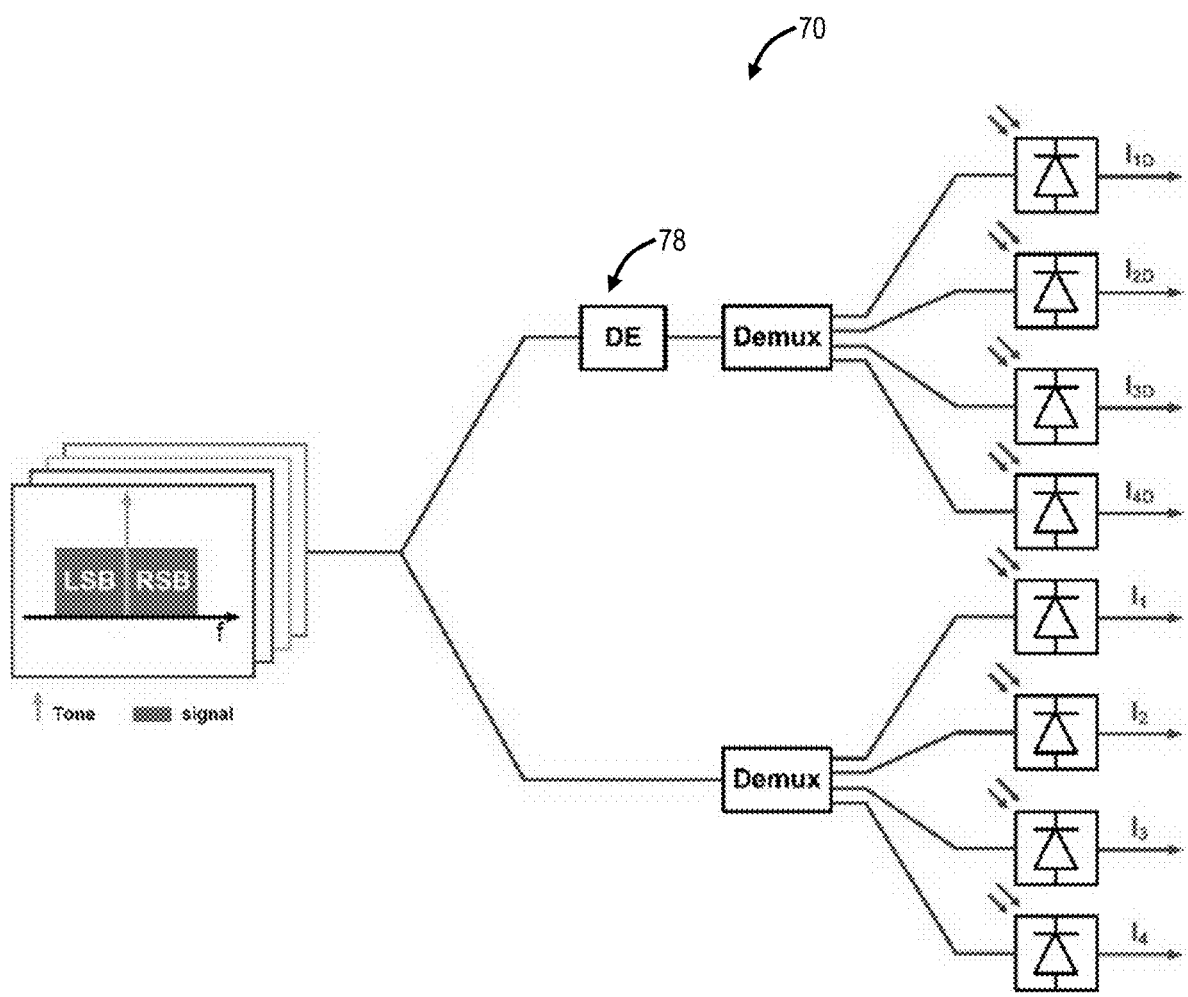
FIG. 20 is a schematic of an ACR WDM configuration.

As shown in Table 1, the KK receiver requires PDs and ADCs with the highest bandwidth due to the unused image band. The CADD almost halves the electrical bandwidth yet at the cost of two additional ADCs and four additional PDs (2 BPDs). The extra PDs also induce increased ROP. By contrast, the ACR1 based on a band-rejection filter [29] uses only two ADCs and two PDs yet at a higher electrical bandwidth of 21.5 GHz. However, ACRs based on band-rejection filters may not be the suitable scheme for a shorter reach link due to the filter cost and difficulty to achieve a high sideband rejection ratio. Another reason is the insertion loss (normally over 5 dB) and the filtering loss that penalize the receiver sensitivity such that optical amplifiers are be enlisted even in short reach links below 40 km. By contrast, ACR2 based on the DE 78 operates at a close bandwidth per PD/ADC relative to CADD yet requiring only 2 PDs and 2 ADCs. There are various cost-effective ways of realizing the DE 78. For systems based on discrete components, dispersion compensating fibers or fiber Bragg gratings can provide sufficient dispersion over a wide spectral range and at a low insertion loss [32]; the same can be achieved on the complementary metal-oxide-semiconductor (CMOS)-compatible silicon on insulator (SOI) platform using chirped vertical gratings [33]. The dispersion induced over a wide spectral range could enable a simple WDM configuration as depicted in FIG. 20, where a single DE 78 helps produce the dispersion for all WDM channels.

To summarize, the self-coherent receiver ACR is proposed, which possesses a simple double-ended structure of two PDs 74, 76 and one DE 78. ACR exploits the additional information extracted from the dispersed copy of the received signal to reconstruct the field of a complex DSB signal. The performance impact of parameters including the DE dispersion, CSPR, guard band and a number of iterations are shown. Finally, ACR is compared relative to other coherent detection schemes in terms of the cost metric that includes the ADC bandwidth, number of ADCs, PDs, LOs, band-rejection filters and DEs. In conclusion, ACR is a cost-effective self-coherent scheme with a simple structure that doubles the spectral efficiency relative to self-coherent schemes for single-sideband signals.

§ 3.0 ASYMMETRIC SELF-COHERENT RECEIVER WITH AN INTERFEROMETER

The DE 78 can be replaced with an interferometer. The following discusses the detection of two types of complex double-sideband signals (DSB), i.e. with or without a tone using a Mach-Zehnder interferometer (MZI) based asymmetric receiver. The optimum bias point for both field recovery schemes are found to be the intensity quadrature. It is also shown that the phase difference $\phi(t)-\phi(t-\tau)$ does not contain the complete phase information, where $\phi(t)$ is the signal phase and $\tau$ is a delay.

§ 3.1 Detection of Carrier-Less Double-Sideband Signals

First, consider the case when the transmitter modulator is biased at the intensity minimum (or null point), the received signal can be formulated as $$E(t) = A(t)e^{j\phi(t)}e^{j\omega_c t} \quad (3\text{-}1)$$

where $A(t)$ represents the signal amplitude ($A(t)>0$), $\phi(t)$ represents the signal phase, and $e^{j\omega_c t}$ represents the carrier at an angular frequency of $\omega_c$.

Figure 21:
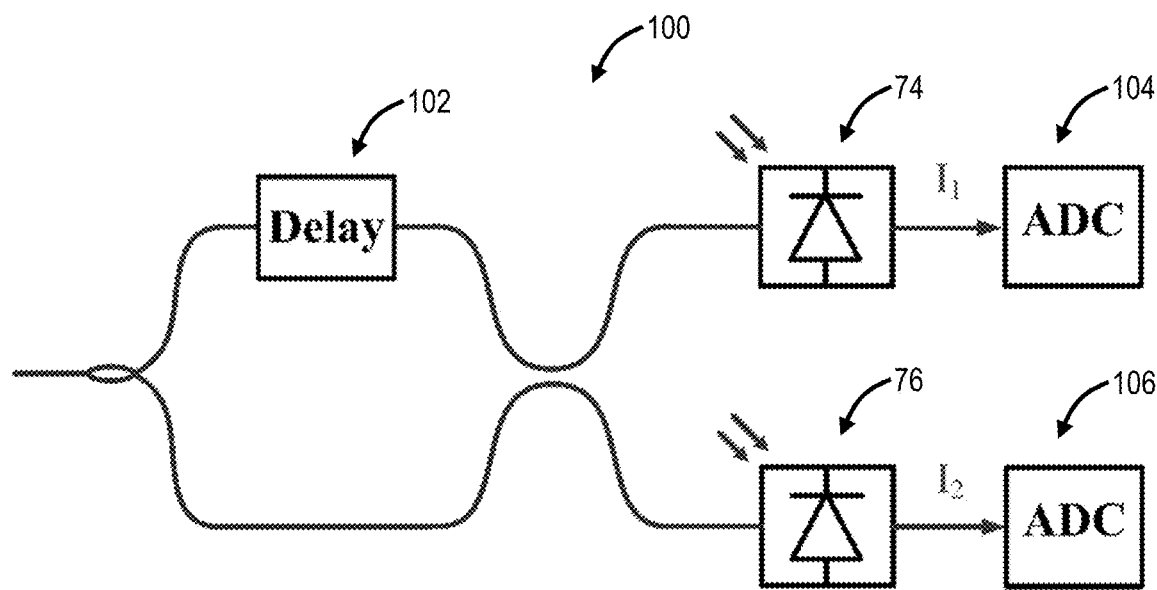
FIG. 21 is a schematic of an interference-based ACR.

FIG. 21 is a diagram of an interference-based ACR 100, including a delay 102 such as a Mach Zehnder interferometer (MZI) and two ADCs 104, 106 after the PDs, 74, 76, respectively. After the 50/50 splitter, the signals at the upper and lower branches can be expressed as $$E_{up}(t) = E_{low}(t) = \frac{1}{\sqrt{2}} A(t)e^{j\phi(t)}e^{j\omega_c t} \quad (3\text{-}2)$$

Assume a small delay set at the upper branch resulting in the delayed field $$E_{up\_delayed}(t) = E_{up}(t-\tau) = \frac{1}{\sqrt{2}} A(t-\tau)e^{j\phi(t-\tau)}e^{j\omega_c(t-\tau)} \quad (3\text{-}3)$$

The outputs of the 3-dB direction coupler can be formulated in a matrix form as below $$\begin{bmatrix} E_{out\_up} \\ E_{out\_low} \end{bmatrix} = \frac{1}{\sqrt{2}} \begin{bmatrix} 1 & -j \\ -j & 1 \end{bmatrix} \begin{bmatrix} E_{up\_delayed} \\ E_{low} \end{bmatrix} \quad (3\text{-}4)$$

Thus, the expression for the photocurrents $I_1$ and $I_2$ is as below $$I_1 = |E_{out\_up}|^2 = \tfrac{1}{4}(A^2(t)+A^2(t-\tau)-2 \; \text{Im}(A(t)A(t-\tau) \\ e^{j\omega_c\tau}e^{j[\phi(t)-\phi(t-\tau)]})) \quad (3\text{-}5)$$

$$I_2 = |E_{out\_low}|^2 = \tfrac{1}{4}(A^2(t)+A^2(t-\tau)+2 \; \text{Im}(A(t)A(t-\tau) \\ e^{j\omega_c\tau}e^{j[\phi(t)-\phi(t-\tau)]})) \quad (3\text{-}6)$$

The sum and difference of the photocurrents are expressed as $$I_1+I_2 = \tfrac{1}{2}(A^2(t)+A^2(t-\tau)) \quad (3\text{-}7)$$

$$I_2-I_1 = A(t)A(t-\tau)\sin(\omega_c\tau+[\phi(t)-\phi(t-\tau)]) \quad (3\text{-}8)$$

Thus, it is desirable to bias the Mach-Zehnder interferometer (MZI) at the intensity quadrature, i.e. $\omega_c\tau$ equals $2m\pi$, where m is a positive integer, so that $\sin(\omega_c\tau+(\phi(t)-\phi(t-\tau)))=\sin(\phi(t)-\phi(t-\tau))=\sin(\Delta\phi(t,\tau))$ increases monotonically with increasing $\Delta\phi(t,\tau)$, which is contained within $$\left[-\frac{\pi}{2}, \frac{\pi}{2}\right]$$

by setting a small delay τ. Note that by setting $\omega_c\tau$ to 0, $I_1=I_2$ when the carrier is not modulated, indicating the bias of the MZI at the intensity quadrature. With τ configured as such, (3-8) can be reformulated as $$\arcsin\left(\frac{I_2 - I_1}{A(t)A(t-\tau)}\right) = \phi(t) - \phi(t-\tau) = \Delta\phi(t,\tau) \quad (3-9)$$

where arcsin is the inverse function of sin( ).

To derive A(t)A(t–τ) from (3-7), perform the Fourier transform on (3-7), which gives $$F(I_1+I_2)=\tfrac{1}{2}(F(A^2(t))+F(A^2(t))e^{-j\omega\tau})=\tfrac{1}{2}(1+e^{-j\omega\tau})F(A^2(t)) \quad (3-10)$$

where F represents Fourier transform, w is the baseband angular frequency. Thus, A(t) can be expressed as below $$A(t) = \sqrt{F^{-1}\left(\frac{2F(I_1+I_2)}{1+e^{-j\omega\tau}}\right)} \quad (3-11)$$

where $F^{-1}$ represents the inverse Fourier transform and w is the baseband angular frequency.

Based on (3-11), A(t–τ) can be obtained by multiplying a constant phase term $e^{-j\omega\tau}$ to A(ω) in the frequency domain. Next, based on (3-8), an estimate of the derivative of φ(t) is derived $$\frac{d\phi(t)}{dt} \approx \frac{\Delta\phi(t,\tau)}{\tau} = \frac{\phi(t)-\phi(t-\tau)}{\tau} = \frac{\arcsin\left(\frac{I_2-I_1}{A(t)A(t-\tau)}\right)}{\tau} \quad (3-12)$$

whose approximation error decreases with decreasing T.

It appears that the phase φ($t_0$) at time $t_0$ can be estimated as below $$\phi(t_0) = \phi_{ini} + \int_0^{t_0} \frac{d\phi(t)}{dt} dt \quad (3-13)$$

where $\phi_{ini}$ represents the initial phase.

However, this is not a practical way to reconstruct the phase considering the impact of white noise by formulating the received signal as below $$E(t)=(A(t)+n_A)e^{j(\phi(t)+n_\phi)}e^{j\omega_c t} \quad (3-14)$$

where $n_A$ represents the amplitude noise and $n_\phi$ represents the phase noise.

Then the derivative of the phase is expressed as:

$$\frac{d\phi(t)}{dt} \approx \frac{\Delta\phi(t,\tau)}{\tau} = \frac{\phi(t)-\phi(t-\tau)+n_\phi(t)-n_\phi(t-\tau)}{\tau} = \frac{\arcsin\left(\frac{I_2-I_1}{(A(t)+n_A(t))(A(t-\tau)+n_A(t-\tau))}\right)}{\tau} \quad (3-15)$$

Thus, when τ is small, the estimate of $$\frac{d\phi(t)}{dt}$$

is very inaccurate since Δφ(t, τ) could be very weak compared to the phase noise, whereas when τ is large the estimate of $$\frac{d\phi(t)}{dt}$$

is inaccurate by the definition of derivatives.

As a matter of fact, one cannot extract the complete phase from φ(t)–φ(t–τ). This can be readily seen by performing a Fourier transform on φ(t)–φ(t–τ), which leads to $$\phi(\omega)-\phi(\omega)e^{-j\omega\tau}=\phi(\omega)(1-e^{-j\omega\tau}) \quad (3-16)$$

where ω is the baseband angular frequency.

(3-16) has a number of periodic null points in the frequency domain which indicates the lost phase information at the frequencies $$\omega = \frac{2k\pi}{\tau},$$

where k takes non-negative integers. For instance, for a phase signal $$\phi(t) = e^{j\frac{2\pi}{\tau}t}(k=1), \phi(t)-\phi(t-\tau)$$

is always 0 and lost completely. Similarly, for a constant φ(t)=C, φ(t)–φ(t–τ) is also zero and cannot be recovered. However, for phase signals that are intentionally configured to not stride over the periodic null points in the frequency domain, φ(t) can be recovered by the expression below $$\phi(t) = F^{-1}\left(\frac{F\left(\arcsin\left(\frac{I_2-I_1}{A(t)A(t-\tau)}\right)\right)}{(1-e^{-j\omega\tau})}\right) \quad (3-17)$$

with A(t)A(t–τ) estimated using the previously described method. Also, note that $1-e^{-j\omega\tau}$ is divided in the DSP, and thus the inverse of the null is not linked to an infinite analog gain.

For this field recovery scheme, the modulation/demodulation can be proceeded as such: in the transmitter DSP, first generate a baseband complex DSB signal. Next, extract the signal amplitude and phase, respectively and upconvert them into the frequency bands separated by the null points as described earlier. At the receiver, recover the signal amplitude and phase based on (3-11) and (3-17), and then down-convert the amplitude and phase of the signal to recover the baseband signal.

§ 3.2 Detection of Double-Sideband Signals with a Tone

This asymmetric receiver shown in FIG. 21 can also detect self-coherent complex DSB signals, i.e. complex DSB signals with a tone. In this case, the signal can be expressed as $$E(t)=(T+s(t))e^{j\omega_c t} \quad (3-18)$$

where T represents the tone, s(t) represents the signal.

s(t) can be written as s(t)=a(t)+jb(t), where a(t) and b(t) are the real and imaginary parts of the signal, respectively. In a similar way, the photocurrents $I_1$ and $I_2$ can be expressed as $$I_1 = \frac{1}{4}|(T+S(t))e^{j\omega_c t} - j(T+S(t-\tau))e^{j\omega_c(t-\tau)}|^2 \quad (3\text{-}19)$$

$$= \begin{pmatrix} T^2 + |S(t)|^2 + 2T\text{Re}(S(t)) + T^2 + |S(t-\tau)|^2 + \\ 2T\text{Re}(S(t-\tau)) + 2\text{Re}((T+S(t))j(T+S^*(t-\tau))e^{j\omega_c\tau}) \end{pmatrix}$$

$$I_2 = \frac{1}{4}|(T+S(t))e^{j\omega_c t} - j(T+S(t-\tau))e^{j\omega_c(t-\tau)}|^2 \quad (3\text{-}20)$$

$$= \frac{1}{4}\begin{pmatrix} T^2 + |S(t)|^2 + 2T\text{Re}(S(t)) + T^2 + |S(t-\tau)|^2 + \\ 2T\text{Re}(S(t-\tau)) - 2\text{Re}((T+S(t))j(T+S^*(t-\tau))e^{j\omega_c\tau}) \end{pmatrix}$$

Thus, the sum and difference of the photocurrents are expressed as $$I_1 + I_2 = \frac{1}{2}(2T^2 + 2T\text{Re}(S(t)) + 2T\text{Re}(S(t-\tau)) + |S(t)|^2 + |S(t-\tau)|^2) \quad (3\text{-}21)$$

$$= \frac{1}{2}(T^2 + 2T(a(t) + a(t-\tau)) + SSBI_1)$$

$$I_1 - I_2 = \text{Re}((T+S(t))j(T+S^*(t-\tau))e^{j\omega_c\tau}) \quad (3\text{-}22)$$

$$= -\text{Im}((T^2 + S(t)S^*(t-\tau) + T(S(t) + S^*(t-\tau)))e^{j\omega_c\tau})$$

$$= -\text{Im}((T^2 + SSBI_2 + T[a(t) + a(t-\tau) + j(b(t) - b(t-\tau))])e^{j\omega_c\tau})$$

where the signal-signal beating interferences (SSBI) are merged into one term. By subtracting the mean and ignoring the SSBI, assuming for now a sufficiently high carrier to signal power ratio (CSPR), (3-21) and (3-22) can be reformulated as $$I_1 + I_2 = T[a(t) + a(t-\tau)] \quad (3\text{-}23)$$

$$I_1 - I_2 = -T\{[a(t) - a(t-\tau)] \sin \omega_c\tau + [b(t) - b(t-\tau)] \cos \omega_c\tau\} \quad (3\text{-}24)$$

When the MZI is biased at the intensity quadrature, $\cos \omega_c \tau$ is one and $\sin \omega_c \tau$ is zero, thus removing the crosstalk of the real part a(t) and leaving only the imaginary part b(t) in the current difference (3-24). Therefore, $I_1-I_2=-T[b(t)-b(t-\tau)]$. In a similar way as (3-16), a(t) and b(t) can be formulated respectively as $$a(t) = F^{-1}\left(\frac{F(I_1 + I_2)}{T(1 + e^{-j\omega\tau})}\right) \quad (3\text{-}25)$$

$$b(t) = F^{-1}\left(\frac{F(I_1 - I_2)}{T(1 - e^{-j\omega\tau})}\right) \quad (3\text{-}26)$$

In (3-25) and (3-26), $1+e^{-j\omega\tau}$ and $1-e^{-j\omega\tau}$ equal 0 when $$\omega = \frac{\pi + k_1 2\pi}{\tau} \text{ and } \frac{k_2 2\pi}{\tau},$$

respectively, where $k_1$ and $k_2$ take non-negative integers. Note that ω is the angular frequency.

Thus, this scheme is suitable for multi-subcarrier signaling schemes to avoid the frequency nulls of the denominator. Note that the ignored SSBI earlier can be estimated using the estimate of s(t) and subtracted from (3-21) (3-22) for an improved estimate of s(t). This process can be repeated to achieve a good signal SNR.

§ 4.0 SIMULATION RESULTS FOR THE 200 GB/S AND 400 GB/S ACR

Figure 22:
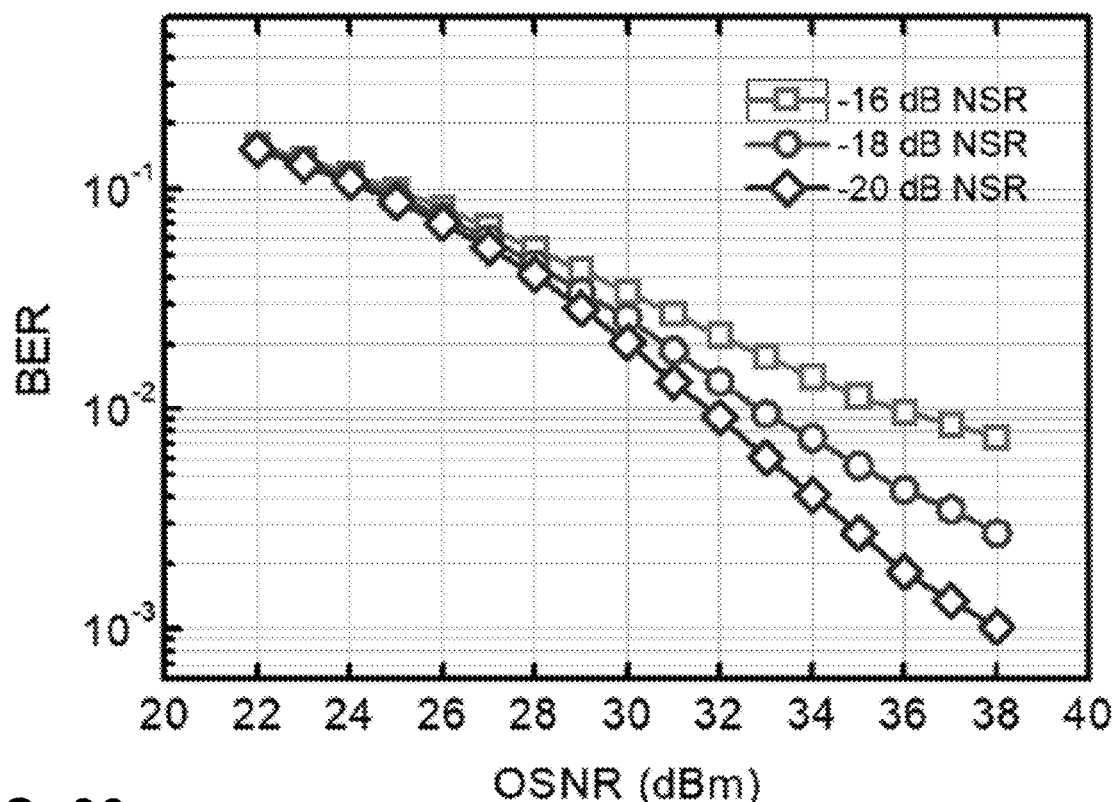
FIG. 22 is a graph of internal noise for the ACR with a DE. Here, each sideband includes 20 Gbaud16 QAM, CSPR=10 dB, four iterations for SSBI cancellation, 1.25 GHz Guard band from 0 GHz, Dispersion −200 ps/nm, and 40 km SMF.
Figure 23:
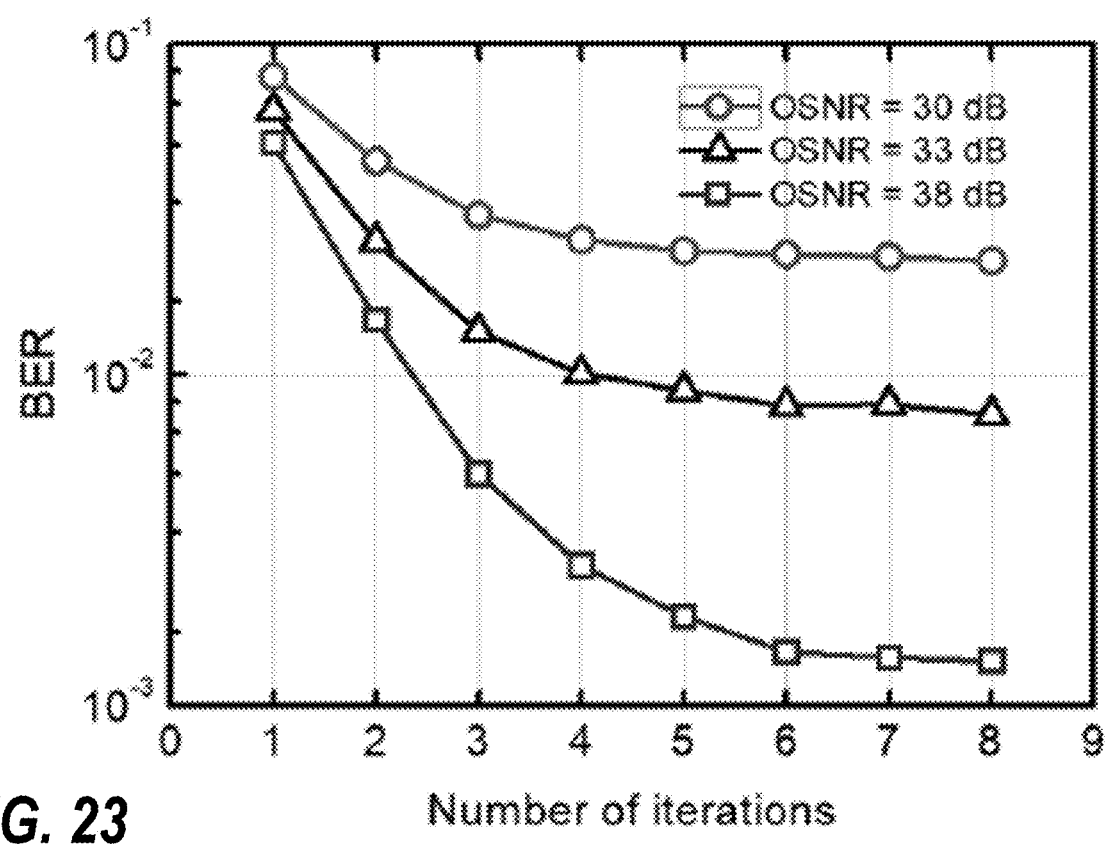
FIG. 23 is a graph of OSNR and BER for a number of iterations in the setup of FIG. 13A and in a B2B configuration and after 40 km.

FIG. 22 is a graph of internal noise for the ACR. Here, each sideband includes 20 Gbaud 16 QAM, CSPR=10 dB, four iterations for SSBI cancellation, 1.25 GHz Guard band from 0 GHz, Dispersion −200 ps/nm, and 40 km SMF. FIG. 23 is a graph of OSNR and BER for a number of iterations, using the setup of FIG. 13A and after 40 km SMF.

Figure 24:
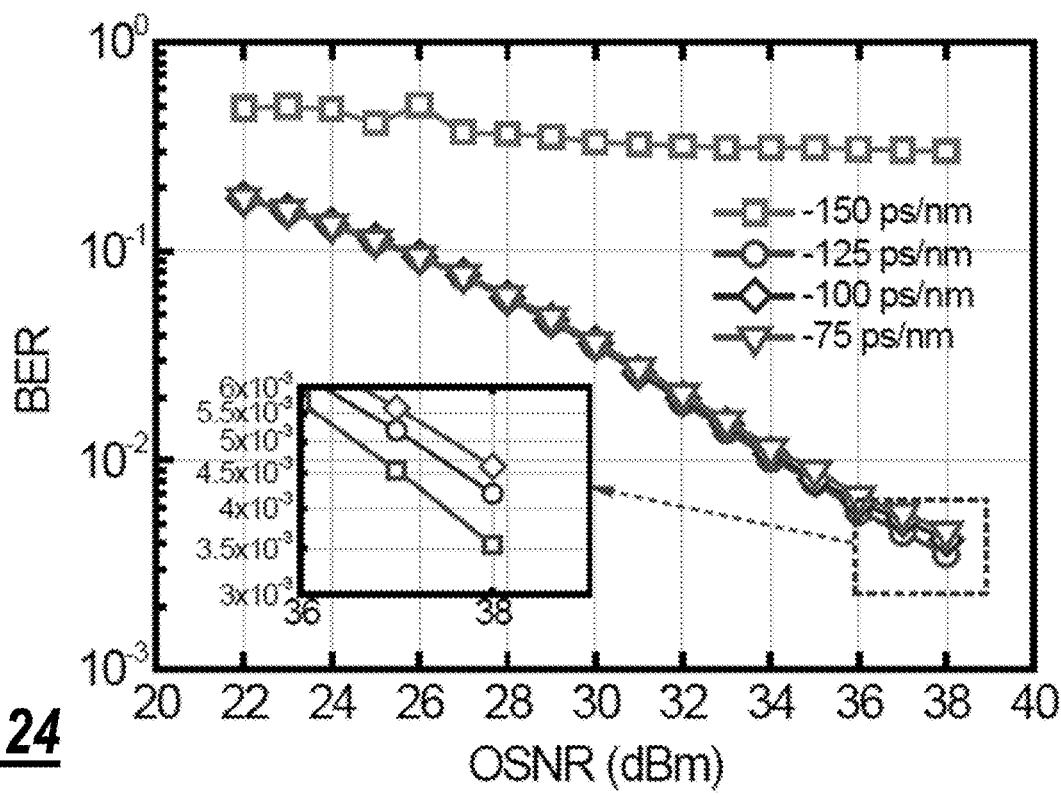
FIG. 24 is a graph of dispersion optimization of the DE in the ACR for a single wavelength 200 Gb/s signal, using the setup of FIG. 22.
Figure 25:
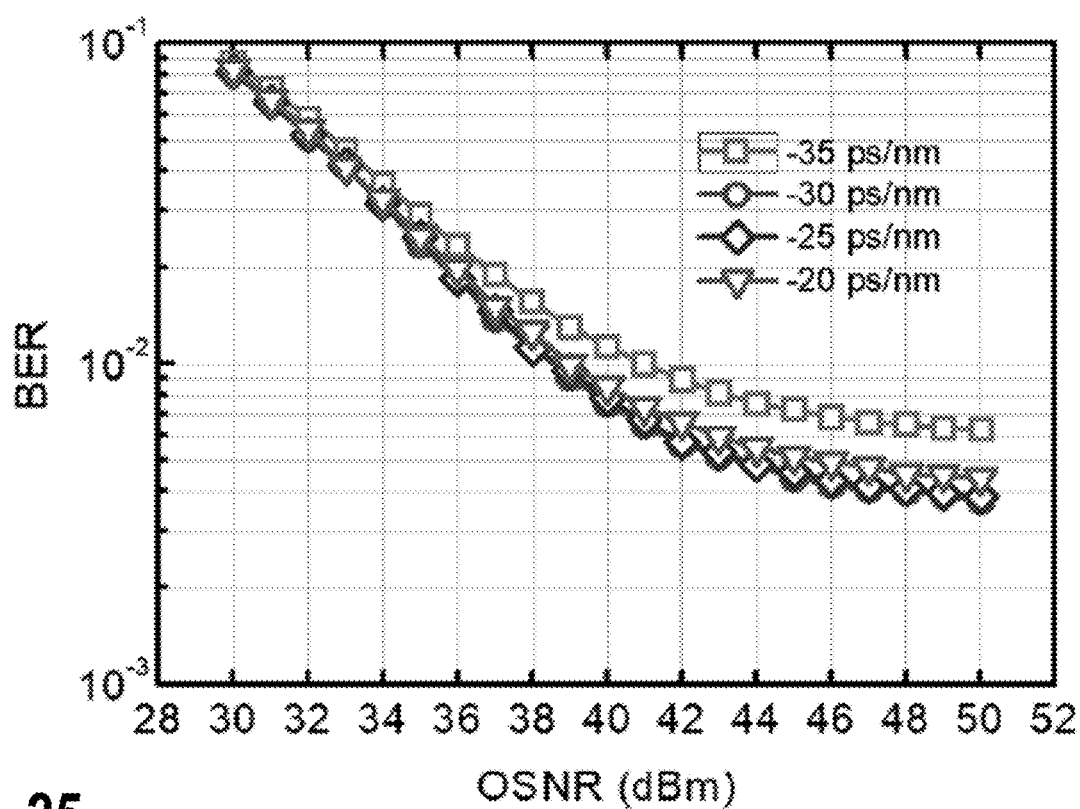
FIG. 25 is a graph of dispersion optimization of the DE in the ACR for a single wavelength 400 Gb/s signal, using the setup of FIG. 22.

FIG. 24 is a graph of dispersion optimization of the DE in the ACR for a single wavelength 200 Gb/s signal, using the setup of FIG. 22. FIG. 25 is a graph of dispersion optimization of the DE in the ACR for a single wavelength 400 Gb/s signal, using the setup of FIG. 13A.

Figure 26A:
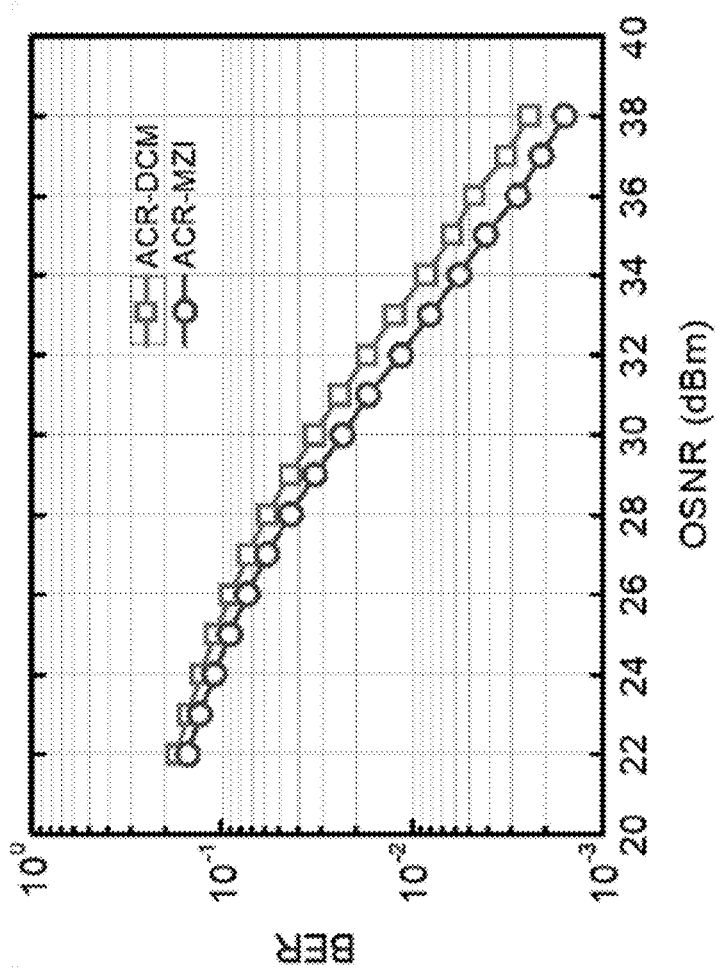
FIGS. 26A-26B are a graph comparing an ACR with a DE (ACR-DCM) relative to an ACR with an interferometer (ACR-MZI) (FIG. 26A) for a single wavelength 200 Gb/s double sideband signal and a schematic of each of the ACR-DCM and ACR-MZI (FIG. 26B).
Figure 26B:
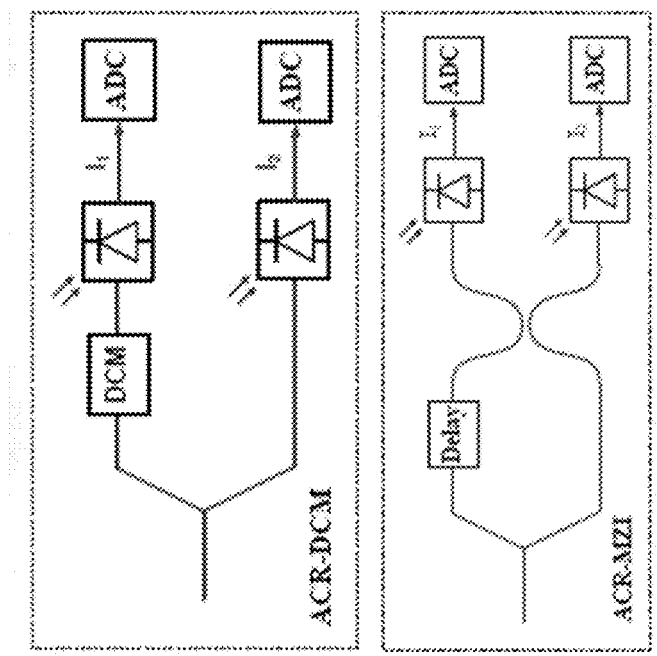

FIGS. 26A-26B are a graph comparing an ACR with a DE (ACR-DCM) relative to an ACR with an interferometer (ACR-MZI) (FIG. 26A) and a schematic of each of the ACR-DCM and ACR-MZI (FIG. 26B). This setup includes a 25 Gbaud16 QAM for each sideband, a Roll-off=0.1, a 2 GHz Guard band from 0 GHz, internal noise −18 dB NSR, 40 km SMF, four iterations for SSBI cancellation, Dispersion optimized to be −125 ps/nm for ACR-DCM, Delay optimized to be 16 ps for ACR-MZI, and CSPR optimized to be 10 dB and 9 dB for ACR-DCM and ACR-MZI, respectively.

§ 5.0 PROCESS FOR ASYMMETRIC DIRECT DETECTION OF OPTICAL SIGNALS

Figure 27:
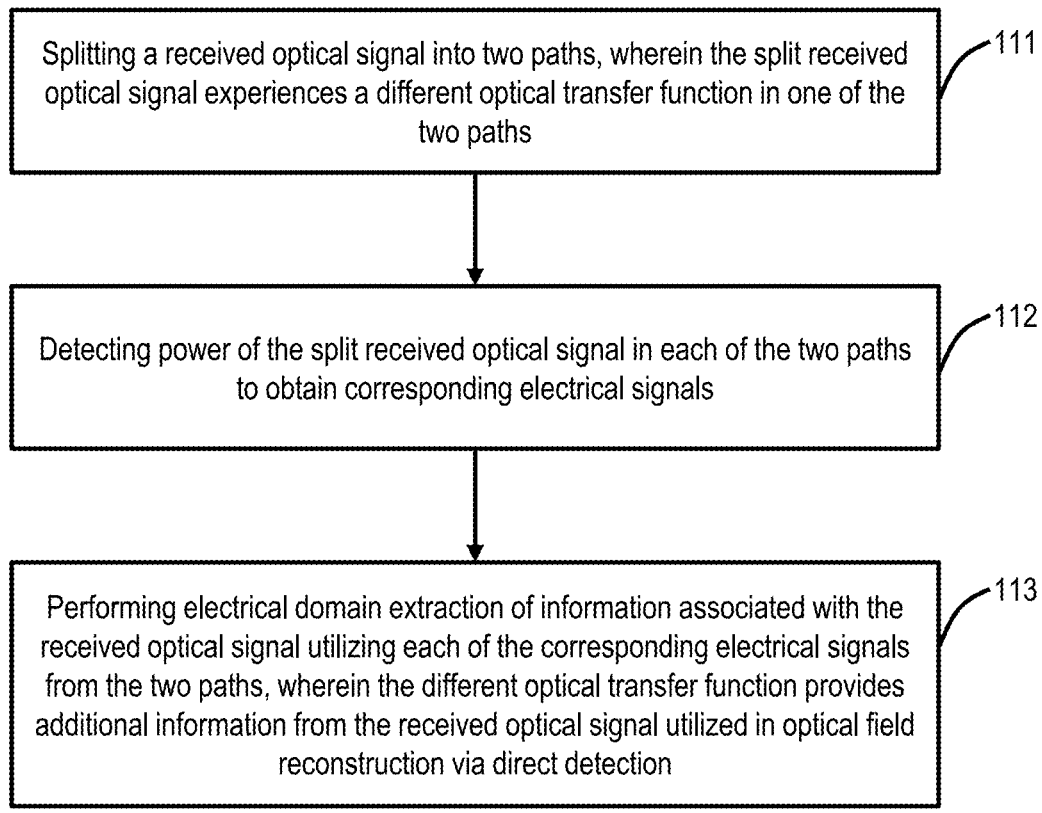
FIG. 27 is a flowchart of a process for asymmetric direct detection of optical signals.

FIG. 27 is a flowchart of a process 110 for asymmetric direct detection of optical signals. The process 110 contemplates implementation with any of the receiver 10 in FIG. 1, the ACR 70 in FIGS. 13A and 20, the ACR 90 in FIG. 19, the ACR 100 in FIG. 21, and any other receiver implementation consistent with the functionality described herein. The process 110 includes splitting a received optical signal into two paths, wherein the split received optical signal experiences a different optical transfer function in one of the two paths (step 111); detecting power of the split received optical signal in each of the two paths to obtain corresponding electrical signals (step 112); and performing electrical domain extraction of information associated with the received optical signal utilizing each of the corresponding electrical signals from the two paths, wherein the different optical transfer function provides additional information from the received optical signal utilized in optical field reconstruction via direct detection (step 113).

In an embodiment, the received optical signal is self-coherent (SC) complex double sideband (DSB). The different transfer function can be caused by a dispersive element (DE 78) or an interferometer 102. In another embodiment, the received optical signal includes orthogonal offset carriers assisted polarization multiplexed single sideband signals. The different transfer function can be caused by a filter 12 to reduce the power a carrier in one polarization.

The performing can include iterative signal-signal beating interference (SSBI) cancellation. The detecting can include square-wave detection. The detecting can further include performing analog-to-digital conversion to obtain the corresponding electrical signals. The performing electrical domain extraction of information is via a digital signal processor (DSP).

In another embodiment, an asymmetric coherent receiver is described, such as any of the receiver 10 in FIG. 1, the ACR 70 in FIGS. 13A and 20, the ACR 90 in FIG. 19, the ACR 100 in FIG. 21, and any other receiver implementation consistent with the functionality described herein. The asymmetric coherent receiver can include an optical front end configured to split a received optical signal into two paths, wherein the split received optical signal experiences a different optical transfer function in one of the two paths; two photodetectors each configured to detect one of the split received optical signals in each of the two paths to obtain corresponding electrical signals; and circuitry configured to perform electrical domain extraction of information associated with the received optical signal utilizing each of the corresponding electrical signals from the two paths, wherein the different optical transfer function provides additional information from the received optical signal utilized in field reconstruction via direct detection.

§ 6.0 FILTER RESPONSE ASSISTED ITERATIVE KK PROCESS FOR VSB SYSTEMS

In another embodiment, the present disclosure includes a filter response aware iterative KK algorithm to improve the accuracy of SSB signal reconstruction in a vestigial sideband (VSB) system. The following experimentally and numerically shows that this algorithm outperforms conventional KK algorithms in a 100 Gb/s VSB system.

§ 6.1 Introduction

High-speed double sideband (DSB) intensity-modulation direct-detection (IM/DD) transmission has been intensively studied as a potential low-cost solution for short-reach applications such as intra-data center interconnects [34]. However, for longer transmission distances, it suffers from chromatic dispersion (CD)-induced power fading [35]. To overcome this issue without significantly increasing hardware complexity, the use of single sideband (SSB) self-coherent transmission has been proposed. This solution enables digital CD compensation at the receiver using a single photodetector (PD) [36-39]. At the transmitter, one can either digitally generate the complex-valued SSB signal and modulate it using an IQ modulator [37], or digitally generate a real-value DSB signal and modulate it using an intensity modulator, followed by a passive optical filter to cut half of the spectrum [38-39]. The latter scheme is also known as vestigial sideband (VSB) modulation. Its name stems from the fact that the unwanted sideband is usually insufficiently suppressed due to the limited roll-off of the optical filter. A key step in the receiver digital signal processing (DSP) of an SSB system is the reconstruction of the clean SSB signal without signal-to-signal beating interference (SSBI). The conventional Kramers-Kronig (KK) algorithm, which includes a logarithm (log) function (conv-log-KK) is a widely used SSB signal reconstruction method [36-37]. The authors of conv-log-KK also proposed a conventional iterative KK (conv-iterKK) algorithm to avoid the use of log function. As the number of iterations increases, the performance of conv-iterKK converges to the performance of conv-log-KK [36]. Both these algorithms assume that the received signal is rigorously SSB, which is not strictly true in a VSB system, wherein the under-filtered residual sideband would degrade the performance of conventional KK algorithms [39]. Consequently, a VSB system typically requires a sharp optical filter to achieve the desired performance.

The present disclosure includes a filter response aware iterative KK (FA-iterKK) algorithm, which utilizes the optical filter response information to improve the accuracy of SSB signal reconstruction in the presence of under-filtered residual sideband. This algorithm is tested in a 56 Gbaud VSB—four-level pulse amplitude modulation (PAM4) transmission system over 40-80 km of single-mode fiber (SMF) and experimentally shown that FA-iterKK outperforms conventional KK algorithms for the parameter of this study. It is also demonstrated through simulation that FA-iterKK can reduce the optical filter roll-off requirement of a VSB-PAM4 system.

§ 6.2 Filter Response Aware Iterative KK Algorithm

FIGS. 28A-28B depict the optical filter response and the spectrum of the received signal in a typical VSB system. Without loss of generality, assume that the optical filter suppresses the left sideband (LSB) spectrum. The received signal includes three parts: a strong direct current (DC) carrier c, the targeted right sideband (RSB) $s_1(t)$ and the residual LSB $s_2^*(t)$. Here let's define $s_2(t)$ as the complex conjugate of the residual LSB for the convenience of derivation, so that $s_1(t)$ and $s_2(t)$ only contain RSB spectral components. After square-law detection and an analog-to-digital converter (ADC), the sampled photo-current is given by $$I[n] = (c + s_1[n] + s_2^*[n])(c + s_1^*[n] + s_2[n]) = \qquad (6\text{-}1)$$
$$\{c + \text{Re}(s_1[n]) + \text{Re}(s_2[n])\}^2 - \{\text{Im}(s_1[n]) - \text{Im}(s_2[n])\}^2$$

where $s_i[n]$, i=1,2 is the sampled version of $s_i(t)$.

Now let's define the RSB part of the signal before transmission and optical filtering as $s_0(t)$, which results in $s_0[n]$ after sampling:

$$s_1[n] = \text{IFT}\{\text{FT}\{s_0[n]\}H_{CD}(j\omega)H_F(j\omega)\} \qquad (6\text{-}2)$$

$$s_2[n] = \text{IFT}\{\text{FT}\{s_0^*[n]\}H_{CD}(j\omega)H_F(j\omega)\} \qquad (6\text{-}3)$$

where FT{ } and IFT{ } represent the Fourier and inverse Fourier transforms, $H_{CD}(j\omega)$ and $H_F(j\omega)$ represent the frequency responses of CD and the optical filter. $H_F(j\omega)$ can be obtained through measurement, and $H_{CD}(j\omega)$=exp($-\frac{1}{2}j\beta_2\omega^2 L$), where $\beta_2$ and L are the group velocity dispersion coefficient and the transmission distance. Then define $$b[n] = \underline{\text{Re}(s_1[n]) + \text{Re}(s_2[n])} =$$
$$\sqrt{I[n] - \{\text{Im}(s_1[n]) - \text{Im}(s_2[n])\}^2} - c \qquad (6\text{-}4)$$

Based on Eq. (6-2)-(6-3), it is possible to compute $s_1[n]$ and $s_2[n]$ from b[n] by $$s_1[n] = \text{IFT}\left\{\frac{FT\{b[n]\}H_{RSB}(j\omega)H_{CD}(j\omega)H_F(j\omega)}{H_{CD}(j\omega)H_F(j\omega) + H_{CD}^*(-j\omega)H_F^*(-j\omega)}\right\} \qquad (6\text{-}5)$$

-continued $$s_2[n] = IFT\left\{\frac{FT\{b[n]\}H_{RSB}(j\omega)H_{CD}^*(-j\omega)H_F^*(-j\omega)}{H_{CD}(j\omega)H_F(j\omega) + H_{CD}^*(-j\omega)H_F^*(-j\omega)}\right\} \quad (6\text{-}6)$$

where $H_{RSB}(j\omega)$ is a digital RSB filter, which keeps all the positive frequency components and sets zeros to all the negative frequency components.

As shown in FIG. 29, the proposed FA-iterKK algorithm iteratively uses Eq. (6-4)-(6-6) to provide a more accurate estimation of b[n] given I[n], $H_{CD}(j\omega)$ and $H_F(j\omega)$, and it can be regarded as an enhanced version of the conv-iterKK algorithm originally designed for an ideal SSB signal [36]. If the received signal is rigorously SSB, $s_2[n]$ vanishes, in each iteration of conv-iterKK, Im($s_1[n]$) can first be estimated from Re($s_1[n]$) based on the KK relation [36], then Re($s_1[n]$) will be updated based on the new estimation of Im($s_1[n]$) using Eq (6-4). However, in a VSB system, $s_2[n]$ exists. Thus in each iteration of FA-iterKK, one needs to estimate Im($s_1[n]$) and Im($s_2[n]$) from b[n] based on the optical filter response $H_F(j\omega)$ using Eq. (6-5)-(6-6).

Once b[n] is determined, $s_0[n]$ can be recovered as $$s_0[n] = IFT\left\{\frac{FT\{b[n]\}H_{RSB}(j\omega)}{H_{CD}(j\omega)H_F(j\omega) + H_{CD}^*(-j\omega)H_F^*(-j\omega)}\right\} \quad (6\text{-}7)$$

Eq. (6-7) can be regarded as a generalized CD compensation step. If there is an ideal optical filter with $H_F(j\omega)=H_{RSB}(j\omega)$, $H_{CD}^*(-j\omega)H_F^*(-j\omega)$ vanishes, and Eq. (6-7) degenerates to classic CD compensation of the RSB components. Note that CD compensation is always required even using conventional KK algorithms. Though Eq. (6-5)-(6-7) seem complicated at first glance, each equation merely applies a linear filters to b[n] in the frequency domain, and the filter coefficients can be computed offline and pre-stored, since they only depend on the fiber parameters and the optical filter shape.

The derivation above ignores the component bandwidth limitations, which would also lead to inter-symbol interference (ISI). Theoretically, in Eq. (6-2)-(6-3), one should replace $H_{CD}(j\omega)H_F(j\omega)$ with the end-to-end channel response to get the best performance. In practice, one can first assume that $s_0[n]$ has ISI, which can be recovered using FA-iterKK algorithm based on Eq (6-4)-(6-7). Then an equalizer will be applied to this recovered $s_0[n]$ to mitigate the ISI.

§ 6.4 Experimental and Numerical Results

The performances of FA-iterKK, conv-iterKK and conv-log-KK algorithms are experimentally compared in a 112 Gb/s VSB-PAM4 system, as shown in FIG. 30A. A "DAC-less" transmitter is used based on two binary pattern generator (BPG) channels and a silicon photonic segmented Mach-Zehnder modulator to generate a 56 Gbaud PAM4 signal without any transmitter DSP [39]. The DC carrier is tuned by adjusting the bias point of the modulator. After 40-80 km of SMF, an optical filter is used with a roll-off of ~15 dB/10 GHz as the VSB filter. The measured filter response and the signal spectra before and after filtering are shown in FIG. 30B. The VSB signal is detected by a 50 GHz PD then sampled by a 160 GSa/s real-time oscilloscope (RTO). The receiver DSP blocks are shown in FIG. 30C. Regardless of the choice of the KK algorithm, CD compensation is always implemented as Eq. (6-7), and the nonlinear equalizer is implemented as Eq. (6-8).

$$y[n] = \Sigma_{i=-20}^{20} h_i x[n-i] + \Sigma_{j=-2}^{2} w_j x^2[n-j] \quad (6\text{-}8)$$

Figures 31A, 31B:
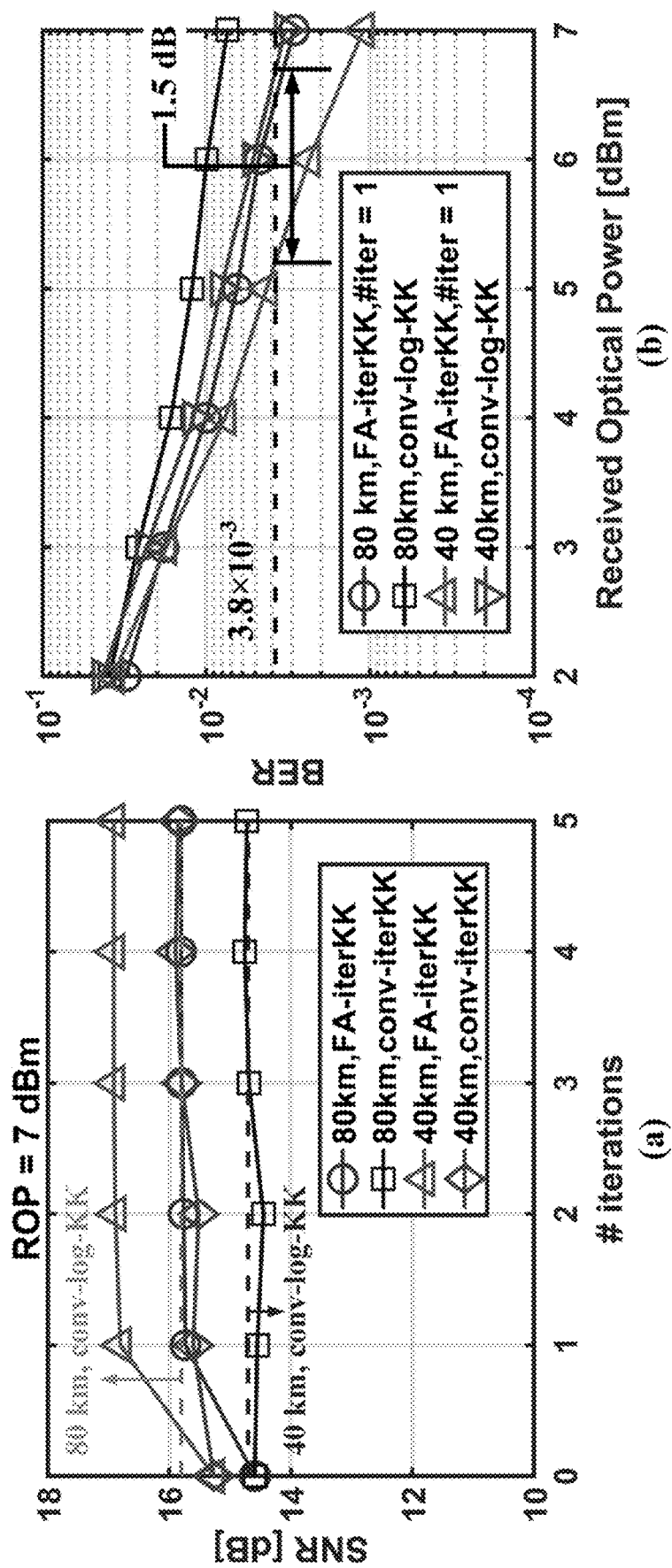
FIGS. 31A-31B are experimental results of SNR versus the number of iterations in conv-iterKK and FA-iterKK algorithms and SNR achieved by conv-log-KK algorithm (FIG. 31A), and receiver sensitivity requirement when using conv-log-KK and FA-iterKK algorithms (FIG. 31B).

The number of iterations in FA-iterKK and conv-iterKK algorithms is swept, and the results are shown in FIG. 31A. For comparison, the performances of conv-log-KK algorithm is shown as dashed lines in FIG. 31A. In both FA-iterKK and conv-iterKK algorithms, "0 iteration" corresponds to the case where the initial guess $b[n]=\sqrt{I[n]}-c$ is used directly as the output. Observe that both conv-iterKK and conv-log-KK achieve a modest signal to noise ratio (SNR) improvement compared to the "0 iteration" case, since the residual LSB cannot be neglected, even though a sharp optical filter is already used. On the other hand, FA-iterKK algorithm requires just one iteration to achieve apparent SNR improvement. FIG. 31B shows the bit error rate (BER) as functions of received optical power (ROP) when using 1) FA-iterKK with 1 iteration and 2) conv-log-KK. At 40 km, FA-iterKK achieves a receiver sensitivity gain of 1.5 dB with respect to conv-log-KK at hard-decision forward error correction (HD-FEC) threshold of $3.8\times10^{-3}$ with 7% overhead [40], and at 80 km, only FA-iterKK algorithm can achieve 112 Gb/s transmission with a BER below the threshold.

Figures 32A, 32B, 32C:
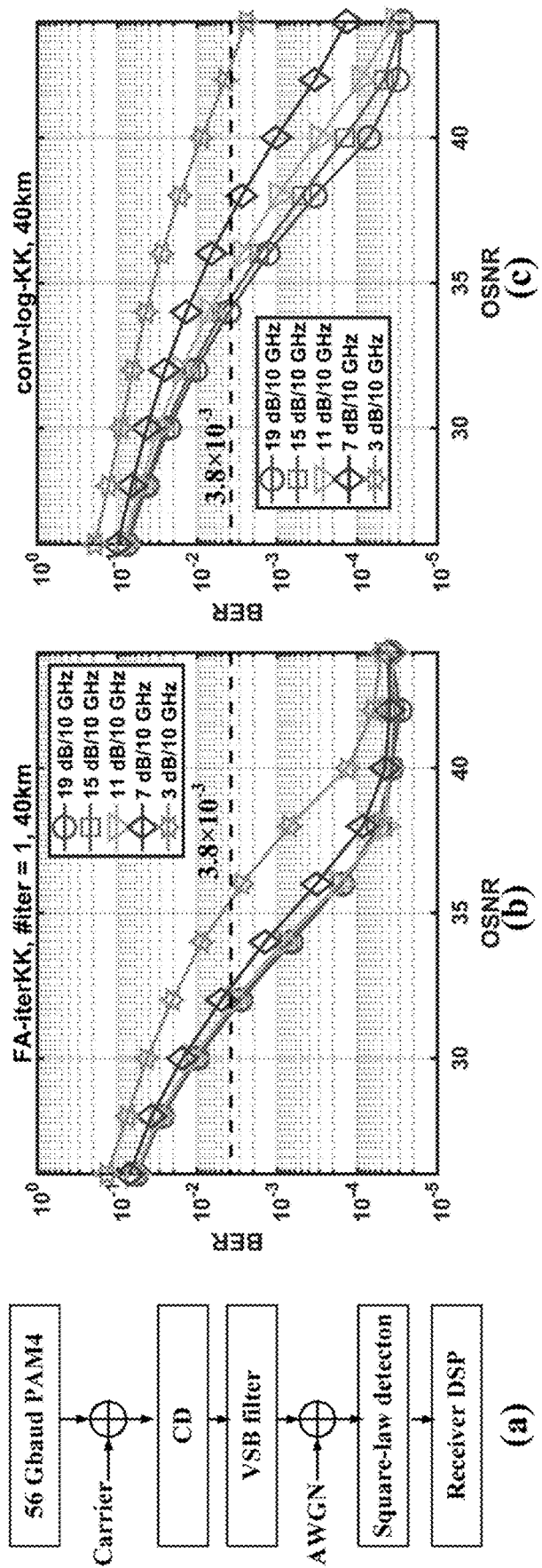
FIGS. 32A-32C are a simulation setup to investigate the filter roll-off tolerance of different KK algorithms (FIG. 32A), and simulated BER-OSNR relations with different optical filters when processed with FA-iterKK algorithm with one iteration (FIG. 32B) and conv-log-KK algorithm (FIG. 32C).

FA-iterKK improves the BER performance compared to conventional KK algorithms when applied to the same system, which indicates that FA-iterKK can tolerate more residual LSB, i.e. achieve the same BER as conv-log-KK but with a less-sharp optical filter. FIG. 32A shows the simulation setup for numerically studying the roll-off of the optical filter used in the experiment. In this model, the additive white Gaussian noise (AWGN) from the channel, the CD, the VSB filter and the square-law detection are considered. FIGS. 32B-32C show the simulation results at 40 km when using 1) FA-iterKK with 1 iteration and 2) conv-log-KK. In this simulation, OSNR includes carrier power, and the carrier to signal power ratio (CSPR) is optimized within the range of 8-14 dB for each optical filter roll-off and each OSNR value. Observe that with a similar optical signal to noise ratio (OSNR), FA-iterKK requires a less-sharp optical filter to achieve the same BER as conv-log-KK. For example, with 36 dB OSNR, conv-log-KK requires an 11 dB/10 GHz optical filter to achieve a BER of $3.8\times10^{-3}$, while FA-iterKK only requires a 3 dB/10 GHz filter to achieve comparable performance. With 32 dB OSNR, conv-log-KK cannot achieve a BER below $3.8\times10^{-3}$, even using a sharp 19 dB/10 GHz filter, while FA-iterKK requires a 11 dB/10 GHz filter to achieve the HD-FEC threshold BER.

The FA-iterKK algorithm utilizes the optical filter response information to improve the accuracy of SSB signal reconstruction in a VSB system. It was experimentally proven that FA-iterKK outperforms conventional KK algorithms in a 56 Gbaud VSB-PAM4 system over 40-80 km when the residual LSB is not negligible. It was also numerically shown that FA-iterKK has potential to reduce the optical filter roll-off requirement of a VSB system.

§ 7.0 ASYMMETRIC SELF-COHERENT RECEIVER

The bandwidth upgrade required in short reach optical communications has prompted the need for detection schemes that combines field reconstruction with a cost-effective subsystem architecture. The most widely pursued self-coherent detection schemes for single-sideband signals have an intrinsic throughput limit because of an image band without any information loading. Here we propose the asymmetric self-coherent receiver (ASCR), which approaches the electrical spectral efficiency (ESE) of coherent detection using two single-ended photodiodes (PD).

Each PD detects a portion of the received optical signal that experience different optical transfer functions via an optical filter with a flexible response. We derive an analytical solution to the received signal field and prove the optimality of an all-pass phase notch filter for ASCR. Further, we characterize the performance of a specific ASCR realization based on a second-order approximation of the ideal filter, and subsequently validate the principle of ASCR by means of a transmission experiment. The results herein not only serve as a guideline for the filter design in ASCR in order to optimize the system performance, but also establish the basis for constrained optimizations of the filter response due to limits of fabrication process and material platform. Notably, ASCR fuses the high ESE of coherent detection with the cost-effectiveness of direct detection, thus showing the potential for a variety of short reach applications including the edge cloud connection and mobile X-haul; however, ASCR is also of relevance to the broader topic of field reconstruction, which draws extensive interests in many fields of optics.

§ 7.1 INTRODUCTION

Optical modulation encodes information onto the physical dimensions of optical carriers. Intensity modulation direct detection (IMDD) extracts only the square of the field amplitude and consequently are restricted to signaling schemes utilizing one real dimension [2]. As a phase diverse scheme, coherent detection exploits an addition degree of freedom, thus yielding a complex modulation dimension with doubled spectral efficiency (SE) [41]. Most important is the powerful combination of field recovery with the high speed very large-scale integration (VLSI) circuits, which enables all-digital compensation for various transmission impairments including polarization-mode dispersion (PMD), chromatic dispersion (CD), and laser phase noise. This distinct advantage removes the need for complex analog compensation techniques either by optics or electronics [42, 43]. As such, the last decade has witnessed the rapid advancement and massive deployment of digital coherent optical transceivers in long-haul transmission links following an ever-increasing demand for bandwidth upgrade [45, 46].

Though coherent detection has been entertained for the short reach optical communications recently [400 ZR], IMDD is still dominantly employed due to the cost-effectiveness. Nevertheless, the capacity of IMDD systems is constrained by CD and one-dimension modulation, thus requiring more parallel lanes to be packed into a small form factor for throughput scaling and becoming less suitable under a tight power constraint in short reach use cases. Self-coherent detection (SCD) has attracted extensive research interest in recent years because of combining the field reconstruction of coherent detection with the cost-effectiveness of direct detection [47-55]. SCD schemes inject a continuous-wave (CW) tone at the transmitter, which co-propagates with the signal, and beats with the signal via direct detection. This configuration eliminates the need for a separate local oscillator (LO) at the receiver, which not only relaxes the requirement for the laser stabilization, but also leads to complexity reduction in digital signal processing (DSP) due to the removal of the carrier phase recovery. There are a myriad of SCD schemes for the detection of single sideband (SSB) signals based on a single-ended photodiode (PD), because the electric field can be readily extracted from the signal-tone beating after square-law detection. The main challenge of these SCD schemes is to remove the signal-signal beating interference (SSBI), which could appear within the signal band and compromises the transmission performance. Earlier schemes utilize a guard band as wide as the information bearing signal to accommodate the SSBI [Brendon] at the expense of reduced electrical spectral efficiency (ESE). Another technique allows a smaller guard band by removing the SSBI in an iterative manner. The recent proposal of the Kramers-Kronig (KK) coherent detection handles the SSBI via the KK relation and a marginal guard band could be applied provided that the CW-tone and signal satisfy the minimum phase condition [46]. Hence, these SCD schemes can down-convert the full optical information to the electrical baseband, enabling the digital compensation of CD for extended transmission reach [47-49]. Nonetheless, these SSB SCD schemes have an intrinsic capacity limit: the CW tone is at the edge of the signal spectrum and no information is loaded onto the image band, thereby constraining the attainable ESE. It can be argued that this type of SCD is a heterodyne coherent detection.

Doubling the ESE without substantially increasing the complexity both in DSP and hardware is thus an appealing objective that requires ingenious design of SCD schemes for the field recovery of complex double sideband (DSB) signals [50-53]. In [Xi Chen], a time-domain interleaved scheme allocates the CW-tone and signal to different time slots and relies on two matched signal copies and a conventional coherent receiver to extract the in-phase and quadrature components of the electric field. However, the ESE is not improved compared to SSB SCD schemes, because only half of the time-domain waveform is loaded with signal. [Shieh] proposed the carrier assisted differential detection (CADD), which restores the signal field by adding an extra PD to detect the intensity of a delayed signal copy in addition to the receiver structure in [Xi Chen]. The ESE improvement is achieved at the expense of five PDs (2 BPDs and 1 PD) and three ADCs, which increases the hardware complexity. Another alternative utilizes two band rejection filters to reject the opposite sidebands of a DSB signal such that two PDs at the receiver detect a self-coherent SSB signal, respectively [50]. However, schemes based on band-rejection filters are sensitive to the laser drift, thus requiring more precise wavelength stabilization. Band rejection filters with a sharp filter edge are also costly and difficult to realize in current filter technologies, especially when on-chip integration is required for a compact footprint.

In this paper, we propose a novel SCD scheme for self-coherent DSB signals, which is called asymmetric self-coherent receiver (ASCR). ASCR doubles the ESE compared to the aforementioned SSB SCD schemes using two single-ended PDs. Each PD detects one portion of the received optical signal that experiences different optical transfer functions via an optical filter with a flexible response. Based on this general architecture, we derive an analytical solution to the full field of DSB signals, which not only allows the all-digital compensation of transmission impairments as the coherent detection, but also relaxes the requirement for narrow linewidth lasers and the remote wavelength management. The field solution also interestingly reveals an intrinsic 0 GHz singularity in the baseband, which is independent of the filter response design. Nonetheless, the impact of the singularity, as we will show hereafter, can be effectively mitigated by use of a moderate guard band provided that the filter response is appropriately designed. Furthermore, we prove the optimality of an all-pass phase notch filter, whose second order approximation is a chromatic dispersion (CD) filter. Due to the realizability of CD filters by various mature components, we conduct a parametric study of this CD filter based ASCR and experimentally validate the concept of ASCR based on this specific realization. Since the field is restored by means of the derived solution form, thousands of iterations are not required as in [Haoshuo Chen] and the electrical noise from PD and ADC does not need to be zero due to the finite difference approximation [Masayuki], which is opposed to practical devices. We also note that the results herein serve as a guideline for the filter design of ASCR to approach the optimal transfer function and establish the basis for the constrained optimization of the filter response due to the limits of the fabrication process and material platform. ASCR fuses the high ESE of coherent detection with the cost-effectiveness of direct detection and thus is suitable for different short reach applications including edge cloud connection and mobile X-haul. ASCR is also closely connected to the broader topic of field reconstruction, which draws extensive interests in many fields of optics.

§ 7.2 A GENERAL FIELD SOLUTION FOR ASCR

Figure 33:
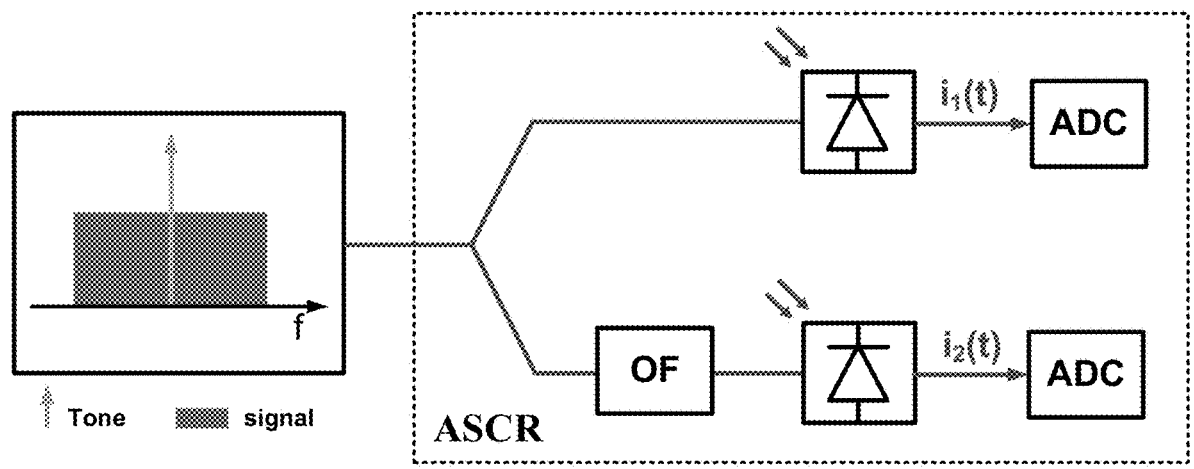
FIG. 33 is a diagram of an architecture of asymmetric self-coherent receiver. OF: optical filter.

The architecture of ASCR is depicted in FIG. 33, where the received optical signal is split into two portions, which are detected by two single ended PDs. An optical filter with a flexible response is utilized so that the two detected signal portions experience distinct optical transfer functions. An intuitive perception of the working principle for the moment is the auxillary information extracted from the filter branch to assist the field reconstruction. Thus, the crux of this architecture is the appropriate configuration of the filter response considering the intrinsic property of ASCR, e.g. the 0 GHz singularity as we will show later, and the desired system performance.

The photocurrents after square-law detection are $i_1(t)$ and $i_2(t)$, which are expressed as follows:

$$i_1(t) = |T + s(t)|^2 + n_1(t) = |T|^2 + 2T\mathrm{Re}(s(t)) + |s(t)|^2 + n_1(t) \quad (7\text{-}1)$$

$$i_2(t) = |(T + s(t)) \otimes h(t)|^2 + n_2(t) \quad (7\text{-}2)$$
$$= |T \otimes h(t)|^2 + 2\mathrm{Re}(\overline{T \otimes h(t)} \cdot s(t) \otimes h(t)) + |s(t) \otimes h(t)|^2 + n_2(t)$$

where T is the CW-tone, s(t) is the complex DSB signal, h(t) is the transfer function of the optical filter, $\bar{x}$ represents the complex conjugate of x, $n_1(t)$ and $n_2(t)$ are the noise. For the simplicity of the analysis, the noises are assumed to be uncorrelated white Gaussian noise which has the highest entropy at a given power. It is seen that (7-1) and (7-2) both contain a DC component, a linear signal term, and a term due to the signal-signal beating interference (SSBI). Next, we ignore the DC components that can be readily removed, decompose the signal into real and imaginary parts, and express the photocurrents in the Fourier domain as follows:

$$I_1(\omega) - R_1(\omega) = 2TS_I(\omega) + N_1(\omega) \quad (7\text{-}3)$$

$$I_2(\omega) - R_2(\omega) = 2T\,\mathrm{Re}\{\overline{H(0)}S(\omega)H(\omega)\} + N_2(\omega) \quad (7\text{-}4)$$

where the capital letter denotation represent the corresponding Fourier transforms except that $R_1$ and $R_2$ are the Fourier transform of SSBI terms $|s(t)|^2$ and $|s(t)\otimes h(t)|^2$, respectively. Since the polar coordinates are more suitable to analyze the filter response, we write the transfer function $H(\omega)$ in polar form as follows, whose amplitude and phase can be further decomposed into even and odd parts denoted by the subscripts E and O, respectively.

$$H(\omega) = A(\omega)\exp(j\Phi(\omega)) \quad (0 \le A(\omega) \le 1) \quad (7\text{-}5)$$
$$= (A_O(\omega) + A_E(\omega))\exp(j(\Phi_O(\omega) + \Phi_E(\omega)))$$

Note that $A_O(0) = \Phi_O(0) = 0$ for being odd functions. Without loss of generality, we set $\Phi(0) = 0$. Then we expand (7-4) using (7-5) and derive the formula below after simplification:

$$I_2(\omega) - R_2(\omega) = 2T(S_I(\omega)Q(\omega) - S_Q(\omega)P(\omega)) + N_2(\omega) \quad (7\text{-}6)$$

with $Q(\omega)$ and $P(\omega)$ expressed as follows:

$$Q(\omega) = A_E(0)\exp(\Phi_O(\omega))\begin{pmatrix} A_E(\omega)\cos(\Phi_E(\omega)) + \\ jA_O(\omega)\sin(\Phi_E(\omega)) \end{pmatrix} \quad (7\text{-}7)$$

$$P(\omega) = A_E(0)exp(\Phi_O(\omega))\begin{pmatrix} A_E(\omega)\sin(\Phi_E(\omega)) - \\ jA_O(\omega)\cos(\Phi_E(\omega)) \end{pmatrix} \quad (7\text{-}8)$$

Thus, we derive the analytical form of the real and imaginary parts of the detected DSB signal in the frequency domain:

$$S_I(\omega) + \frac{N_1(\omega)}{2T} = \frac{I_1(\omega) - R_1(\omega)}{2T} \quad (7\text{-}9)$$

$$S_Q(\omega) + \frac{N_1(\omega)Q(\omega) + N_2(\omega)}{2TP(\omega)} = \quad (7\text{-}10)$$
$$\frac{(I_1(\omega) - R_1(\omega))Q(\omega) - (I_2(\omega) - R_2(\omega))}{2TP(\omega)}$$

We stress that (7-9) and (7-10) is a general field solution to self-coherent DSB signals impinging upon ASCR, whose filter response can take an arbitrary form; however, the performance of ASCR is dependent on the specific configuration of the filter response.

Figure 34:
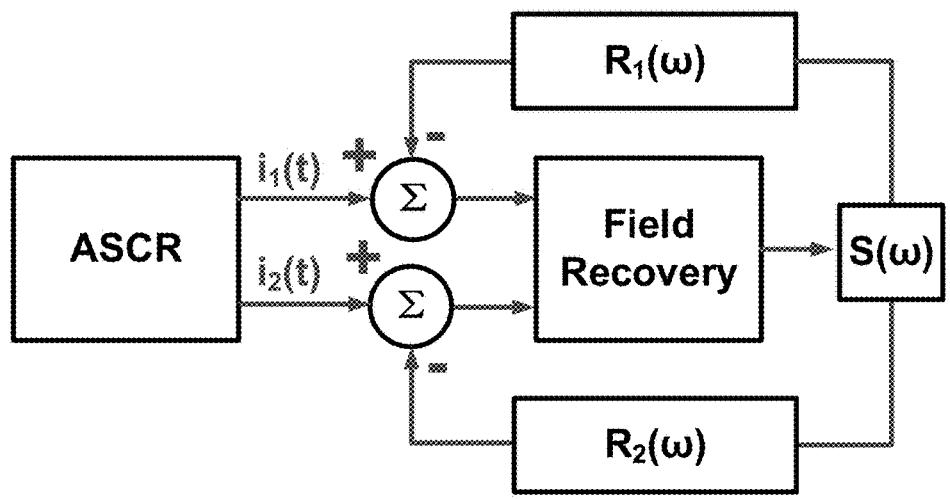
FIG. 34 is a flow diagram of a recursive SSBI mitigation algorithm.
Figure 35:
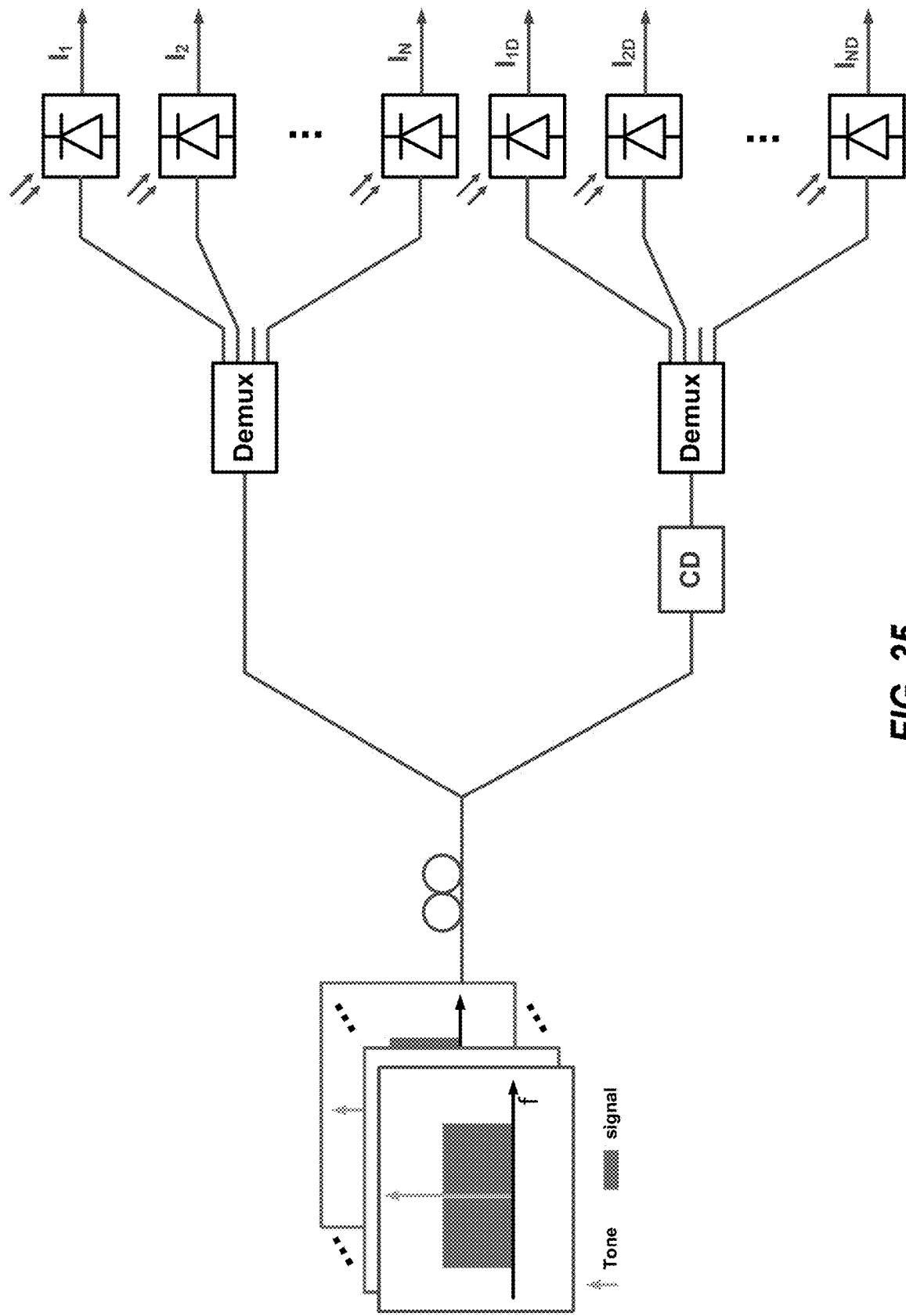
FIG. 35 is a schematic of a WDM architecture compatible with ASCR.

The restored field $S(\omega)$ is utilized to mitigate the SSBI by means of a recursive algorithm as schematically depicted in FIG. 34. The SSBI estimates $R_1(\omega)$ and $R_2(\omega)$ based on $S(\omega)$ are fed back and removed from photocurrents $I_1$ and $I_2$ so that a new estimate of s(t) is derived with improved accuracy. This process can be implemented iteratively until the impact of SSBI is marginal. As we will show hereafter, often fewer than 4 iterations are sufficient.

§ 7.3 OPTIMAL FILTER TRANSFER FUNCTION

We note that the previous discussion herein includes a specific realization of the proposed ASCR architecture, whose filter response is taken as a step function as below in the field recovery process $$S_Q H(\omega) = \begin{cases} 1, & \omega \ge 0 \\ 0, & \omega < 0 \end{cases} \quad (7\text{-}11)$$

This filter response requires a sharp filter edge which is costly to realize using current filter technologies and may not be the optimal response in optimizing the transmission performance. In this section, we analyze the characteristics of ASCR starting from the field solution given by (7-9) and (7-10), and subsequently derive the optimal filter transfer function.

It can be verified that $P(\omega)=0$ at $\omega=0$ regardless of the design of the filter transfer function and it is found from (7-6) that ASCR intrinsically loses the information of the imaginary part at $\omega=0$. This means that the noise in the imaginary part of the signal as expressed in (7-10) has a singularity at $w=0$. Thus, the transmitter signaling requires a guard band to mitigate the noise enhancement and it will be shown later that a moderate size of guard band is sufficient provided that the filter response is appropriately designed. On the other hand, for frequency components at $\omega \neq 0$, the power spectral density (PSD) of the noise in (7-10) is given by $$F(\omega) = \frac{(|Q(\omega)|^2 + 1)N_0}{4T|P(\omega)|^2}, \quad (7\text{-}12)$$

where the PSD of $N_1$ and $N_2$ are taken as $$\frac{N_0}{2}.$$

To minimize $F(\omega)$ is equivalent to minimizing $$\frac{(|Q(\omega)|^2 + 1)}{|P(\omega)|^2},$$

which is denoted as $G(\omega)$. $G(\omega)$ is expanded as follows $$G(\omega) = \frac{A_E^2(0)(A_E^2(\omega)\cos^2(\Phi_E(\omega)) + A_O^2(\omega)\sin^2(\Phi_E(\omega))) + 1}{A_E^2(0)(A_E^2(\omega)\sin^2(\Phi_E(\omega)) + A_O^2(\omega)\cos^2(\Phi_E(\omega)))} \quad (7\text{-}13)$$

Though (7-13) appears to be complex at a first glance, the odd-even decomposition beforehand greatly benefits the following analysis. A first observation is that the noise is independent of the odd part of the phase response, i.e. only the even part of the phase response impacts the performance of ASCR. It is also not difficult to show via simple partition that $A_E(0)=1$ minimizes $G(\omega)$ at $\omega \neq 0$, which suggests that it is desirable to have a filter that does not attenuate the CW-tone. However, it is not clear what are the desirable $A(\omega)$ and $\Phi_E(\omega)$, because for each specific $\Phi_E(\omega)$, we can determine a corresponding $A(\omega)$ that minimizes $G(\omega)$. It is interestingly found, as proved in appendix A, that $G(\omega)$ is lower bounded by 1 and the lower bound can be attained if and only if $$A(\omega) = 1 \quad (7\text{-}14)$$

$$\Phi_E(\omega) = \begin{cases} \frac{\pi}{2} + k\pi, & \omega \neq 0 \\ 0, & \omega = 0 \end{cases} \quad (7\text{-}15)$$

where $k$ is any integer. This transfer function indicates that an all-pass filter with a phase notch at $\omega=0$ is optimal in minimizing the noise.

§ 7.4 ASCR WITH A PRACTICAL FILTER RESPONSE

In general, it is desirable to have an optical filter whose response approaches the ideal transfer function given in (7-14) (7-15) while also being realizable based on mature fabrication processes and material platforms. However, the two objectives may not be compatible for the moment due to lack of motivation previously in realizing such filter transfer functions with a phase notch. Practical filters have smooth responses and can only approximate the sharp phase variation at $\omega=0$. However, the ideal transfer function can serve as a guideline as to which filter responses are preferable in realizing ASCRs with excellent performance. A smooth practical filter that approaches the ideal response can be represented in Maclaurin series $$\Phi_E(\omega) = \frac{\Phi^{(2)}(0)}{2!}\omega^2 + \frac{\Phi^{(4)}(0)}{4!}\omega^4 + \frac{\Phi^{(6)}(0)}{6!}\omega^6 + \ldots \quad (7\text{-}16)$$

Figure 42:
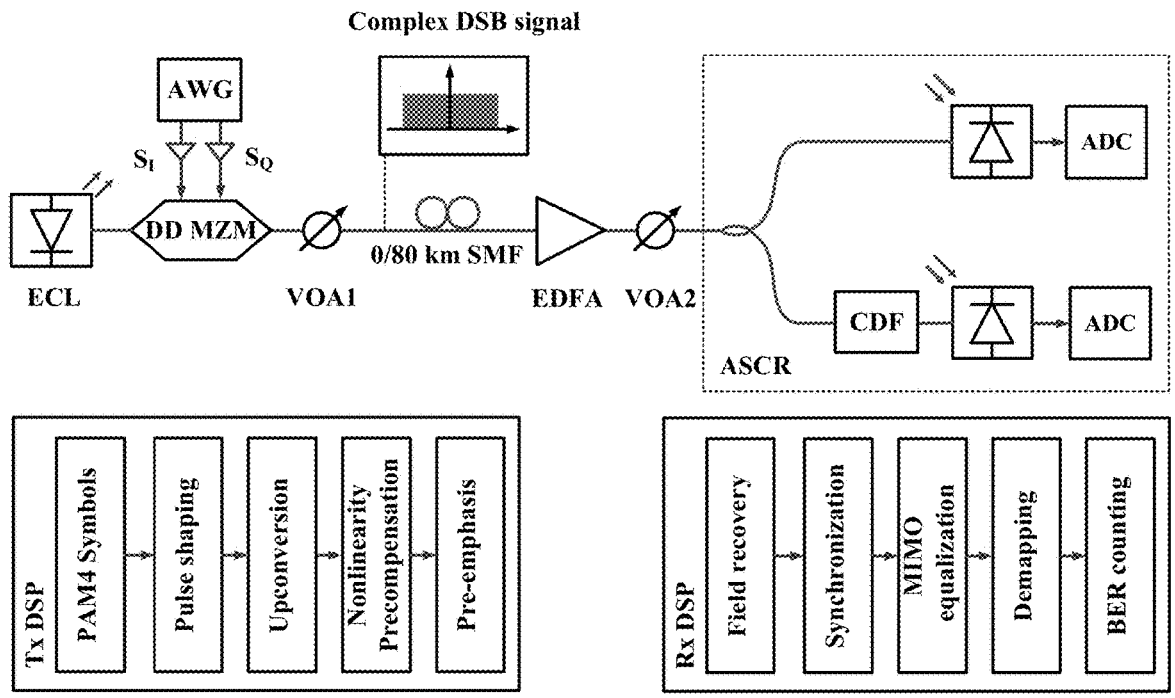
FIG. 42 is a diagram of an experimental setup and DSP decks of the transmitter and receiver.

Note that $\Phi^{(2)}(\omega)$ as a dominant second-order term is the group delay dispersion, i.e. the chromatic dispersion (CD) of optical filters. This indicates that a truncated second-order approximation of the ideal response, i.e. CD, could be used for the field recovery based on the ASCR architecture. Note that the field recovery is performed using the analytical solution within the principle framework of ASCR, such that thousands of iterations are not required as in [Haoshuo Chen] and there is no need to set the electrical noise from PD and ADC to zero due to the finite difference approximation in [Masayuki]. We also note that CD filters can be realized by various optical components including different types of fiber, and grating structures on fiber or chips. Also notable is that CD filters can have a relatively constant CD profile over a wide spectrum in C-band such that it is compatible with a WDM architecture as depicted in FIG. 42, where the CD filter provides the CD for multiple parallel lanes, which leads to cost sharing. However, there are also other filter designs worth exploring which could further approach the ideal phase notch response. From another perspective, by applying boundary conditions, we can adapt the targeted transfer function closer to the fabrication process and material platform, thereby deriving more realizable filter responses building on the above analysis.

§ 7.5 RESULTS

We have derived the analytical field solution of ASCR, identified the optimal filter transfer function, and presented a specific instance of ASCR based on a CD filter. In this section, we will numerically assess the performance of ASCR with a special focus on the CD filter-based ASCR, which as a second-order approximation of the ideal filter can be realized by available optical components. In section 7.6, we will experimentally validate the principle of ASCR using this specific design with a CD filter.

The system configuration in the numerical analysis is as follows: a self-coherent DSB signal pulse-shaped via 0.1 raised-cosine filter is propagated over 80 km of single mode fiber. The fiber channel is assumed linear, lossless with a CD coefficient of 17 ps/nm/km. AWGN is added to the signal before ASCR to simulate the amplified spontaneous emission noise. To quantitatively introduce a certain amount of electrical noise from the PD and ADC, we define SNRe as $$\frac{\langle (s(t) - \langle s(t) \rangle)^2 \rangle}{\langle n^2(t) \rangle},$$

where $\langle x \rangle$ represents the time average of x, s(t) is the signal, and n(t) is the added electrical noise. We set SNRe to 30 dB by introducing an AWGN to the signal after square-law detection. The postprocessing DSP includes signal field recovery, synchronization, linear equalization and BER counting.

Based on the above analysis, ASCR has a singularity at 0 GHz, which results in noise enhancement. Thus, we configure the self-coherent DSB signal to be made up of two independent signal sidebands, each with a guard band between the CW-Tone and the edge of the signal spectrum. Each sideband is a single-sideband PAM 4 signal at 28 Gbaud, thus leading to an aggregate symbol rate of 56 Gbaud.

Figure 36:
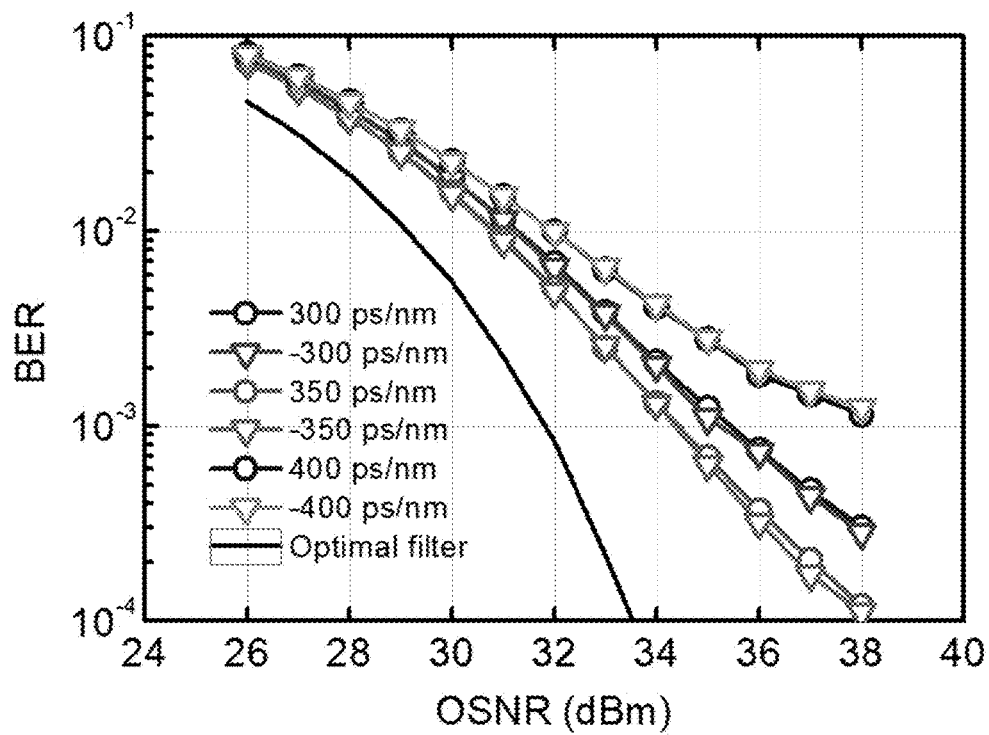
FIG. 36 is a graph of BER as a function of the OSNR at varied CD for the CD filter based ASCR. The performance of the optimal filter is also included as a reference.
Figure 37:
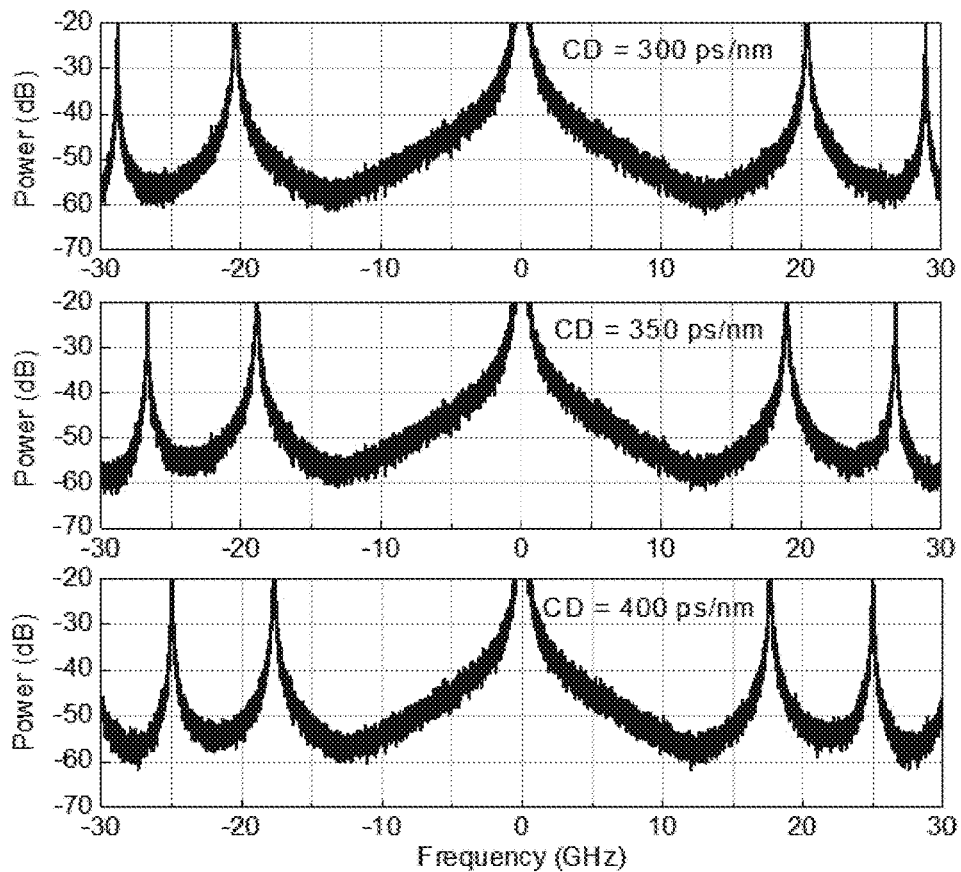
FIG. 37 is a graph of noise spectra at different CDs of 300, 350 and 400 ps/nm.

FIG. 36 plots the BER as a function of OSNR for ASCRs whose filter is either configured as CD filters with varied CD values or the ideal phase notch filter. The CSPR and guard band are set to 11 dB and 2 GHz, respectively. 4 iteration are implemented to mitigate the impact of SSBI. It is seen from the figure that the performance of CD filter based ASCR is lower bounded by that of the optimal filter. Another finding is that transmission performance of the CD filter based ASCR only depends on the absolute value of CD and the lowest BER is achieved at CD of 350 ps/nm among the three different CD values. The performance difference at varied CDs is due to the change of the noise enhancement profile. FIG. 37 plots the noise spectra corresponding to the three CD values above. The figure shows that the noise spectra is enhanced at multiple frequencies in addition to the 0 GHz due to a nonideal filter response. As the absolute CD value increases, the distance between the 0 GHz singularity and second nearest singularity decreases. It can be shown that the appearance of the singularities is governed by the formula $\sqrt{kc_0/|CD|\lambda_0^2}$, where $\omega$ is the speed of light in vacuum, $\lambda_0$ is the central wavelength, and k takes non-negative integers, e.g. k=0 refers to the 0 GHz singularity. Thus, CD should be optimized to suitably accommodate the signal band so that the impact of 0 GHz and the second nearest singularities is mitigated.

Figure 38:
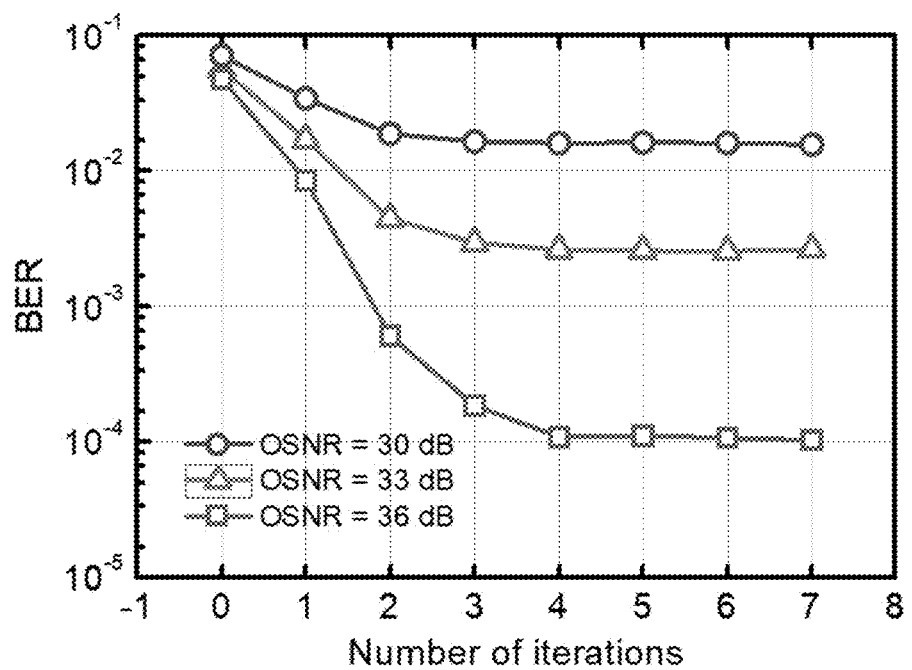
FIG. 38 is a graph of BER change as a function of the number of iterations at different OSNRs.

As described in section 7.2, the SSBI is mitigated in an iterative manner. Since more iterations increase the implementation complexity of the algorithm, it is important to determine the minimum iteration number required to effectively mitigate the SSBI. In FIG. 38, we plot BER as a function of the iteration number at varied OSNRs. It is seen in the figure that the BER curves first decrease and then level off when greater than 4 iterations are performed. More specifically, as the OSNR decreases from 36 dB to 33 dB, the iteration number required decreases from 4 to 2. The explanation is that at a lower OSNR, the impact of the noise becomes decisive on the transmission performance compared to the SSBI after fewer number of iterations.

Figure 39:
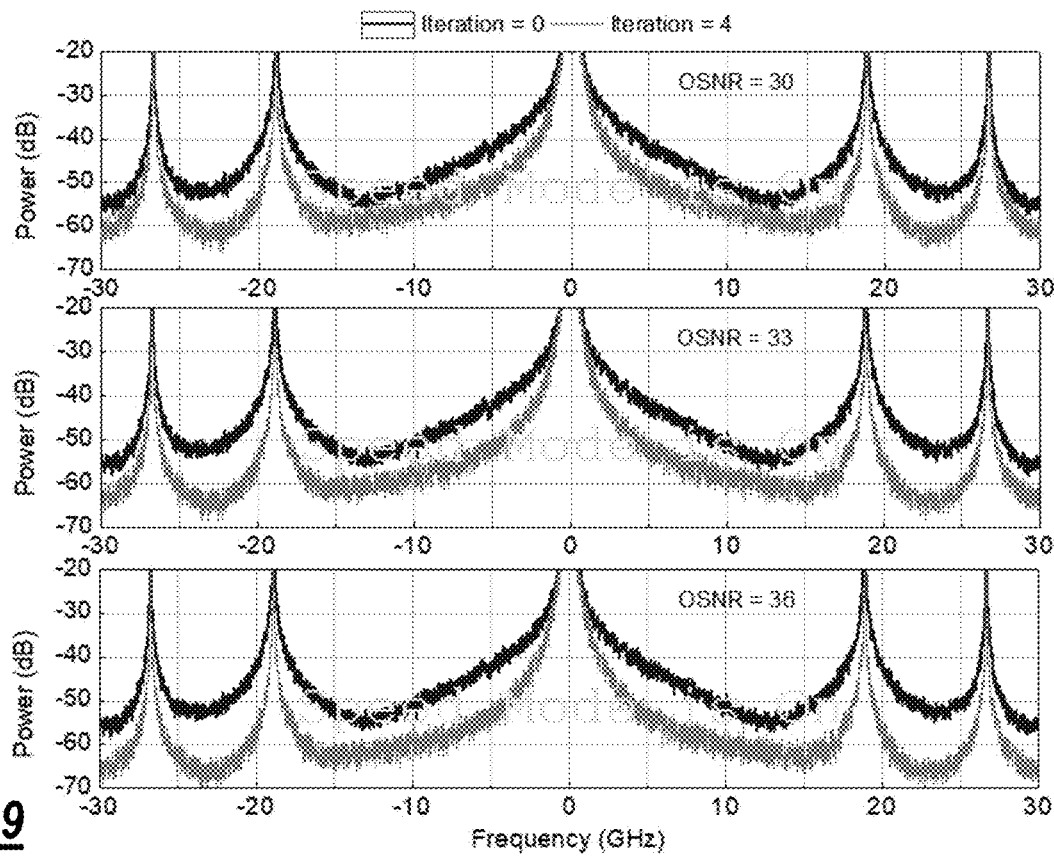
FIG. 39 is a graph of change of the noise spectra after iterative SSBI cancellation at different OSNRs.

The effectiveness of the iterative SSBI cancellation algorithm can be visualized from FIG. 39, where the noise spectra after 4 iterations is plotted against the spectra without SSBI cancellation. Note that both the noise and residual SSBI are enhanced in FIG. 39 due to the singularities. The figure shows a significant noise power reduction after 4 iterations of SSBI cancellation, which explains the substantially improved performance in FIG. 38.

Figure 40:
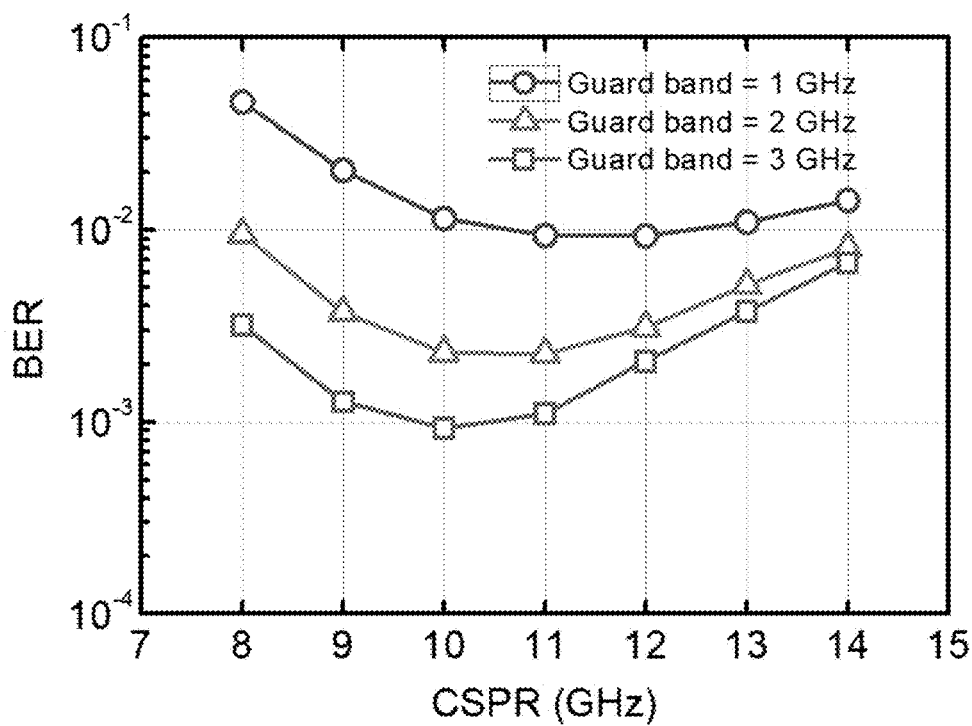
FIG. 40 is a graph of BER vs. CSPR at varied guard bands from 1 to 3 GHz.

Next, we characterize the performance impact of the guard band and CSPR with the iteration number and CD configured to the optimal values accordingly. FIG. 40 shows the change of the BER as a function of the CSPR at an OSNR of 33 dB and the guard band is varied from 1 to 3 GHz. It is found that all the curves have convex shapes. The explanation is that at a lower CSPR the SSBI cancellation efficacy is reduced due to less accurate SSBI estimates, whereas at a higher CSPR, the ratio between the signal power and the ASE noise power is actually lower, because the signal power in the computation of OSNR contains the power of the CW-tone. More importantly, we find that increasing the guard band significantly improves the transmission performance, which is attributed to the alleviated impact from the noise enhancement associated with the 0 GHz singularity.

Figure 41:
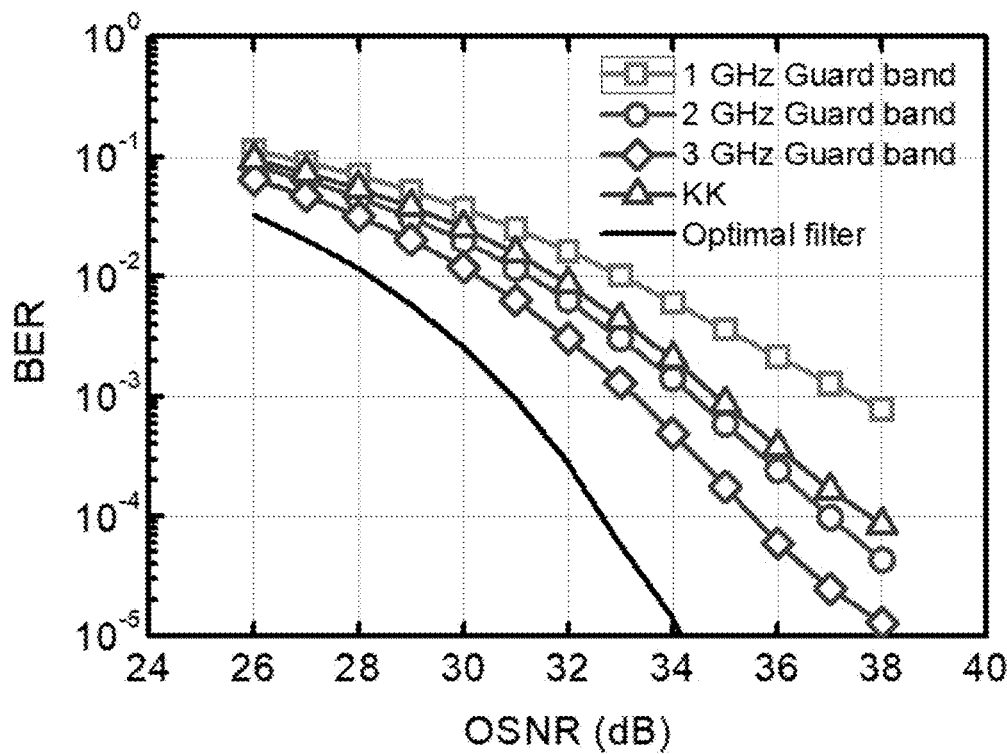
FIG. 41 is a graph of BER versus OSNR for CD filter based ASCR, ideal phase notch filter based ASCR, and the KK receiver.

The parametric analysis above prepares us to jointly optimize the system parameters and comparatively study the OSNR sensitivity of CD filter based ASCR versus other SCD schemes. FIG. 41 shows the BER as a function the OSNR for CD filter based ASCR at varied guard bands. The CSPR, CD are optimized accordingly at each guard band. The OSNR sensitivities of KK receiver and ASCR with the ideal filter response are also plotted in the figure. For the fairness of comparison, the KK receiver detects an SSB PAM 4 signal with an identical symbol rate of 56 Gbaud as the ASCR with the CSPR optimized to 10 dB. No optical filter is used to reject the out-of-band ASE noise so that cost-effective lasers with relaxed wavelength stabilization can be employed. The sampling rate is set to 84 GSample/s for all schemes. As observed in the figure, lower BER is achieved for the CD filter based ASCR at a higher guard band, because the signal is less impacted by the 0 GHz singularity. The BER of the KK receiver is higher than the CD filter based ASCR when greater than 2 GHz guard band is utilized. The worse BER performance of KK receiver is also attributed to the noise folding from the image band. Furthermore, KK receiver requires nearly two times the electrical bandwidth to detect of PAM 4 signals with the same symbol rate. We also note that the ASCR with the ideal phase notch response achieves the lowest BER without a guard band, which is in agreement with the analysis in section 7.2.

§ 7.6. EXPERIMENTAL VALIDATION

In this section, we experimentally validate the principle of asymmetric coherent detection based on the CDF-based ASCR. FIG. 42 depicts the experimental setup and DSP blocks of the transmitter and receiver. The self-coherent DSB signal is generated from a dual-drive Mach-Zehnder modulator (DDMZM) with a 3 dB E-O bandwidth of 30 GHz. The DDMZM is biased at the intensity quadrature such that a CW-tone is produced to co-propagate with the signal. Two channels of an arbitrary waveform generator (AWG) operating at 88 GSa/s are used to provide the in-phase and quadrature driving signals. After propagation over 80 km of single-mode fiber, the optical signal is pre-amplified by an EDFA before impinging upon the CD filter based ASCR. The CD filter is realized by a tunable dispersion compensation module (DCM). Two PDs with transimpedance amplifiers with a 3-dB bandwidth of 35 GHz are used to detect the two portions of the split optical signal. The two variable optical attenuators (VOA) are used to adjust the launch power and the incident optical power to ASCR, respectively. In the transmitter DSP, two independent PAM 4 signals are pulse-shaped via a raised-cosine filter with a roll-off factor of 0.1, transformed into SSB PAM 4 signals, and subsequently up-converted to an intermediate frequency to accommodate the guard band. Pre-compensation of the modulator nonlinearity is performed based on [Rongqing], and followed by a pe-emphasis filter to flatten the response of the transmitter RF chain. In the receiver postprocessing DSP, the field reconstruction is implemented based on the derived analytical solution. After synchronization, MIMO equalization is performed to remove the ISI and linear crosstalk due to imbalanced PD responses.

Figure 43:
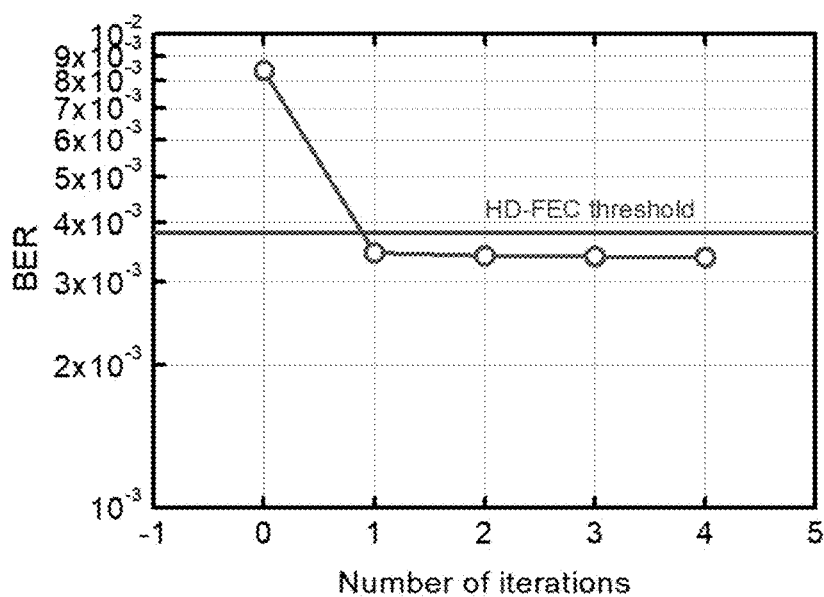
FIG. 43 is a graph of BER versus the number of iterations for a 56 Gbaud PAM 4 signal.

FIG. 43 shows the BER change as a function of the iteration number for a 56 Gbaud PAM 4 signal with a 2 GHz guard band per sideband. Note that the DDMZM nonlinearity needs to be carefully handled; otherwise, the transmission performance will be significantly compromised. Pre-compensating the DDMZM nonlinearity requires a relatively higher CSPR due to the zero DC driving signals and a DDMZM biased at the intensity quadrature. In out setup, 17 dB CSPR is found to optimize the system performance. The launch power, CD of the DCM, incident optical power to the PDs are optimized to 6.2 dBm, −320 ps/nm, and −1 dBm, respectively. As seen in the figure, merely 1 iteration is sufficient in alleviating the impact of the SSBI, achieving a net 112 Gb/s data rate with a pre-forward error correction (FEC) BER below the hard decision (HD)-FEC threshold of $3.8 \times 10^{-3}$. Remarkably, the small iteration number could benefit the high-speed parallel implementation of the field recovery DSP.

Figure 44:
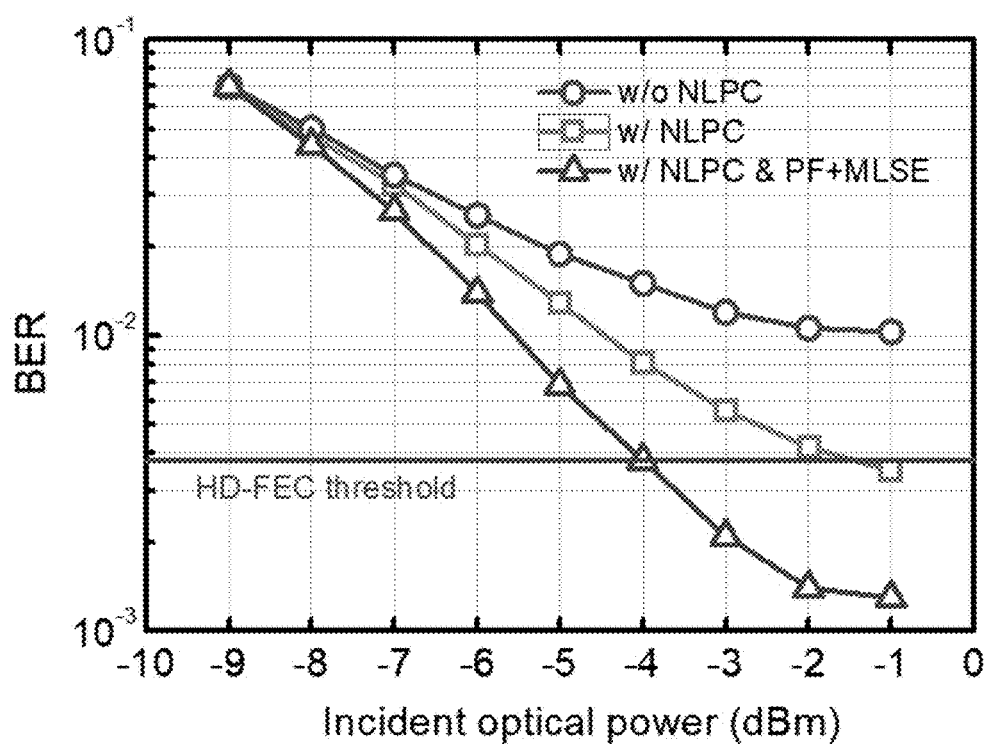
FIG. 44 is a graph of sensitivity improvement by means of the nonlinear pre-compensation (NLPC) and a post-filter (PF) combined with a maximum likelihood sequence estimator (MLSE).

FIG. 44 shows the change of the system BER as a function of the incident optical power to the PDs with or without the transmitter nonlinear pre-compensation (NLPC). The figure shows that NLPC is necessitated to attain a pre-FEC BER below the HD-FEC threshold of $3.8 \times 10^{-3}$ in our setup. Further, it is found that an additional post-filter (PF) combined with a maximum likelihood sequence estimator (MLSE) can substantially reduce the BER, since the impact of the noise enhancement is effectively mitigated.

§ 7.7 DISCUSSION AND CONCLUSION

Intuitively, the signal from the filter branch experiences a different optical transfer function, therefore offering extra information via direct detection to assist the field reconstruction. This is also revealed by the mutual information between the ASCR input X and the two outputs Y1, Y2, which is $I(X; Y_1, Y_2) = I(X; Y_1) + I(X; Y_2|Y_1) \geq I(X; Y_1)$. This inequality indicates that no less information is extracted from ASCR than a single-ended PD; however, extracting more information necessitates that the filter be carefully designed for a higher $I(X; Y_2|Y_1)$. We prove in this paper the optimality of an all-pass phase notch filter, which approaches the capacity of an ASCR based system. We also found that the second order approximation of this ideal transfer function, i.e. CD, can also enable field recovery within the architecture of ASCR. A distinct advantage of CD filter based ASCR is the availability of various optical components based on mature processes, which can realize a wideband CD with moderate optical loss. Nevertheless, it is also an appealing topic to pursue novel filter structures to further approach the ideal transfer function identified in the paper. From another perspective, the analysis in the paper allows the derivation of more realizable filter responses by introducing boundary conditions according to the constraints of the fabrication process and material platform.

Also notable is the simple architecture of ASCR in conjunction with an excellent transmission performance shown above. The bandwidth and number of PDs and ADCs, the need for LOs are the determining cost metrics in our opinion to evaluate the complexity of coherent detection schemes. The reasons are as follows: high speed PDs and ADCs are expensive; apart from higher cost, using more PDs and ADCs requires a higher received optical power, which raises the overall power consumption; the need for a LO imposes more complex laser stabilization and the carrier phase recovery DSP, and therefore requires higher power consumption and more complex hardware. Table 2 compares the hardware complexity of different schemes assuming the detection of a signal with the same bandwidth B and information rate in a single polarization configuration.

TABLE 2

Hardware complexity of different detection schemes in a single-polarization configuration.

| Schemes | PD/ADC bandwidth | No. of ADCs | No. of PDs | No. of LOs |
| --- | --- | --- | --- | --- |
| KK | B | 1 | 1 | 0 |
| CADD | ~B/2 | 3 | 5 | 0 |
| ASCR | ~B/2 | 2 | 2 | 0 |
| Coherent | B/2 | 2 | 4 | 1 |

The table shows that the KK receiver requires the highest electrical bandwidth B among all schemes due to an unused image band. Though CADD reduces the bandwidth of PDs and ADCs by a factor of 2, the scheme requires an additional optical hybrid, two more ADCs and 4 more PDs (2 BPDs), which increases the receiver complexity and requires higher received optical power.

By comparison, ASCR uses the least number of PDs and ADCs with a bandwidth close to B/2, while still being able to detect signals with the same bandwidth and information rate. A special realization of ASCR characterized in this paper uses CD as the optical filter response. An attractive merit of this instance is the exploitation of optical components, e.g. filter or grating structure-based devices, which are based on established processes and can provide a wideband CD with a low optical loss. CMOS-compatible structures such as chirped vertical gratings allow for an integrated ASCR with a CD filter. The compatibility with a WDM architecture also leads to cost sharing of the CD filter.

To summarize, we propose the ASCR that increases the ESE of SCD SSB schemes by a factor of 2 using two single ended PDs. The crux of the field reconstruction lies in the different optical transfer functions between the two detection branches by means of an optical filter. We derive the analytical solution to the received optical field, reveals the characteristics of ASCR, and identify the optimal filter transfer function that optimizes the system performance. A subsequent parametric study is performed on a specific instance of ASCR based on a CD filter. A transmission experiment based on this ASCR design follows to validate the principle of ASCR, achieving net 112 Gb/s data rate over 80 km below the $3.8 \times 10^{-3}$ HD-FEC threshold. The fusion of the high ESE of coherent detection and the cost-effectiveness of direct detection shows the potential of ASCR for short reach optical links required in the edge cloud connection and mobile X-haul. The concept of ASCR is also closely linked to the general subject of field reconstruction, which is essential in many fields of optics.

§ 7.8 APPENDIX

To prove that $$G(\omega) = \frac{(A_E^2(\omega)\cos^2(\Phi_E(\omega)) + A_O^2(\omega)\sin^2(\Phi_E(\omega))) + 1}{(A_E^2(\omega)\sin^2(\Phi_E(\omega)) + A_O^2(\omega)\cos^2(\Phi_E(\omega)))} \geq 1 \quad \text{A1}$$

is equivalent to proving that $$J(\omega) = A_E^2(\omega)(\cos^2(\Phi_E(\omega)) - \sin^2(\Phi_E(\omega)))(A_E^2(\omega) - A_O^2(\omega)) + 1 \quad \text{A2}$$

$$= A_E^2(\omega)\cos(2\Phi_E(\omega))(A_E^2(\omega) - A_O^2(\omega)) + 1 \geq 0$$

From the definition of the amplitude response, we have the following inequality at $\omega \neq 0$ $$0 \leq A_E(\omega) + A_O(\omega) \leq 1 \quad \text{A3}$$

$$0 \leq A_E(-\omega) + A_O(-\omega) \leq 1 \quad \text{A4}$$

Due to the property of even and odd functions, (A4) is equivalent to $$0 \leq A_E(\omega) - A_O(\omega) \leq 1 \quad \text{A5}$$

The addition and multiplication of (A3) and (A5) leads to the bounds $$0 \leq A_E^2(\omega) - A_O^2(\omega) \leq 1 \quad \text{A6}$$

$$0 \leq A_E^2(\omega) \leq 1 \quad \text{A7}$$

Thus, $J(\omega) \geq -(A_E^2(\omega) - A_o^2(\omega)) + 1 \geq 0$ and $G(\omega)$ is lower bounded by 1. The equality is achieved when $\cos(2\Phi_E(\omega)) = -1$, $A_E^2(\omega) = 1$, and $A_o^2(\omega) = 0$, which leads to the all-pass phase notch response given in (7-14) and (7-15).

§ 8.0 CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

REFERENCES

[1] Cisco Visual Networking Index: Forecast and Trends, 2017-2022 White Paper, www.cisco.comlc/enlus/solutions/collateral/service-provider/visual-networking-index-vni/white-paper-c11-741490.html.

[1 a] K. Kikuchi, "Fundamentals of Coherent Optical Fiber Communications," in Journal of Lightwave Technology, vol. 34, no. 1, pp. 157-179, 1 Jan. 1, 2016, doi: 10.1109/JLT.2015.2463719.

[2] K. Zhong, X. Zhou, J. Huo, C. Yu, C. Lu, and A. P. T. Lau, "Digital Signal Processing for Short-Reach Optical Communications: A Review of Current Technologies and Future Trends," J. Lightwave Technol. 36(2), 377-400 (2018).

[3] M. Morsy-Osman, M. Chagnon, and D. Plant, "Four Dimensional Modulation and Stokes Direct Detection of Polarization Division Multiplexed Intensities, Inter Polarization Phase and Inter Polarization Differential Phase," J. Lightwave Technol. 34(7), 1585-1592 (2016).

[4] M. Chagnon, "Optical Communications for Short Reach," J. Lightwave Technol. 37(8), 1779-1797 (2019).

[5] L. Zhang, T. Zuo, Y. Mao, Q. Zhang, E. Zhou, G. N. Liu, and X. Xu, "Beyond 100-Gb/s Transmission Over 80-km SMF Using Direct-Detection SSB-DMT at C-Band," J. Lightwave Technol. 34(2), 723-729 (2016).

[6] Q. Zhang, N. Stojanovic, C. Xie, C. Prodaniuc, and P. Laskowski, "Transmission of single lane 128 Gbit/s PAM-4 signals over an 80 km SSMF link, enabled by DDMZM aided dispersion pre-compensation," Opt. Express 24(21), 24580-24591 (2016).

[7] Z. Xing, A. Samani, M. Xiang, E. El-Fiky, T. M. Hoang, D. Patel, R. Li, M. Qiu, M. G. Saber, M. Morsy-Osman, and D. V. Plant, "100 Gb/s PAM4 transmission system for datacenter interconnects using a SiP ME-MZM based DAC-less transmitter and a VSB self-coherent receiver," Opt. Express 26(18), 23969 (2018).

[8] Z. Li, M. S. Erkilinç, K. Shi, E. Sillekens, L. Galdino, B. C. Thomsen, P. Bayvel, and R. I. Killey, "SSBI Mitigation and the Kramers-Kronig Scheme in Single-Sideband Direct-Detection Transmission With Receiver-Based Electronic Dispersion Compensation," J. Lightwave Technol. 35(10), 1887-1893 (2017).

[9] H.-Y. Chen, N. Kaneda, J. Lee, J. Chen, and Y.-K. Chen, "Optical filter requirements in an EML-based single-sideband PAM4 intensity-modulation and direct-detection transmission system," Opt. Express 25(6), 5852-5860 (2017).

[10] C. Antonelli, A. Mecozzi, M. Shtaif, X. Chen, S. Chandrasekhar, and P. J. Winzer, "Polarization Multiplexing With the Kramers-Kronig Receiver," J. Lightwave Technol. 35(24), 5418-5424 (2017).

[11] D. Che, C. Sun, and W. Shieh, "Single-Channel 480-Gb/s Direct Detection of POL-MUX IQ Signal Using Single-Sideband Stokes Vector Receiver," in *Optical Fiber Communication Conference (OFC)*, OSA Technical Digest (online) (Optical Society of America, 2018), Tu2C.7.

[12] T. M. Hoang, M. Y. S. Sowailem, Q. Zhuge, Z. Xing, M. Morsy-Osman, E. El-Fiky, S. Fan, M. Xiang, and D. V. Plant, "Single wavelength 480 Gb/s direct detection over 80 km SSMF enabled by Stokes vector Kramers Kronig transceiver," Opt. Express 25(26), 33534 (2017).

[13] D. Che, C. Sun, and W. Shieh, "Maximizing the spectral efficiency of Stokes vector receiver with optical field recovery," Opt. Express 26(22), 28976 (2018).

[14] A. Mecozzi, C. Antonelli, and M. Shtaif, "Kramers-Kronig coherent receiver," Optica 3(11), 1220-1227 (2016).

[15] X. Chen, C. Antonelli, S. Chandrasekhar, G. Raybon, A. Mecozzi, M. Shtaif, and P. Winzer, "Kramers-Kronig Receivers for 100-km Datacenter Interconnects," J. Lightwave Technol. 36(1), 79-89 (2018).

[16] Y. Zhu, M. Jiang, and F. Zhang, "Direct detection of polarization multiplexed single sideband signals with orthogonal offset carriers," Opt. Express 26(12), 15887-15898 (2018).

[17] D. Dai, J. Bauters, and J. E. Bowers, "Passive technologies for future large-scale photonic integrated circuits on silicon: polarization handling, light non-reciprocity and loss reduction," Light: Science & Applications 1, e1 (2012).

[18] H. Fukuda, K. Yamada, T. Tsuchizawa, T. Watanabe, H. Shinojima, and S.-i. Itabashi, "Silicon photonic circuit with polarization diversity," Opt. Express 16(7), 4872-4880 (2008).

[19] F. Y. Gardes, D. J. Thomson, N. G. Emerson, and G. T. Reed, "40 Gb/s silicon photonics modulator for TE and TM polarisations," Opt. Express 19(12), 11804-11814 (2011).

[20] S. T. Le, K. Schuh, M. Chagnon, F. Buchali, and H. Buelow, "1.6 Tbps WDM Direct Detection Transmission with Virtual-Carrier over 1200 km," in *Optical Fiber Communication Conference*, OSA Technical Digest (online) (Optical Society of America, 2018), Tu2D.5.

[21] S. T. Le, K. Schuh, M. Chagnon, F. Buchali, R. Dischler, V. Aref, H. Buelow, and K. M. Engenhardt, "1.72-Tb/s Virtual-Carrier-Assisted Direct-Detection Transmission Over 200 km," J. Lightwave Technol. 36(6), 1347-1353 (2018).

[22] M. Selmi, Y. Jaouen, and P. Ciblat, "Accurate digital frequency offset estimator for coherent PolMux QAM transmission systems," in *2009 35th European Conference on Optical Communication*, 2009), 1-2.

[23] L. Charles, B. Villeneuve, Z. Zhang, D. McGhan, H. Sun, and M. O'Sullivan, "WDM performance and PMD tolerance of a coherent 40-Gbit/s dual-polarization QPSK transceiver," J. Lightwave Technol. 26(1), 168-175 (2008).

[24] A. Mecozzi, C. Antonelli and M. Shtaif, "The Kramers-Kronig receiver: A coherent receiver based on intensity detection and phase recovery," 2018 Conference on Lasers and Electro-Optics (CLEO), San Jose, CA, 2018, pp. 1-2.

[25] S. Randel, D. Pilori, S. Chandrasekhar, G. Raybon and P. Winzer, "100-Gb/s discrete-multitone transmission over 80-km SSMF using single-sideband modulation with novel interference-cancellation scheme," 2015 European Conference on Optical Communication (ECOC), Valencia, 2015, pp. 1-3, doi: 10.1109/ECOC.2015.7341665.

[26] Antonio Mecozzi, Cristian Antonelli, and Mark Shtaif, "Kramers-Kronig coherent receiver," Optica 3, 1220-1227 (2016)

[27] Antonio Mecozzi, Cristian Antonelli, and Mark Shtaif, "Kramers-Kronig receivers," Adv. Opt. Photon. 11, 480-517 (2019)

[28] L. Zhang, T. Zuo, Q. Zhang, J. Zhou, E. Zhou and G. N. Liu, "150-Gb/s DMT over 80-km SMF transmission based on Spectrally Efficient SSBI cancellation using guard-band Twin-SSB Technique," ECOC 2016; 42nd European Conference on Optical Communication, Dusseldorf, Germany, 2016, pp. 1-3.

[29] X. Li, M. Zhu, Z. Xing, M. O'Sullivan, and D. V. Plant, "Asymmetric direct detection of twin-SSB signals," Opt. Lett. 45, 844-847 (2020)

[30] Shieh, W., Sun, C. & Ji, H. Carrier-assisted differential detection. Light Sci Appl 9, 18 (2020). https://doi.org/10.1038/s41377-020-0253-8

[31] C. Sun, T. Ji, H. Ji, Z. Xu and W. Shieh, "Experimental Demonstration of Complex-Valued DSB Signal Field Recovery via Direct Detection," in IEEE Photonics Technology Letters, vol. 32, no. 10, pp. 585-588, 15 May 15, 2020, doi: 10.1109/LPT.2020.2985590.

[32] Y. Painchaud, M. Lapointe, F. Trépanier, R. L. Lachance, C. Paquet, and M. Guy, "Recent progress on FBG-based tunable dispersion compensators for 40 Gb/s applications," in Optical Fiber Communication Conference and Exposition and The National Fiber Optic Engineers Conference, OSA Technical Digest Series (CD) (Optical Society of America, 2007), paper OThP3.

[33] D. T. H. Tan, K. Ikeda, R. E. Saperstein, B. Slutsky, and Y. Fainman, "Chip-scale dispersion engineering using chirped vertical gratings," Opt. Lett. 33, 3013-3015 (2008).

[34] K. Zhong, X. Zhou, J. Huo, C. Yu, C. Lu and A. P. T. Lau, "Digital Signal Processing for Short-Reach Optical Communications: A Review of Current Technologies and Future Trends," Journal of Lightwave Technology, vol. 36, no. 2, pp. 377-400, January 2018.

[35] M. Chagnon, "Optical Communications for Short Reach," Journal of Lightwave Technology, vol. 37, no. 8, pp. 1779-1797, April 2019.

[36] Antonio Mecozzi et al., "Kramers-Kronig coherent receiver," Optica, vol. 3, pp. 1220-1227, 2016.

[37] X. Chen et al., "Kramers-Kronig Receivers for 100-km Datacenter Interconnects," Journal of Lightwave Technology, vol. 36, no. 1, pp. 79-89, January, 2018

[38] H. Chen et al., "Optical filter requirements in an EML-based singlesideband PAM4 intensity-modulation and direct-detection transmission system," Opt. Express, vol. 25, no. 6, pp. 5852-5860, March 2017.

[39] Z. Xing, et al., "100 Gb/s PAM4 transmission system for datacenter interconnects using a SiP ME-MZM based DAC-less transmitter and a VSB self-coherent receiver," Opt. Express, vol. 26, no. 18, pp. 23969-23979, September 2018.

[40] H. Sun et al., "Real-time measurements of a 40 Gb/s coherent system," Opt. Express., vol. 16, no. 2, pp. 873-879, January 2008.

[41] P. J. Winzer and R.-J. Essiambre, "Advanced optical modulation formats," in Optical Fiber Telecommunications VB, I. Kaminow and T. Li, Eds. New York: Academic, 2008, pp. 232-304.

[42] Seb J. Savory, Giancarlo Gavioli, Robert I. Killey, and Polina Bayvel, "Electronic compensation of chromatic dispersion using a digital coherent receiver," Opt. Express 15, 2120-2126 (2007).

[43] Ezra M. Ip and Joseph M. Kahn, "Fiber Impairment Compensation Using Coherent Detection and Digital Signal Processing," J. Lightwave Technol. 28, 502-519 (2010).

[5] F. Buchali, V. Aref, M. Chagnon, K. Schuh, H. Hettrich, A. Bielik, L. Altenhain, M. Guntermann, R. Schmid, and M. Moller, "1.52 Tb/s single carrier transmission supported by a 128 GSa/s SiGe DAC," in Optical Fiber Communication Conference Postdeadline Papers 2020, (Optical Society of America, 2020), paper Th4C.2.

[46] M. Schuster, S. Randel, C. A. Bunge, S. C. J. Lee, F. Breyer, B. Spinnler, and K. Petermann, "Spectrally efficient compatible single-sideband modulation for OFDM transmission with direct detection," IEEE Photon. Technol. Lett. 20, 670-672 (2008).

[47] S. Randel, D. Pilori, S. Chandrasekhar, G. Raybon and P. Winzer, "100-Gb/s discrete-multitone transmission over 80-km SSMF using single-sideband modulation with novel interference-cancellation scheme," 2015 European Conference on Optical Communication (ECOC), Valencia, 2015, pp. 1-3, doi: 10.1109/ECOC.2015.7341665.

[48] Xiang Liu, S. Chandrasekhar, and Andreas Leven, "Digital self-coherent detection," Opt. Express 16, 792-803 (2008).

[49] Di Che, Qian Hu, and William Shieh, "Linearization of Direct Detection Optical Channels Using Self-Coherent Subsystems," J. Lightwave Technol. 34, 516-524 (2016).

[50] Di Che, Chuanbowen Sun, and William Shieh, "Optical Field Recovery in Stokes Space," J. Lightwave Technol. 37, 451-460 (2019).

[51] X. Chen, C. Antonelli, S. Chandrasekhar, G. Raybon, J. Sinsky, A. Mecozzi, M. Shtaif, and P. Winzer, "218-Gb/s Single-Wavelength, Single-Polarization, Single-Photodiode Transmission Over 125-km of Standard Singlemode Fiber Using Kramers-Kronig Detection," in Optical Fiber Communication Conference Postdeadline Papers, OSA Technical Digest (online) (Optical Society of America, 2017), paper Th5B.6.

[52] Zhe Li, M. Sezer Erkilinc, Kai Shi, Eric Sillekens, Lidia Galdino, Benn C. Thomsen, Polina Bayvel, and Robert I. Killey, "SSBI Mitigation and the Kramers-Kronig Scheme in Single-Sideband Direct-Detection Transmission With Receiver-Based Electronic Dispersion Compensation," J. Lightwave Technol. 35, 1887-1893 (2017).

[53] Wei-Ren Peng, Xiaoxia Wu, Kai-Ming Feng, Vahid R. Arbab, Bishara Shamee, Jeng-Yuan Yang, Louis C. Christen, Alan E. Willner, and Sien Chi, "Spectrally efficient direct-detected OFDM transmission employing an iterative estimation and cancellation technique," Opt. Express 17, 9099-9111 (2009).

[54] Son Thai Le, Karsten Schuh, Mathieu Chagnon, Fred Buchali, Roman Dischler, Vahid Aref, Henning Buelow, and Klaus M. Engenhardt, "1.72-Tb/s Virtual-Carrier-Assisted Direct-Detection Transmission Over 200 km," J. Lightwave Technol. 36, 1347-1353 (2018)

[55] Antonio Mecozzi, Cristian Antonelli, and Mark Shtaif, "Kramers-Kronig receivers," Adv. Opt. Photon. 11, 480-517 (2019).

What is claimed is:

1. A method comprising the steps of:
splitting a received optical signal into two paths such that each path has a copy of the received optical signal, wherein one polarization of the split received optical signal experiences a different optical transfer function in one of the two paths;
detecting power of the split received optical signal in each of the two paths to obtain corresponding electrical signals; and
performing electrical domain extraction of information associated with the received optical signal utilizing each of the corresponding electrical signals from the two paths, wherein the different optical transfer function provides additional information from the received optical signal utilized in optical field reconstruction via direct detection.

2. The method of claim 1, wherein the received optical signal is self-coherent (SC) complex double sideband (DSB).

3. The method of claim 2, wherein the different transfer function is caused by a dispersive element.

4. The method of claim 2, wherein the different transfer function is caused by an interferometer.

5. The method of claim 2, wherein the different transfer function is caused by a filter.

6. The method of claim 1, wherein the received optical signal includes orthogonal offset carriers assisted polarization multiplexed single sideband signals.

7. The method of claim 6, wherein the different transfer function is caused by a filter to reduce power of a carrier in one polarization.

8. The method of claim 1, wherein the performing includes iterative signal-signal beating interference (SSBI) cancellation.

9. The method of claim 1, wherein the detecting further includes performing analog-to-digital conversion to obtain the corresponding electrical signals.

10. The method of claim 1, wherein the performing electrical domain extraction of information is via a digital signal processor (DSP).

11. An asymmetric receiver comprising:
a splitter configured to split a received optical signal into two paths such that each path has a copy of the received optical signal, wherein one polarization of the split received optical signal experiences a different optical transfer function in one of the two paths;
detectors configured to detect power of the split received optical signal in each of the two paths to obtain corresponding electrical signals; and
circuitry configured to perform electrical domain extraction of information associated with the received optical signal utilizing each of the corresponding electrical signals from the two paths, wherein the different optical transfer function provides additional information from the received optical signal utilized in optical field reconstruction via direct detection.

12. The asymmetric receiver of claim 11, wherein the received optical signal is self-coherent (SC) complex double sideband (DSB).

13. The asymmetric receiver of claim 12, wherein the different transfer function is caused by a dispersive element.

14. The asymmetric receiver of claim 12, wherein the different transfer function is caused by an interferometer.

15. The asymmetric receiver of claim 12, wherein the different transfer function is caused by a filter.

16. The asymmetric receiver of claim 11, wherein the received optical signal includes orthogonal offset carriers assisted polarization multiplexed single sideband signals.

17. The asymmetric receiver of claim 16, wherein the different transfer function is caused by a filter to reduce power of a carrier in one polarization.

18. The asymmetric receiver of claim 11, wherein the circuitry is configured to perform iterative signal-signal beating interference (SSBI) cancellation.

19. The asymmetric receiver of claim 11, further comprising circuitry configured perform analog-to-digital conversion to obtain the corresponding electrical signals.

20. The asymmetric receiver of claim 11, wherein the circuitry includes a digital signal processor (DSP).

* * * * *